US012053096B2

(12) United States Patent
Palashewski et al.

(10) Patent No.: US 12,053,096 B2
(45) Date of Patent: Aug. 6, 2024

(54) BED WITH INTEGRATED COMPONENTS AND FEATURES

(71) Applicant: Sleep Number Corporation, Minneapolis, MN (US)

(72) Inventors: Wade Daniel Palashewski, Andover, MN (US); Kody Karshnik, Maple Grove, MN (US); Saurabh Chhaparwal, Plymouth, MN (US); Samuel Hellfeld, Edina, MN (US); John Klesk, Minneapolis, MN (US); John McGuire, New Hope, MN (US); Jeff Ingham, Minneapolis, MN (US); Eric Rose, Easley, SC (US); Robert Erko, Apple Valley, MN (US); Bruce William Gaunt, Albertville, MN (US)

(73) Assignee: Sleep Number Corporation, Minneapolis, MN (US)

( * ) Notice: Subject to any disclaimer, the term of this patent is extended or adjusted under 35 U.S.C. 154(b) by 1317 days.

(21) Appl. No.: 16/505,062

(22) Filed: Jul. 8, 2019

(65) Prior Publication Data

US 2019/0328146 A1 Oct. 31, 2019

Related U.S. Application Data

(63) Continuation of application No. 14/885,751, filed on Oct. 16, 2015, now Pat. No. 10,342,358.

(Continued)

(51) Int. Cl.
*A47C 27/08* (2006.01)
*A47C 17/86* (2006.01)

(Continued)

(52) U.S. Cl.
CPC ............ *A47C 27/082* (2013.01); *A47C 17/86* (2013.01); *A47C 19/00* (2013.01); *A47C 27/083* (2013.01); *A61G 7/015* (2013.01); *A61G 7/018* (2013.01)

(58) Field of Classification Search
CPC ................ A61G 7/015; A61G 7/05784; A61G 7/05792; A61G 17/86; A47C 17/86;

(Continued)

(56) References Cited

U.S. PATENT DOCUMENTS 96,989 A 11/1869 Somes
1,142,876 A 6/1915 Davis et al.

(Continued)

OTHER PUBLICATIONS

U.S. Appl. No. 14/283,675, Mahoney et al., filed May 21, 2014.

(Continued)

*Primary Examiner* — Justin C Mikowski
*Assistant Examiner* — Amanda L Bailey
(74) *Attorney, Agent, or Firm* — Fish & Richardson P.C.

(57) ABSTRACT

A foundation for a bed system can include a foundation structure having a head, a foot, a first side, and a second side. An air pump configured for supplying air to and inflating at least one mattress air chamber can be housed within the foundation structure proximate the foot of the foundation structure. A control box and a central power hub can be housed within the foundation structure. The central power hub can be electrically connected to and configured to deliver electrical power to each of the air pump, the control box, and one or more additional electrical components. The foundation can optionally integrate other components into the foundation.

17 Claims, 28 Drawing Sheets

Related U.S. Application Data

(60) Provisional application No. 62/064,860, filed on Oct. 16, 2014.

(51) Int. Cl.
*A47C 19/00* (2006.01)
*A61G 7/015* (2006.01)
*A61G 7/018* (2006.01)

(58) Field of Classification Search
CPC ....... A47C 19/00; A47C 19/02; A47C 19/021; A47C 19/025; A47C 27/083; A47C 27/082; A47C 27/081; A47C 27/085; A47C 27/18; A47C 21/04; A47C 21/042; A47C 21/044; A47C 21/048; A47C 7/74; A47C 7/742; A47C 7/744; A47C 7/748
See application file for complete search history.

(56) References Cited

U.S. PATENT DOCUMENTS

| | | | | |
|---|---|---|---|---|
| 1,480,853 | A | 1/1924 | Diamond | |
| 2,493,067 | A | 9/1945 | Goldsmith | |
| 2,807,809 | A | 10/1957 | Kottemann | |
| 3,030,145 | A | 5/1962 | Kottemann | |
| 3,266,064 | A | 8/1966 | Figman | |
| 3,639,001 | A | 2/1972 | Anderson | |
| 3,681,797 | A | 8/1972 | Messner | |
| 3,778,851 | A | 12/1973 | Howorth | |
| 4,117,999 | A | 10/1978 | Gessler | |
| 4,391,009 | A | 7/1983 | Schild et al. | |
| 4,766,628 | A | 8/1988 | Greer et al. | |
| 4,788,729 | A | 12/1988 | Greer et al. | |
| D300,194 | S | 3/1989 | Walker | |
| 4,829,616 | A * | 5/1989 | Walker | F04D 25/084 251/129.05 |
| 4,867,230 | A | 9/1989 | Voss | |
| 4,890,344 | A | 1/1990 | Walker | |
| 4,897,890 | A | 2/1990 | Walker | |
| 4,908,895 | A | 3/1990 | Walker | |
| 4,949,413 | A | 8/1990 | Goodwin | |
| D313,973 | S | 1/1991 | Walker | |
| 4,984,316 | A | 1/1991 | Simpson et al. | |
| 4,991,244 | A | 2/1991 | Walker | |
| 5,020,173 | A * | 6/1991 | Dreyer, Jr. | A47C 17/86 297/188.1 |
| 5,144,706 | A | 9/1992 | Walker et al. | |
| 5,170,522 | A | 12/1992 | Walker | |
| 5,184,612 | A | 2/1993 | Augustine | |
| 5,305,483 | A | 4/1994 | Watkins | |
| 5,325,551 | A | 7/1994 | Tappel et al. | |
| 5,382,075 | A | 1/1995 | Shih | |
| 5,473,783 | A | 12/1995 | Allen | |
| D368,475 | S | 4/1996 | Scott | |
| 5,509,154 | A | 4/1996 | Shafer et al. | |
| 5,546,618 | A | 8/1996 | Beedy et al. | |
| 5,564,140 | A | 10/1996 | Shoenhair et al. | |
| 5,566,409 | A | 10/1996 | Klearman | |
| 5,642,546 | A | 6/1997 | Shoenhair | |
| 5,652,484 | A | 7/1997 | Shafer et al. | |
| 5,687,435 | A | 11/1997 | Dufresne | |
| 5,697,113 | A | 12/1997 | Shatz et al. | |
| 5,713,137 | A | 2/1998 | Fujita | |
| 5,765,246 | A | 6/1998 | Shoenhair | |
| 5,903,941 | A | 5/1999 | Shafer et al. | |
| 5,904,172 | A | 5/1999 | Gifft et al. | |
| 6,037,723 | A | 3/2000 | Shafer et al. | |
| 6,079,065 | A * | 6/2000 | Luff | A47C 27/082 5/616 |
| 6,085,369 | A | 7/2000 | Feher | |
| 6,108,844 | A | 8/2000 | Kraft et al. | |
| 6,161,231 | A | 12/2000 | Kraft et al. | |
| 6,202,239 | B1 | 3/2001 | Ward et al. | |
| 6,336,237 | B1 | 1/2002 | Schmid | |
| 6,397,419 | B1 | 6/2002 | Mechache | |
| 6,425,527 | B1 | 7/2002 | Smole | |
| 6,438,775 | B1 | 8/2002 | Koenig | |
| 6,483,264 | B1 | 11/2002 | Shafer et al. | |
| 6,493,889 | B2 | 12/2002 | Kocurek | |
| 6,511,501 | B1 | 1/2003 | Augustine et al. | |
| 6,546,576 | B1 | 4/2003 | Lin | |
| 6,686,711 | B2 | 2/2004 | Rose et al. | |
| 6,708,357 | B2 | 3/2004 | Gaboury et al. | |
| 6,763,541 | B2 | 7/2004 | Mahoney et al. | |
| 6,779,592 | B1 | 8/2004 | Ichigaya | |
| 6,804,848 | B1 | 10/2004 | Rose | |
| 6,832,397 | B2 | 12/2004 | Gaboury | |
| D502,929 | S | 3/2005 | Copeland et al. | |
| 6,883,191 | B2 | 5/2005 | Gaboury et al. | |
| 6,904,629 | B2 | 6/2005 | Wu | |
| 7,036,163 | B2 | 5/2006 | Schmid | |
| 7,165,281 | B2 | 1/2007 | Larssson et al. | |
| 7,181,787 | B2 | 2/2007 | Wu | |
| 7,240,386 | B1 | 7/2007 | McKay et al. | |
| 7,293,309 | B1 | 11/2007 | Shih | |
| 7,389,554 | B1 | 6/2008 | Rose | |
| 7,448,100 | B1 | 11/2008 | Shih | |
| 7,465,280 | B2 | 12/2008 | Rawls-Meehan | |
| 7,467,435 | B1 | 12/2008 | McKay et al. | |
| 7,469,432 | B2 | 12/2008 | Chambers | |
| 7,480,950 | B2 | 1/2009 | Feher | |
| 7,650,658 | B1 | 1/2010 | McKay et al. | |
| 7,712,164 | B2 | 5/2010 | Chambers | |
| 7,865,988 | B2 | 1/2011 | Koughan et al. | |
| 7,877,827 | B2 | 2/2011 | Marquette et al. | |
| 7,908,687 | B2 | 3/2011 | Ward et al. | |
| 7,913,332 | B1 | 3/2011 | Barnhart | |
| 7,914,611 | B2 | 3/2011 | Vrzalik et al. | |
| 7,918,103 | B1 | 5/2011 | Purvis | |
| 7,937,789 | B2 | 5/2011 | Feher | |
| 7,950,084 | B1 | 5/2011 | McKay et al. | |
| 7,966,835 | B2 | 6/2011 | Petrovski | |
| 7,975,331 | B2 | 7/2011 | Flocard et al. | |
| 7,996,936 | B2 | 8/2011 | Marquette et al. | |
| 8,065,763 | B2 | 11/2011 | Brykalski et al. | |
| 8,118,920 | B2 | 2/2012 | Vrzalik et al. | |
| 8,143,554 | B2 | 3/2012 | Lofy | |
| 8,181,290 | B2 | 5/2012 | Brykalski et al. | |
| 8,191,187 | B2 | 6/2012 | Brykalski et al. | |
| 8,209,800 | B2 | 7/2012 | Shih | |
| 8,209,801 | B2 | 7/2012 | Shih | |
| 8,282,452 | B2 | 10/2012 | Grigsby et al. | |
| 8,332,975 | B2 | 12/2012 | Brykalski et al. | |
| 8,336,369 | B2 | 12/2012 | Mahoney | |
| 8,347,433 | B1 | 1/2013 | Shih | |
| 8,353,069 | B1 | 1/2013 | Miller | |
| 8,359,684 | B2 | 1/2013 | Yoon | |
| 8,359,871 | B2 | 1/2013 | Woods et al. | |
| 8,372,182 | B2 | 2/2013 | Vrzalik et al. | |
| 8,402,579 | B2 | 3/2013 | Marquette et al. | |
| 8,418,286 | B2 | 4/2013 | Brykalski et al. | |
| 8,418,290 | B2 | 4/2013 | Shih | |
| 8,444,558 | B2 | 5/2013 | Young et al. | |
| 8,484,777 | B2 | 7/2013 | Shih | |
| D691,118 | S | 10/2013 | Ingham et al. | |
| 8,575,518 | B2 | 11/2013 | Walsh | |
| D697,874 | S | 1/2014 | Stusynski et al. | |
| D698,338 | S | 1/2014 | Ingham | |
| 8,621,687 | B2 | 1/2014 | Brykalski et al. | |
| D701,536 | S | 3/2014 | Sakal | |
| 8,672,853 | B2 | 3/2014 | Young | |
| 8,732,874 | B2 | 5/2014 | Brykalski et al. | |
| 8,739,339 | B1 | 6/2014 | McKay et al. | |
| 8,769,747 | B2 | 7/2014 | Mahoney et al. | |
| 8,782,830 | B2 | 7/2014 | Brykalski et al. | |
| 8,893,329 | B2 | 11/2014 | Petrovski et al. | |
| 8,893,339 | B2 | 11/2014 | Fleury | |
| 8,931,329 | B2 | 1/2015 | Mahoney et al. | |
| 8,955,337 | B2 | 2/2015 | Parish et al. | |
| 8,966,689 | B2 | 3/2015 | McGuire et al. | |
| 8,973,183 | B1 | 3/2015 | Palashewski et al. | |
| 8,984,687 | B2 | 3/2015 | Stusynski et al. | |
| 9,044,366 | B2 | 7/2015 | Rawls-Meehan | |
| D737,250 | S | 8/2015 | Ingham et al. | |

(56) References Cited

U.S. PATENT DOCUMENTS 9,125,497 B2 9/2015 Brykalski et al.
9,131,780 B2 9/2015 Lachenbruch et al.
9,131,781 B2 9/2015 Zaiss et al.
9,186,479 B1 11/2015 Franceschetti et al.
9,198,796 B2 12/2015 Pierre et al.
9,222,685 B2 12/2015 Lachenbruch
9,247,831 B2 2/2016 Miles et al.
9,254,231 B2 2/2016 Vrzalik et al.
9,326,616 B2 5/2016 DeFranks et al.
9,370,457 B2 6/2016 Nunn et al.
9,392,879 B2 7/2016 Nunn et al.
9,474,384 B2 10/2016 Rawls-Meehan et al.
9,510,687 B2 12/2016 Lachenbruch
9,510,688 B2 12/2016 Nunn et al.
9,603,459 B2 3/2017 Brykalski et al.
9,622,588 B2 4/2017 Brykalski et al.
9,635,953 B2 5/2017 Nunn et al.
9,694,156 B2 7/2017 Franceschetti et al.
9,730,524 B2 8/2017 Chen et al.
9,737,154 B2 8/2017 Mahoney et al.
9,756,952 B2 9/2017 Alleto, Jr. et al.
9,756,953 B2 9/2017 DeFranks et al.
9,770,114 B2 9/2017 Brosnan et al.
9,797,632 B2 10/2017 Parish et al.
9,814,641 B2 11/2017 Brykalski et al.
9,820,581 B2 11/2017 Alletto et al.
9,835,344 B2 12/2017 Vrzalik et al.
9,844,277 B2 12/2017 Parish et al.
9,854,921 B2 1/2018 DeFranks et al.
D809,843 S 2/2018 Keeley et al.
9,888,782 B1 2/2018 Jannke
D812,393 S 3/2018 Karschnik et al.
9,907,407 B2 3/2018 Aramli
9,913,770 B2 3/2018 Lachenbruch et al.
9,924,813 B1 3/2018 Basten et al.
9,943,172 B2 4/2018 Lachenbruch et al.
9,974,394 B2 5/2018 Brykalski et al.
9,981,107 B2 5/2018 Franceschetti et al.
10,045,630 B2 8/2018 Parish et al.
10,047,981 B2 8/2018 Parish et al.
10,051,973 B2 8/2018 Morgan et al.
10,058,467 B2 8/2018 Stusynski et al.
10,092,242 B2 10/2018 Nunn et al.
10,104,982 B2 10/2018 Alletto et al.
10,143,312 B2 12/2018 Brosnan et al.
10,149,549 B2 12/2018 Erko et al.
10,161,642 B2 12/2018 Giraud et al.
10,182,661 B2 1/2019 Nunn et al.
10,194,752 B2 2/2019 Zaiss et al.
10,194,753 B2 2/2019 Fleury et al.
10,201,234 B2 2/2019 Nunn et al.
10,251,490 B2 4/2019 Nunn et al.
2007/0157388 A1 7/2007 Mossbeck et al.
2007/0236057 A1 10/2007 Smith
2008/0077020 A1 3/2008 Young et al.
2008/0148481 A1* 6/2008 Brykalski ............ A47C 21/048 5/423
2010/0011502 A1* 1/2010 Brykalski ................ A61G 7/05 5/423
2010/0043143 A1* 2/2010 O'Reagan .......... A61G 7/05746 5/421
2010/0170043 A1 7/2010 Young et al.
2011/0115635 A1* 5/2011 Petrovski ............. A47C 31/008 340/584
2011/0144455 A1 6/2011 Young et al.
2012/0036636 A1 2/2012 Stryker et al.
2012/0124752 A1 5/2012 Patrick
2012/0131748 A1 5/2012 Brykalski
2013/0340168 A1* 12/2013 Meyer .................... A61G 7/002 5/615
2014/0026320 A1 1/2014 Marquette et al.
2014/0182061 A1 7/2014 Zaiss
2014/0250597 A1 9/2014 Chen et al.
2014/0257571 A1 9/2014 Chen et al.
2014/0259410 A1 9/2014 Zerhusen et al.
2014/0259417 A1 9/2014 Nunn et al.
2014/0259418 A1 9/2014 Nunn et al.
2014/0259431 A1 9/2014 Fleury
2014/0259433 A1 9/2014 Nunn et al.
2014/0259434 A1 9/2014 Nunn et al.
2014/0277611 A1 9/2014 Nunn et al.
2014/0277778 A1 9/2014 Nunn et al.
2014/0277822 A1 9/2014 Nunn et al.
2014/0305625 A1 10/2014 Petrovski
2015/0007393 A1 1/2015 Palashewski
2015/0025327 A1 1/2015 Young et al.
2015/0026896 A1 1/2015 Fleury et al.
2015/0157137 A1 6/2015 Nunn et al.
2015/0157519 A1 6/2015 Stusynski et al.
2015/0182033 A1 7/2015 Brosnan et al.
2015/0182397 A1 7/2015 Palashewski et al.
2015/0182399 A1 7/2015 Palashewski et al.
2015/0182418 A1 7/2015 Zaiss
2015/0238020 A1 8/2015 Petrovski et al.
2015/0289667 A1* 10/2015 Oakhill .................. A47C 27/18 5/423
2015/0366366 A1 12/2015 Zaiss et al.
2016/0015184 A1 1/2016 Nunn et al.
2016/0066701 A1 3/2016 Diller et al.
2016/0100696 A1 4/2016 Palashewski et al.
2016/0242562 A1 8/2016 Karschnik et al.
2016/0325657 A1 11/2016 Zhang et al.
2016/0338871 A1 11/2016 Nunn et al.
2016/0367039 A1 12/2016 Young et al.
2017/0003666 A1 1/2017 Nunn et al.
2017/0028165 A1 2/2017 Franceschetti et al.
2017/0049243 A1 2/2017 Nunn et al.
2017/0071359 A1 3/2017 Petrovski et al.
2017/0191516 A1 7/2017 Griffith et al.
2017/0290437 A1 10/2017 Brykalski et al.
2017/0303697 A1 10/2017 Chen et al.
2017/0318979 A1 11/2017 Rawls-Meehan et al.
2017/0318980 A1 11/2017 Mahoney et al.
2017/0354268 A1 12/2017 Brosnan et al.
2018/0098637 A1 4/2018 Griese et al.
2018/0116415 A1 5/2018 Karschnik et al.
2018/0116418 A1 5/2018 Shakal et al.
2018/0116419 A1 5/2018 Shakal et al.
2018/0116420 A1 5/2018 Shakal
2018/0119686 A1 5/2018 Shakal et al.
2018/0125259 A1 5/2018 Peterson et al.
2018/0125260 A1 5/2018 Peterson et al.
2018/0140489 A1 5/2018 Brykalski et al.
2018/0213942 A1 8/2018 Marquette et al.
2018/0242753 A1 8/2018 Ghanei et al.
2018/0027981 A1 10/2018 Alletto et al.
2018/0289172 A1 10/2018 Alletto et al.
2019/0059603 A1 2/2019 Griffith et al.
2019/0082855 A1 3/2019 Brosnan et al.
2019/0104858 A1 4/2019 Erko et al.
2019/0125095 A1 5/2019 Nunn et al.
2019/0125097 A1 5/2019 Nunn et al.
2019/0200777 A1 7/2019 Demirli et al.
2019/0201265 A1 7/2019 Sayadi et al.
2019/0201266 A1 7/2019 Sayadi et al.
2019/0201267 A1 7/2019 Demirli et al.
2019/0201268 A1 7/2019 Sayadi et al.
2019/0201269 A1 7/2019 Sayadi et al.
2019/0201270 A1 7/2019 Sayadi et al.
2019/0201271 A1 7/2019 Grey et al.
2019/0206416 A1 7/2019 Demirli et al.
2019/0209405 A1 7/2019 Sayadi et al.

OTHER PUBLICATIONS

U.S. Appl. No. 14/675,355, Palashewski et al., filed Mar. 31, 2015.
U.S. Appl. No. 14/687,633, Brosnan et al., filed Apr. 15, 2015.
U.S. Appl. No. 14/819,630, Nunn et al., filed Aug. 6, 2015.
U.S. Appl. No. 14/885,751, Palashewski et al., filed Oct. 16, 2015.
U.S. Appl. No. 15/806,810, Gaunt, filed Nov. 8, 2017.
U.S. Appl. No. 16/122,480, Shutes et al., filed Sep. 5, 2018.
U.S. Appl. No. 16/233,339, Sayadi et al., filed Dec. 27, 2018.

(56) References Cited

OTHER PUBLICATIONS

U.S. Appl. No. 16/294,120, Sayadi et al., filed Mar. 6, 2019.
U.S. Appl. No. 29/583,852, Keeley, filed Nov. 9, 2016.
U.S. Appl. No. 29/676,117, Stusynski et al., filed Jan. 8, 2019.
U.S. Appl. No. 29/690,492, Stusynski et al., filed May 8, 2019.

* cited by examiner

BED WITH INTEGRATED COMPONENTS AND FEATURES

CROSS-REFERENCE TO RELATED APPLICATIONS

This application is a continuation of application of U.S. application Ser. No. 14/885,751, filed on Oct. 16, 2015, which claims priority to U.S. Provisional Application Ser. No. 62/064,860, filed Oct. 16, 2014. The entire contents of all of the above identified patent applications are hereby incorporated by reference.

TECHNICAL FIELD

This invention relates to beds, and more particularly to bed designs with integrated components and features.

BACKGROUND

People have traditionally used beds that come in many shapes, sizes, and styles. Such beds can range from extremely simple designs to rather complex designs that include a variety of features. For example, some beds include mattresses that include foam, inner-springs, fluid-inflatable bladders, other materials, or combinations thereof. Such mattresses may or may not be supported by a frame, box spring, adjustable foundation, non-adjustable foundation, or other support structure.

In some cases, one or more additional features or systems have been used in conjunction with beds. For example, users have used heating and cooling systems for heating or cooling users in bed. Such systems can be cumbersome and unwieldy, which can increase the difficulty of installing and using such systems.

SUMMARY

In general, one innovative aspect of the subject matter described in this specification can be embodied in a bed system including a mattress, a foundation, and an air system. The foundation can be positioned under and supporting the mattress. The foundation can include a compartment and a foundation lid that is movable from a closed position in which the compartment is substantially closed and an open position in which the compartment is open. The air system can include an air source and an air outlet connectable to an air inlet of the mattress. The air outlet can be connected to the air inlet via the foundation lid moving to the closed position and the air outlet can be disconnected from the air inlet via the foundation lid moving to the open position.

In another embodiment, a bed system includes a mattress having a first portion and a second portion and an adjustable foundation for supporting the mattress. The adjustable foundation can include a mechanical bed actuator movable between a raised position in which the first portion of the mattress is raised and a lowered position in which the first portion of the mattress is lowered. The second portion of the mattress can remain substantially stationary when the mechanical bed actuator moves between the raised position and the lowered position. An air system can include an air source and an air hose extending from the air source to the mattress. The air hose can be fluidically connected to the mattress at the second portion of the mattress.

In another embodiment, a foundation for a bed system can include a foundation structure having a head, a foot, a first side, and a second side. A first air source can be configured for supplying conditioned air to a first mattress user side. A second air source can be configured for supplying conditioned air to a second mattress user side. An air pump can be configured for supplying air to and inflating mattress air chambers. A central power hub can be electrically connected to and configured to deliver electrical power to each of the first air source, the second air source, and the air pump. The first and second air sources and the central power hub can be housed within the foundation structure. The air pump can be housed within the foundation structure proximate the foot of the foundation structure.

In another embodiment, a foundation for a bed system can include a foundation structure having a head, a foot, a first side, and a second side. An air pump configured for supplying air to and inflating at least one mattress air chamber can be housed within the foundation structure proximate the foot of the foundation structure. A control box and a central power hub can be housed within the foundation structure. The central power hub can be electrically connected to and configured to deliver electrical power to each of the air pump, the control box, and one or more additional electrical components. The foundation can optionally integrate other components into the foundation.

Implementations can include any, all, or none of the following features. The central power hub includes a high voltage power system electrically connected to the air pump and the control box for delivering AC (alternating current) power to the air pump and the control box and a low voltage power system extending from the control box and configured for delivering DC (direct current) power to the one or more additional electrical components. The air pump includes a controller in communication with the control box. The air pump is configured for receiving control signals and communicating the control signals to the control box for controlling operation of the one or more additional electrical components. The controller of the air pump is connected in wireless communication with the control box and the control box is connected in wired communication with the one or more additional electrical components. At least one of the additional electrical components includes an actuation motor for an adjustable bed system. The control box is an adjustable control box electrically connected to the actuation motor for controlling the actuation motor. At least one other of the additional electrical components includes a component configured for use in a system other than the adjustable bed system. The component configured for use in a system other than the adjustable bed system comprises a light source and lens for an under-bed lighting system. The high voltage power system includes a high voltage power cable extending from a head of the foundation to a foot of the foundation along a component of the foundation so as to substantially conceal the high voltage power cable from view during normal operation. The low voltage power system includes a set of low voltage power cables extending from the control box along a plurality of components of the foundation so as to substantially conceal the low voltage power cables from view during normal operation. The low voltage power cables and the high voltage power cable each include multiple connectors at ends thereof for detachably and reattachably making electrical connections. A plurality of deck panels can be positioned for supporting a mattress. A first deck panel can define a passage configured to allow an air hose to extend from the air pump below the first deck panel to supply air to an air chamber of a mattress above the first deck panel and the first deck panel can be spaced from the air pump by a second deck panel. The second deck panel is an articulating deck panel positioned above the air pump and connected to an adjustable bed system for raising and lowering the second deck panel, and wherein the first deck panel remains substantially stationary when the adjustable bed system articulates the second panel. A compartment can be positioned proximate a foot of the foundation, wherein the control box and the air pump are positioned in the compartment. The compartment includes a cover that at least partially conceals the control box and the air pump even when a foot of the foundation is actuated to a raised position. The cover is pivotably connected to a sub frame of the foundation so as to be openable when a foot of the foundation is actuated to a raised position so as to allow access to the control box and the air pump for servicing the control box and/or the air pump. A sub frame can have a plurality of interconnected supports. A plurality of rails can be connected to the sub frame, wherein the rails are positioned proximate a perimeter of the foundation. The rails comprise first and second side rails and the interconnected supports comprise first and second supports extending substantially parallel to the side rails and positioned inward of and spaced from the side rails. A plurality of adjustable legs can be connected to the sub frame at positions spaced inward of a perimeter of the foundation. Each of the adjustable legs can include a sleeve and a pole slidably connected to and extending at least partially in the sleeve, wherein a spring detent mechanism is configured to selectively adjust height of the legs as the pole slides with respect to the sleeve. A plurality of aesthetic legs can be connected at a perimeter of the foundation, wherein the foundation is configurable such that a majority of the load of the foundation can be supported by the adjustable legs such that less or no load need be supported by the aesthetic legs.

These and other embodiments can each optionally include one or more of the features described below. Particular embodiments of the subject matter described in this specification can be implemented so as to realize none, one or more of the advantages described below.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
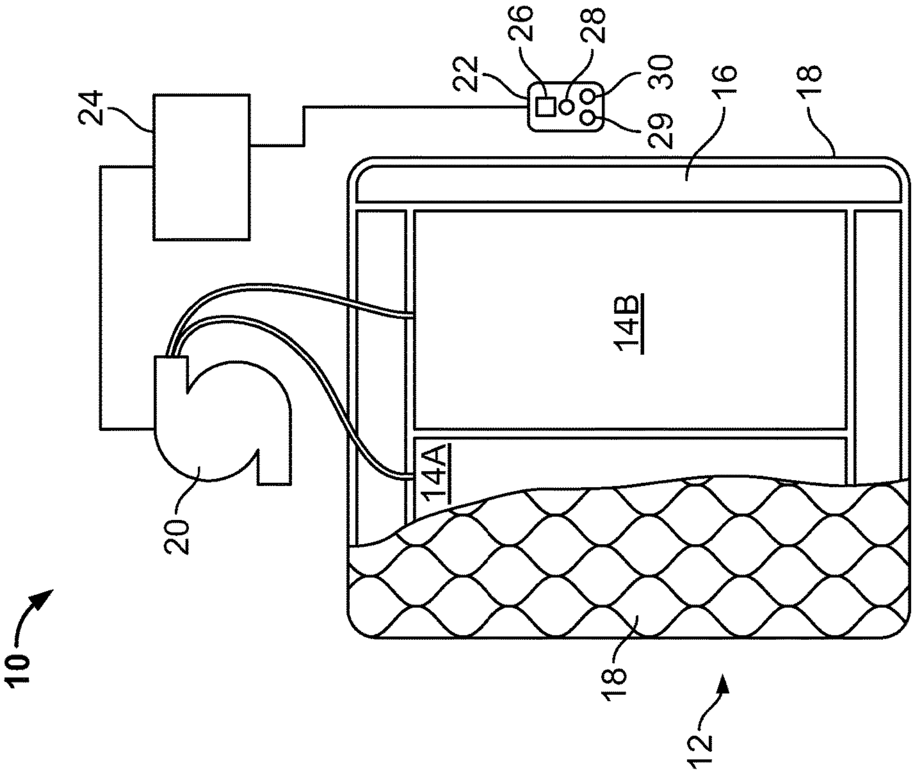
FIG. 1 shows an example air bed system.

FIG. 1 shows an example air bed system 10 that includes a bed 12. The bed 12 includes at least one air chamber 14 surrounded by a resilient border 16 and encapsulated by bed ticking 18. The resilient border 16 may comprise any suitable material, such as foam.

As illustrated in FIG. 1, the bed 12 can be a two chamber design having first and second fluid chambers, such as a first air chamber 14A and a second air chamber 14B. In alternative embodiments, the bed 12 can include chambers for use with fluids other than air that are suitable for the application. First and second air chambers 14A and 14B can be in fluid communication with a pump 20. The pump 20 can be in electrical communication with a remote control 22 via control box 24. The control box 24 can include a wired or wireless communications interface for communicating with one or more devices, including the remote control 22. The control box 24 can be configured to operate the pump 20 to cause increases and decreases in the fluid pressure of the first and second air chambers 14A and 14B based upon commands input by a user using the remote control 22. In some implementations, the control box 24 is integrated into a housing of the pump 20.

The remote control 22 may include a display 26, an output selecting mechanism 28, a pressure increase button 29, and a pressure decrease button 30. In some embodiments, the remote control 22 can be a dedicated device for controlling as described herein. In other embodiments, the remote control 22 can be a mobile device such as a smart phone or a tablet computer running an application. The output selecting mechanism 28 may allow the user to switch air flow generated by the pump 20 between the first and second air chambers 14A and 14B, thus enabling control of multiple air chambers with a single remote control 22 and a single pump 20. For example, the output selecting mechanism 28 may by a physical control (e.g., switch or button) or an input control displayed on display 26. Alternatively, separate remote control units can be provided for each air chamber and may each include the ability to control multiple air chambers. Pressure increase and decrease buttons 29 and 30 may allow a user to increase or decrease the pressure, respectively, in the air chamber selected with the output selecting mechanism 28. Adjusting the pressure within the selected air chamber may cause a corresponding adjustment to the firmness of the respective air chamber.

Figure 2:
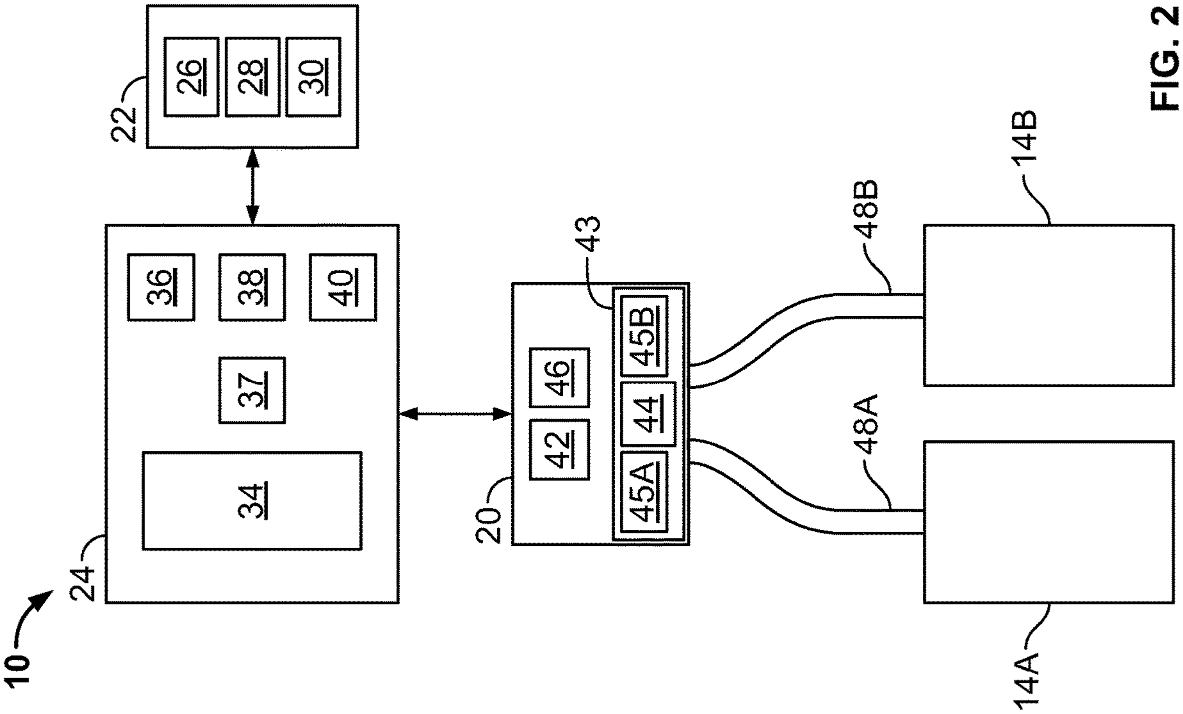
FIG. 2 is a block diagram of various components of the air bed system of FIG. 1, according to an example.

FIG. 2 is a block diagram detailing data communication between certain components of the example air bed system 10 according to various examples. As shown in FIG. 2, the control box 24 may include a power supply 34, a processor 36, a memory 37, a switching mechanism 38, and an analog to digital (A/D) converter 40. The switching mechanism 38 can be, for example, a relay or a solid state switch. In some implementations, the switching mechanism 38 can be located in the pump 20 rather than the control box 24.

The pump 20 and the remote control 22 are in two-way communication with the control box 24. The pump 20 includes a motor 42, a pump manifold 43, a relief valve 44, a first control valve 45A, a second control valve 45B, and a pressure transducer 46. The pump 20 is fluidly connected with the first air chamber 14A and the second air chamber 14B via a first tube 48A and a second tube 48B, respectively. The first and second control valves 45A and 45B can be controlled by switching mechanism 38, and are operable to regulate the flow of fluid between the pump 20 and first and second air chambers 14A and 14B, respectively.

In some implementations, the pump 20 and the control box 24 can be provided and packaged as a single unit. In some alternative implementations, the pump 20 and the control box 24 can be provided as physically separate units.

The example air bed system 10 depicted in FIG. 2 includes the two air chambers 14A and 14B and the single pump 20. However, other implementations may include an air bed system having two or more air chambers and one or more pumps incorporated into the air bed system to control the air chambers. For example, a separate pump can be associated with each air chamber of the air bed system or a pump can be associated with multiple chambers of the air bed system. Separate pumps may allow each air chamber to be inflated or deflated independently and simultaneously. Furthermore, additional pressure transducers may also be incorporated into the air bed system such that, for example, a separate pressure transducer can be associated with each air chamber.

In use, the processor 36 can, for example, send a decrease pressure command to one of air chambers 14A or 14B, and the switching mechanism 38 can be used to convert the low voltage command signals sent by the processor 36 to higher operating voltages sufficient to operate the relief valve 44 of the pump 20 and open the control valve 45A or 45B. Opening the relief valve 44 may allow air to escape from the air chamber 14A or 14B through the respective air tube 48A or 48B. During deflation, the pressure transducer 46 may send pressure readings to the processor 36 via the A/D converter 40. The A/D converter 40 may receive analog information from pressure transducer 46 and may convert the analog information to digital information useable by the processor 36. The processor 36 may send the digital signal to the remote control 22 to update the display 26 in order to convey the pressure information to the user.

As another example, the processor 36 can send an increase pressure command. The pump motor 42 can be energized in response to the increase pressure command and send air to the designated one of the air chambers 14A and 14B through the air tube 48A or 48B via electronically operating the corresponding valve 45A or 45B. While air is being delivered to the designated air chamber 14 A or 14B in order to increase the firmness of the chamber, the pressure transducer 46 may sense pressure within the pump manifold 43. Again, the pressure transducer 46 may send pressure readings to the processor 36 via the A/D converter 40. The processor 36 may use the information received from the A/D converter 40 to determine the difference between the actual pressure in air chamber 14A or 14B and the desired pressure. The processor 36 may send the digital signal to the remote control 22 to update display 26 in order to convey the pressure information to the user.

Generally speaking, during an inflation or deflation process, the pressure sensed within the pump manifold 43 can provide an approximation of the pressure within the respective air chamber that is in fluid communication with the pump manifold 43. An example method of obtaining a pump manifold pressure reading that is substantially equivalent to the actual pressure within an air chamber includes turning off pump 20, allowing the pressure within the air chamber 14A or 14B and the pump manifold 43 to equalize, and then sensing the pressure within the pump manifold 43 with the pressure transducer 46. Thus, providing a sufficient amount of time to allow the pressures within the pump manifold 43 and chamber 14A or 14B to equalize may result in pressure readings that are accurate approximations of the actual pressure within air chamber 14A or 14B. In some implementations, the pressure of the air chambers 14A and/or 14B can be continuously monitored using multiple pressure sensors.

In some implementations, information collected by the pressure transducer 46 can be analyzed to determine various states of a person lying on the bed 12. For example, the processor 36 can use information collected by the pressure transducer 46 to determine a heart rate or a respiration rate for a person lying in the bed 12. For example, a user can be lying on a side of the bed 12 that includes the chamber 14A. The pressure transducer 46 can monitor fluctuations in pressure of the chamber 14A and this information can be used to determine the user's heart rate and or respiration rate. As another example, additional processing can be performed using the collected data to determine a sleep state of the person (e.g., awake, light sleep, deep sleep). For example, the processor 36 may determine when a person falls asleep and, while asleep, the various sleep states of the person.

Additional information associated with a user of the bed system 10 that can be determined using information collected by the pressure transducer 46 includes motion of the user, presence of the user on a surface of the bed 12, heart arrhythmia of the user, and apnea. Taking user presence detection for example, the pressure transducer 46 can be used to detect the user's presence on the bed 12, e.g., via a gross pressure change determination and/or via one or more of a respiration rate signal, heart rate signal, and/or other biometric signals. For example, a simple pressure detection process can identify an increase in pressure as an indication that the user is present in the bed 12. As another example, the processor 36 can determine that the user is present in the bed 12 if the detected pressure increases above a specified threshold (so as to indicate that a person or other object above a certain weight is positioned on the bed 12). As yet another example, the processor 36 can identify an increase in pressure in combination with detected slight, rhythmic fluctuations in pressure as corresponding to the user being present on the bed 12. The presence of rhythmic fluctuations can be identified as being caused by respiration or heart rhythm (or both) of the user. The detection of respiration or a heartbeat can distinguish between the user being present on the bed and another object (e.g., a suit case) being placed upon the bed.

With regard to sleep state, system 10 can determine a user's sleep state by using various biometric signals such as heart rate, respiration, and/or movement of the user. While the user is sleeping, the processor 36 can receive one or more of the user's biometric signals, e.g., heart rate, respiration, and motion, and determine the user's present sleep state based on the received biometric signals.

For example, the pressure transducer 46 can be used to monitor the air pressure in the chambers 14A and 14B of the bed 12. If the user on the bed 12 is not moving, the air pressure changes in the air chamber 14A or 14B can be relatively minimal, and can be attributable to respiration and heartbeat. When the user on the bed 12 is moving, however, the air pressure in the mattress may fluctuate by a much larger amount. Thus, the pressure signals generated by the pressure transducer 46 and received by the processor 36 can be filtered and indicated as corresponding to motion, heartbeat, or respiration.

In some implementations, rather than performing the data analysis in the control box 24 with the processor 36, a digital signal processor (DSP) can be provided to analyze the data collected by the pressure transducer 46. Alternatively, the data collected by the pressure transducer 46 could be sent to a cloud-based computing system for remote analysis.

In some implementations, the example air bed system 10 further includes a temperature controller configured to increase, decrease, or maintain the temperature of a user. For example, a pad can be placed on top of or be part of the bed 12, or can be placed on top of or be part of one or both of the chambers 14A and 14B. Air can be pushed through the pad and vented to cool off a user of the bed. Conversely, the pad may include a heating element that can be used to keep the user warm. In some implementations, the temperature controller can receive temperature readings from the pad. In some implementations, separate pads are used for the different sides of the bed 12 (e.g., corresponding to the locations of the chambers 14A and 14B) to provide for differing temperature control for the different sides of the bed.

In some implementations, the user of the system 10 can use an input device, such as the remote control 22 to input a desired temperature for the surface of the bed 12 (or for a portion of the surface of the bed 12). The desired temperature can be encapsulated in a command data structure that includes the desired temperature as well as identifies the temperature controller as the desired component to be controlled. The command data structure may then be transmitted via Bluetooth or another suitable communication protocol to the processor 36. In various examples, the command data structure is encrypted before being transmitted. The temperature controller may then configure its elements to increase or decrease the temperature of the pad depending on the temperature input into remote control 22 by the user.

In some implementations, data can be transmitted from a component back the processor 36 or to one or more display devices, such as the display 26. For example, the current temperature as determined by a sensor element of temperature controller, the pressure of the bed, the current position of the foundation or other information can be transmitted to control box 24. The control box 24 may then transmit the received information to remote control 22 where it can be displayed to the user (e.g., on the display 26).

Figure 3:
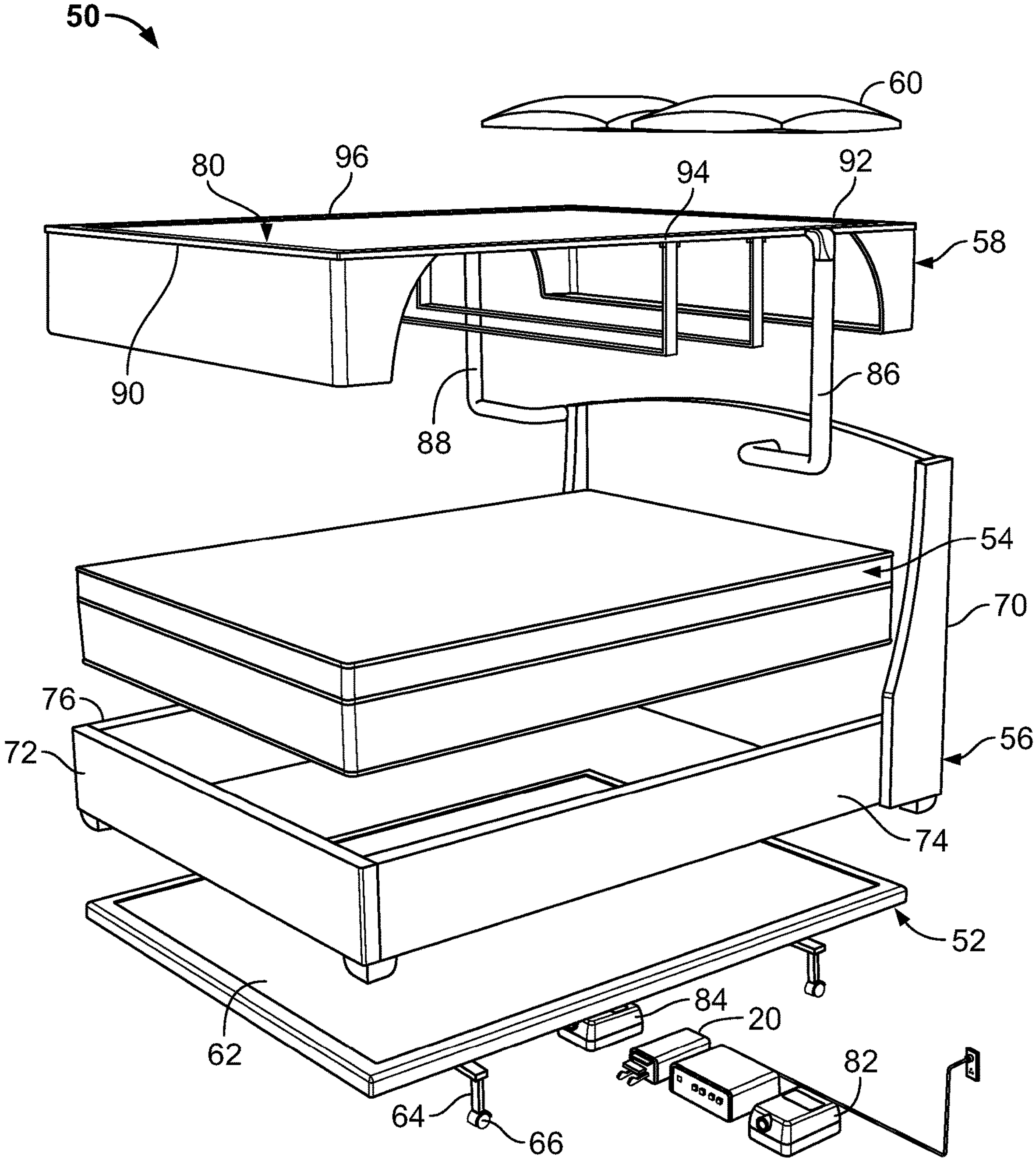
FIG. 3 is an exploded perspective view of an alternative embodiment of a bed system.

FIG. 3 is an exploded perspective view of a bed system 50, which includes a foundation 52, a mattress 54, a surround 56, a dual temperature system 58, and pillows 60.

In the illustrated embodiment, the foundation 52 is a non-adjustable foundation upon which the mattress 54 rests and includes a foundation support surface 62, a foundation frame 64, and foundation casters 66. The foundation support surface 62 provides a relatively flat surface for supporting the mattress 54. The foundation frame 64 is connected to and supports the foundation support surface 62 for raising the foundation support surface 62 from the floor. The casters 66 are connected to the foundation frame 64 and provide a rolling mechanism to allow the bed system 50 to be moved.

In alternative embodiments, the foundation 52 can be modified to be an adjustable foundation capable of raising and lowering portions of the mattress 54, such as the head and the foot of the mattress 54. In such embodiments, the foundation 52 can include an articulation controller (not shown) configured to adjust the position of the mattress 54 by adjusting the foundation support surface 62 that supports the mattress 54. For example, the articulation controller can adjust the mattress 54 from a flat position to a position in which a head portion of the mattress 54 is inclined upward (e.g., to facilitate a user sitting up in bed and/or watching television). In some implementations, the foundation 52 and the mattress 54 include multiple separately articulable sections. For example, portions of the mattress 54 corresponding to the locations of the chambers 14A and 14B (shown in FIGS. 1 and 2) can be articulated independently from each other to allow one person positioned on the mattress 54 to rest in a first position (e.g., a flat position) while a second person rests in a second position (e.g., an reclining position with the head raised at an angle from the waist). In some implementations, separate positions can be set for two different beds (e.g., two twin beds placed next to each other). The foundation 52 may include more than one zone that can be independently adjusted. The articulation controller may also be configured to provide different levels of massage to one or more users the bed system 50 via vibrating the mattress 54.

In the illustrated embodiment, the mattress 54 is a mattress of an air bed system, such as the air bed system 10 (shown in FIGS. 1 and 2). The mattress 54 can include multiple air chambers 14A and 14B (shown in FIGS. 1 and 2) that can be inflated and deflated via the pump 20. In alternative embodiments, the pump 20 and the air chambers 14A and 14B can be omitted.

The surround 56 is a furniture surround that includes a headboard 70, a footboard 72, and sideboards 74 and 76. The surround 56 surrounds and at least partially contains the foundation 52 and the mattress 54. The surround 56 can be an aesthetically pleasing structure that at least partially obstructs vision of other portions of the bed system 50, such as portions of the foundation 52 and the mattress 54.

The dual temperature system 58 is an air system for generating conditioned (including hot/warm and cold/cool) air. The dual temperature system 58 includes a dual temperature layer 80, dual temperature air units 82 and 84, and air hoses 86 and 88 connecting the dual temperature layer 80 to the dual temperature air units 82 and 84, respectively. In the illustrated embodiment, the dual temperature layer 80 is a substantially flat air-permeable layer defined by four edges, including a foot edge 90 nearest the footboard 72, a head edge 92 opposite of the foot edge 90 and nearest the headboard 70, and two opposing side edges 94 and 96 extending from the foot edge 90 to the head edge 92.

In the illustrated embodiment, the air hose 86 is attached to the dual temperature layer 80 at the side edge 94 between the foot edge 90 and the head edge 92, nearer the head edged 92 than the foot edge 90. The air hose 88 is attached to the dual temperature layer 80 at the side edge 96 between the foot edge 90 and the head edge 92, nearer the head edged 92 than the foot edge 90. Connecting the air hoses 86 and 88 to the dual temperature layer 80 at the side edges 94 and 96, as opposed to at the head edge 92, can allow for a smaller gap between the mattress 54 and the headboard 70. This can be especially beneficial for articulating beds that allow for the head of the mattress 54 to be raised and lowered.

The air hose 86 can extend from the dual temperature layer 80 to the dual temperature unit 82 along a side of the mattress 54, between the mattress 54 and the sideboard 74. Similarly, the air hose 88 can extend from the dual temperature layer 80 to the dual temperature unit 84 along a side of the mattress 54, between the mattress 54 and the sideboard 76. This configuration can allow for the air hoses 86 and 88 to be partially or completely obscured from vision when the mattress 54 and dual temperature layer 80 are covered by a standard fitted bed sheet (not shown).

Figure 4A:
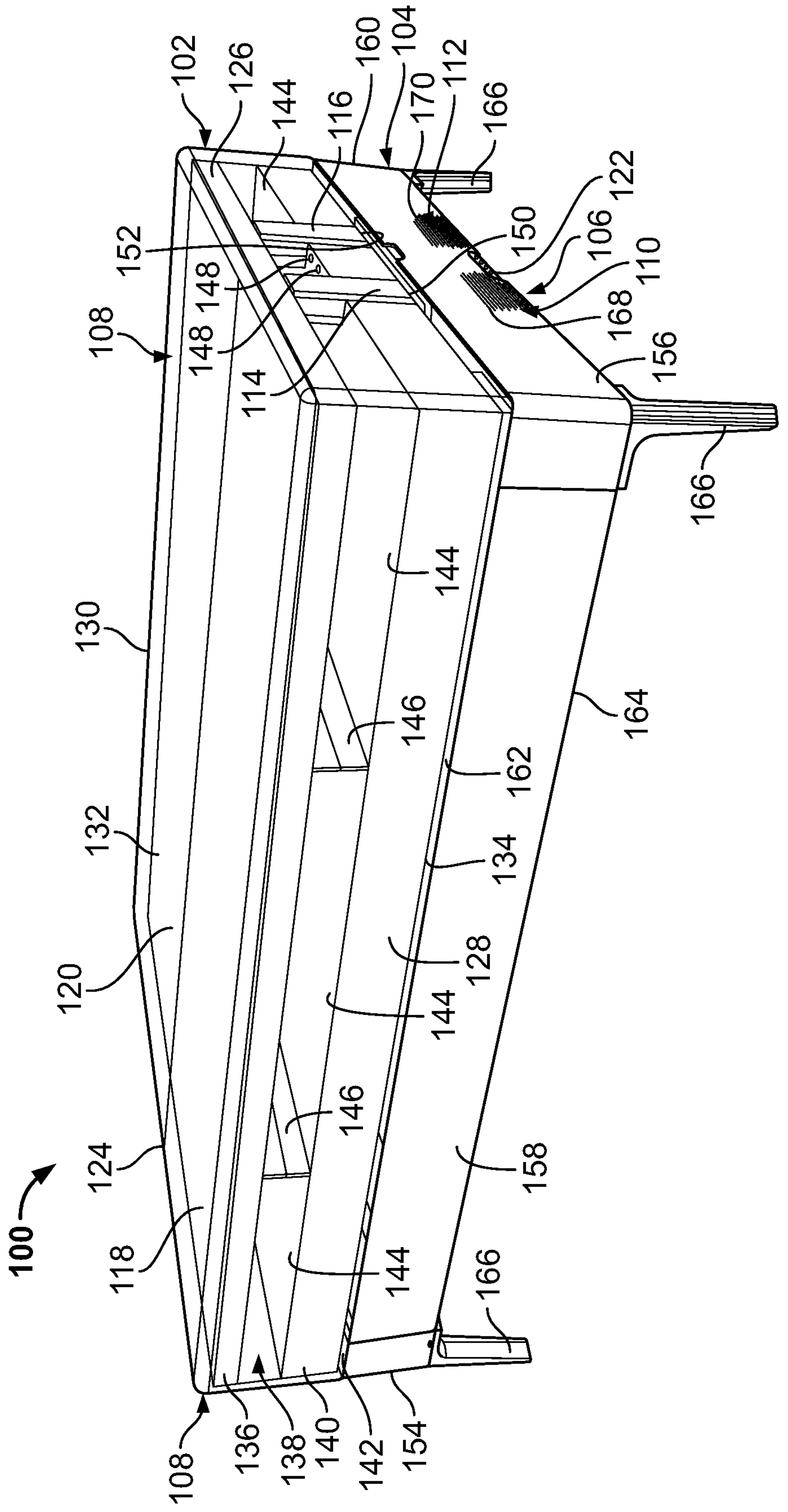
FIG. 4A is a perspective view of another alternative embodiment of a bed system.

FIG. 4A is a perspective view of a bed system 100, which is an alternative embodiment of the bed system 50 (shown in FIG. 3). The bed system 100 includes a mattress 102 and a foundation 104 integrated into a common system. The bed system 100 can include some or all of the components of the bed system 50 integrated into one or both of the mattress 102 and the foundation 104.

For example, a dual temperature system 106 is integrated into both the mattress 102 and the foundation 104. The dual temperature system 106 includes a dual temperature layer 108, dual temperature air units 110 and 112, and air hoses 114 and 116 connecting first and second sides 118 and 120 of the dual temperature layer 108 to the dual temperature air units 110 and 112, respectively. The dual temperature system 106 also includes a user interface 122, which in the illustrated embodiment comprises a set of status lights to show the operating status of the dual temperature system 106. The dual temperature system 106 can operate substantially as described with respect to the dual temperature system 58 (shown in FIG. 3) but as integrated within the bed system 100.

The mattress 102 has a head 124, a foot 126, sides 128 and 130, a top 132, and a bottom 134. The mattress 102 includes a number of layers. In the illustrated embodiment, the mattress 102 includes the dual temperature layer 108 at the top 132 of the mattress 102, a foam layer 136 below the dual temperature layer 108, a bladder layer 138 below the foam layer 136, a foam layer 140 below the bladder layer 138, and a rigid base layer 142 below the foam layer 140. The rigid base layer 142 can include one or more rigid support structures for supporting the other layers of the mattress 102. In alternative embodiments, the mattress 102 can include more or fewer layers than illustrated in FIG. 4A. For example, the mattress 102 can include additional foam layers and or an inner-spring layer. While the mattress 102 is illustrated as including the rigid base layer 142, in an alternative embodiment the rigid base layer 142 can be omitted, and instead the mattress 102 can be rigidly supported by one or more components of the foundation 104. In embodiments where the mattress 102 is integrated with the foundation 104, the rigid base layer 102 can be considered to be part of the mattress 102, part of the foundation 104, or simply a base that is used with both the mattress 102 and the foundation 104. While the mattress 102 is illustrated as including the dual temperature layer 108 as part of the mattress 102, in an alternative embodiment the dual temperature layer 108 can be separate from the mattress 102 and can instead rest on the top 132 of the mattress 102.

The air bladder layer 138 includes a plurality of air chambers 144 in fluid communication with one or more pumps, such as the pump 20 (shown in FIGS. 1-3). In the illustrated embodiment, the air bladder layer 138 includes three air chambers 144 adjacent the side 128 of the mattress 102 for supporting a first user and includes three air chambers 144 (only one of which is shown in FIG. 3) adjacent the side 130 of the mattress 102 for supporting a second user. The air chambers 144 are separated by partitions 146. The various partitions 146 may be air-tight or may be at least partially air-permeable depending on the application of whether it is desirable for any particular air chamber 144 to be sealed from an adjacent air chamber 144. The pump 20 can move air in our out of the air chambers 144 through one or more air chamber ducts 148 extending through one or both of the rigid base layer 142 and the foam layer 140 of the mattress 102 to the air chambers 144.

The air hoses 114 and 116 are ducts extending through the mattress 102 to fluidically connect the dual temperature air units 110 and 112 to the first and second sides 118 and 120 of the dual temperature layer 108. The air hoses 114 and 116 have inlets 150 and 152 at the bottom 134 of the mattress 102 to interface with outlets of the dual temperature air units 110 and 112. In the illustrated embodiment, the air hoses 114 and 116 extend along the exterior of the mattress 102 at the foot 126 of the mattress 102. In alternative embodiments, the air hoses 114 and 116 can extend along the exterior of the mattress at a central region of the mattress 102. For example, the air hose 114 can extend along the exterior of the mattress 102 at the side 128 of the mattress 102 adjacent a central one of the air chambers 144 and the air hose 116 can extend along the exterior of the mattress 102 at the side 130 of the mattress 102 adjacent another central one of the air chambers 144. In embodiments where the mattress 102 is articulable with portions (such as the head 124 and the foot 126) that can be raised and lowered, the air hoses 114 and 116 can extend along the exterior portions of the mattress 102 that are not articulable or that articulate relatively little compared to other portions of the mattress 102.

The foundation 104 has a head 154, a foot 156, sides 158 and 160, a top 162, and a bottom 164. The foundation 104 includes legs 166 extending from the bottom 164 of the foundation 104 to support the foundation 104. The foundation 104 supports the mattress 102, with the bottom 134 of the mattress 102 adjacent to and resting on the top 162 of the foundation 104.

The foundation 104 can house various components of the bed system 100, including the dual temperature air units 110 and 112 as well as the pump 20 (not shown in FIG. 4A). In the illustrated embodiment, the dual temperature air units 110 and 112 can be housed in the foundation 104 near the foot 156 of the foundation 104. In some applications, the dual temperature air units 110 and 112 can be somewhat noisy, and incorporating the dual temperature air units 110 and 112 into the foundation 104 can increase the amount of noise heard by the users while lying on the mattress 102. Such noise can be mitigated by locating the dual temperature air units 110 and 112 toward the foot 156 of the foundation and by including sound dampening material and/or barriers (not shown) to further reduce such noise. The foundation 104 includes dual temperature air inlets 168 and 170 at the foot 156 of the foundation 104 for supplying air to the dual temperature air units 110 and 112. Exhaust outlets (not shown) can be positioned on the bottom 164 of the foundation 104 for exhausting waste air from the dual temperature air units 110 and 112. In alternative embodiments, the dual temperature air units 110 and 112 can be positioned elsewhere in the bed system 100 (such as in the mattress 102 or below the foundation 104) so long as any noise of the dual temperature air units 110 and 112 can be suitably mitigated for the enjoyment of the user.

Figure 4B:
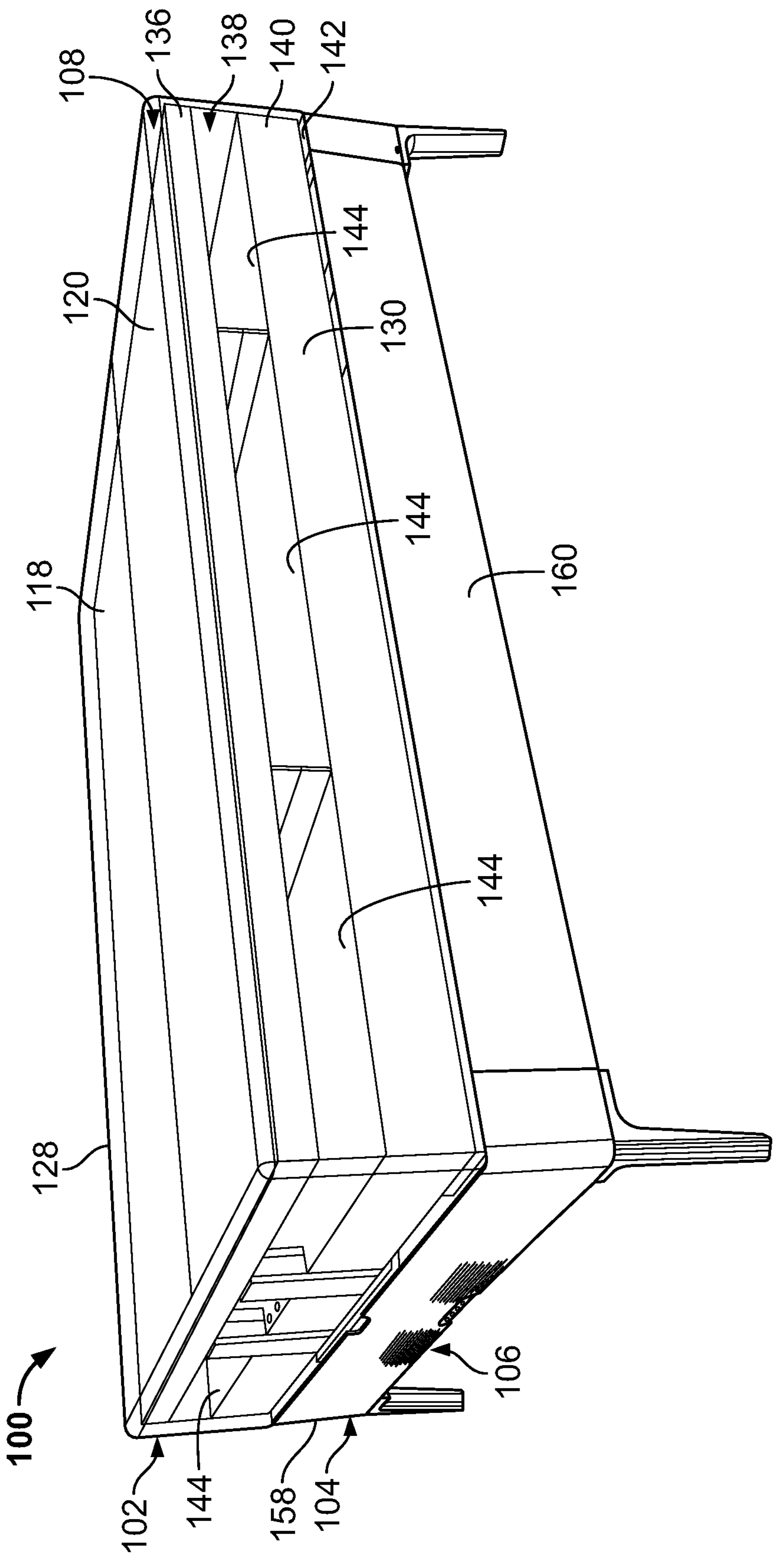
FIG. 4B is another perspective view of the bed system of FIG. 4A.

FIG. 4B is another perspective view of the bed system 100 shown from a different angle than that of FIG. 4A. The bed system 100 is substantially a mirror image about a centerline axis of the bed system 100.

Figure 5:
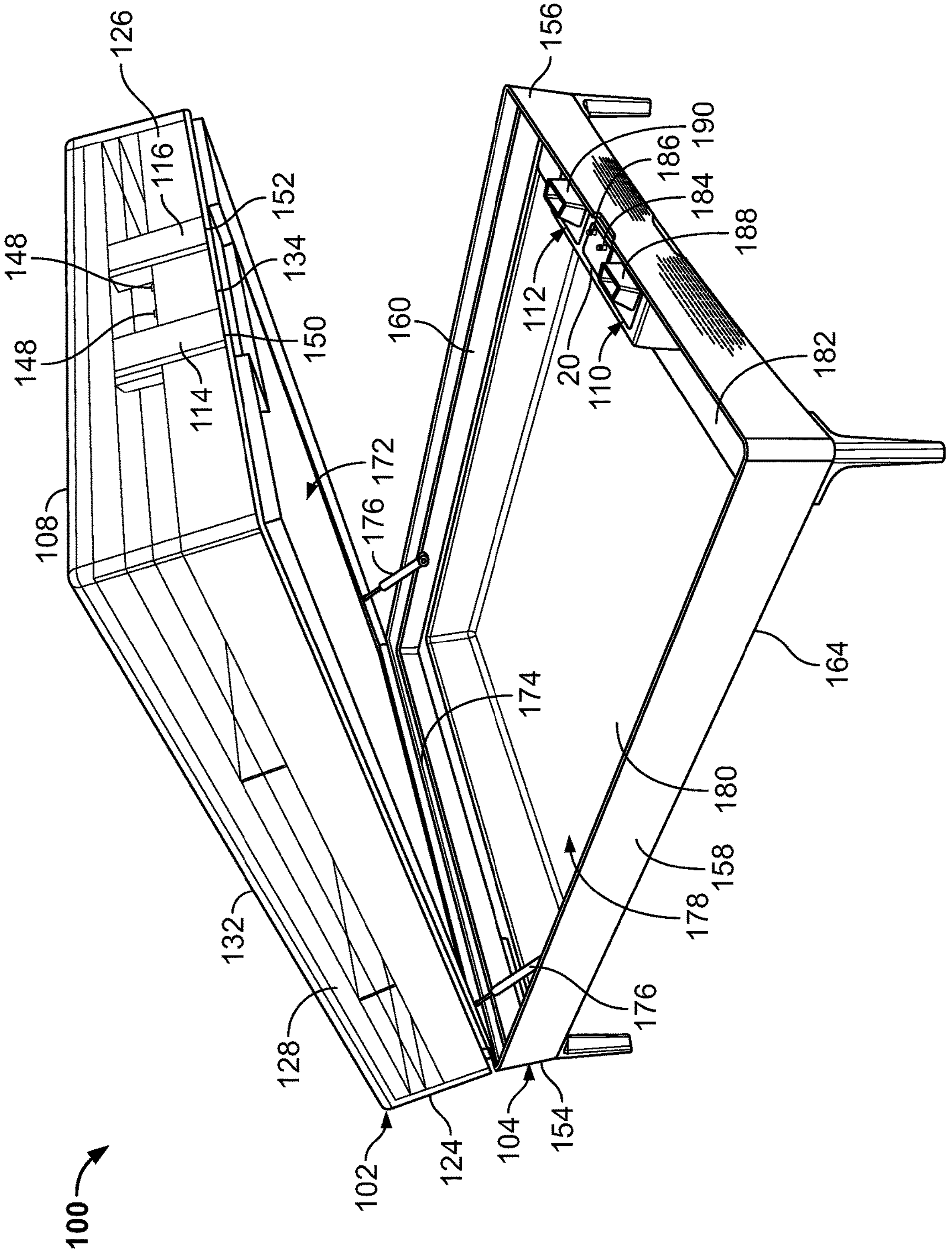
FIG. 5 is a perspective view of the bed system of FIG. 4A with a foundation in an open position.

FIG. 5 is a perspective view of the bed system 100 with the foundation 104 having a foundation lid 172 in an open position. The foundation lid 172 supports the mattress 102 and allows the mattress 102 to be hingedly connected to the foundation 104. In the illustrated embodiment, a hinge mechanism 174 connects to the foundation lid 172 near the head 124 of the mattress 102 to the head 154 of the foundation 104 so as to allow the mattress 102 to be raised and to pivot about the hinge mechanism 174. One or more springs 176 can be included to provide lift assistance with raising the mattress 102. In the illustrated embodiment, the springs 176 are gas springs extending from the sides 158 and 160 of the foundation 104 to the foundation lid 172 near the head 124 of the mattress 102. In alternative embodiment, the springs 76 can be one or more springs configured differently as suitable for the application.

The mattress 102 is pivotably connected to the foundation 104 such that the foundation lid 172 and the mattress 102 can be lifted to open the bed system 100 and expose a compartment 178 in the foundation 104. In the illustrated embodiment, the compartment 178 spans much of the interior of the foundation 104 and includes a basin 180 defining a bottom of the compartment 178 and a ledge 182 extending around an edge the basin 180. The compartment 178 allows users to store bedding items, including extra pillows, sheets, and blankets, as well as personal items such as clothing, etc. (not shown). In one embodiment, the basin 180 and ledge 182 can be integrally formed of a polymer material in a heat-molding process with a felt surface on a top of both the basin 180 and the ledge 182.

With the bed system 100 in the open position, the pump system 20 can be seen having a pair of pump air outlets 184 and 186. The pump air outlets 184 and 186 connect to the air chamber ducts 148 in the mattress 102 to distribute air from the pump system 20 to the air bladder layer 138 when the bed system 100 is in the closed position (shown in FIGS. 4A and 4B). When the bed system 100 is in the open position exposing the compartment 178, the pump air outlets 184 and 186 can be disconnected from the air chamber ducts 148 of the mattress 102.

With the bed system 100 in the open position, the dual temperature air units 110 and 112 can be seen having dual temperature air outlets 188 and 190, respectively. The dual temperature air outlets 188 and 190 connect to the air hoses 114 and 116 to distribute air from the dual temperature air units 110 and 112 to the dual temperature layer 108 when the bed system 100 is in the closed position (shown in FIGS. 4A and 4B). When the bed system 100 is in the open position exposing the compartment 178, the dual temperature air outlets 188 and 190 are disconnected from the air hoses 114 and 116 of the mattress 102.

In embodiments where the bed system 100 is an adjustable bed system, the dual temperature air outlets 188 and 190 and the pump air outlets 184 and 186 can be sized and shaped to remain connected to the air hoses 114 and 116 and the air chamber ducts 148 of the mattress 102 when the foot 126 of the mattress 102 is articulated and raised upwards. For example, the dual temperature air outlets 188 and 190 and the pump air outlets 184 and 186 can be lengthened to and/or extendable to about twelve inches in embodiments that allow the foot 126 of the mattress 102 to be raised by about twelve inches during adjustment.

Figure 6:
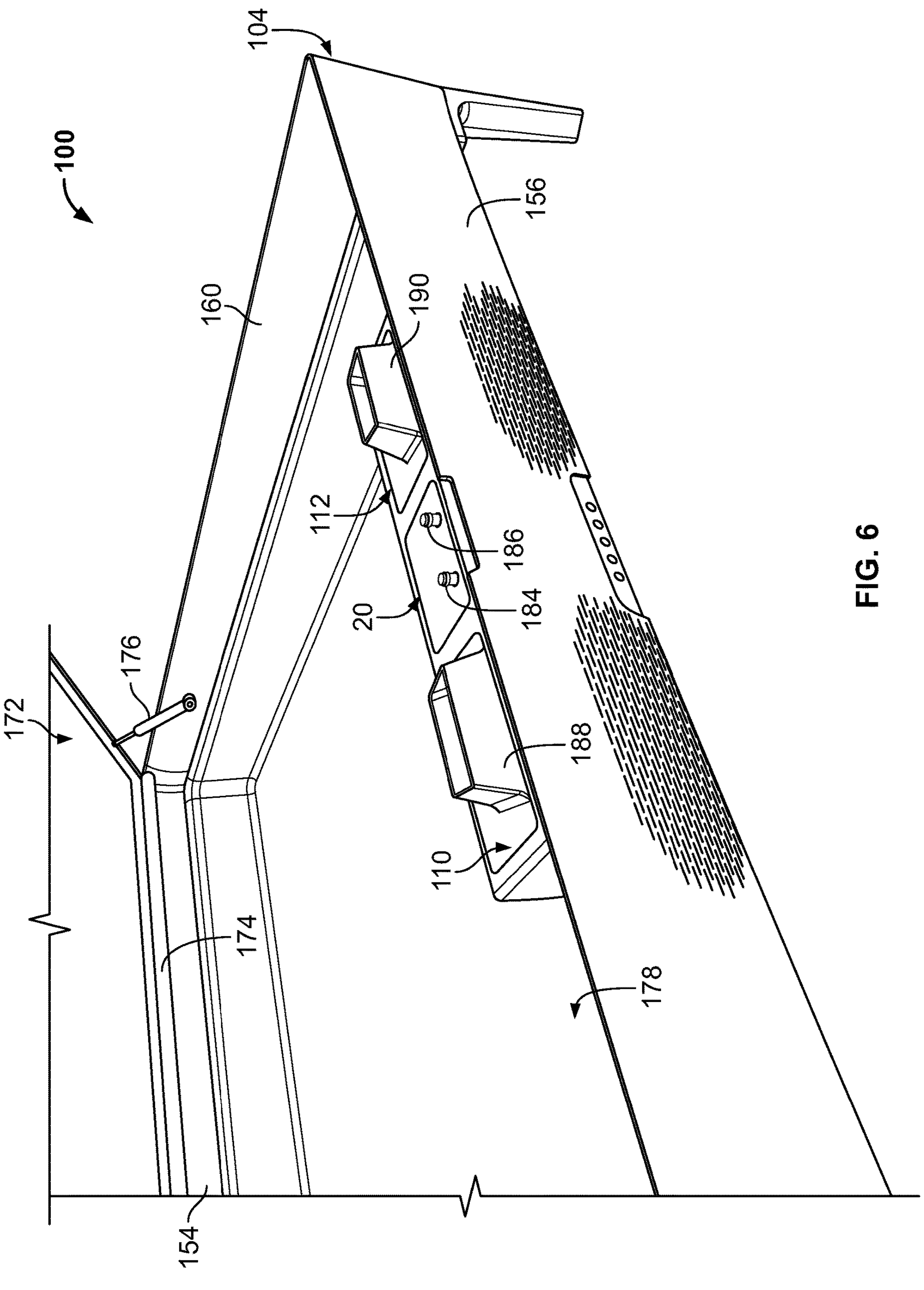
FIG. 6 is a perspective view of the foundation shown in FIG. 5 in the open position.

FIG. 6 is an enlarged perspective view of a portion of the foundation 104 with the foundation lid 172 in the open position. FIG. 6 is enlarged to better show the dual temperature air units 110 and 112, the dual temperature air outlets 188 and 190, the pump system 20, and the pump air outlets 184 and 186.

Figure 7:
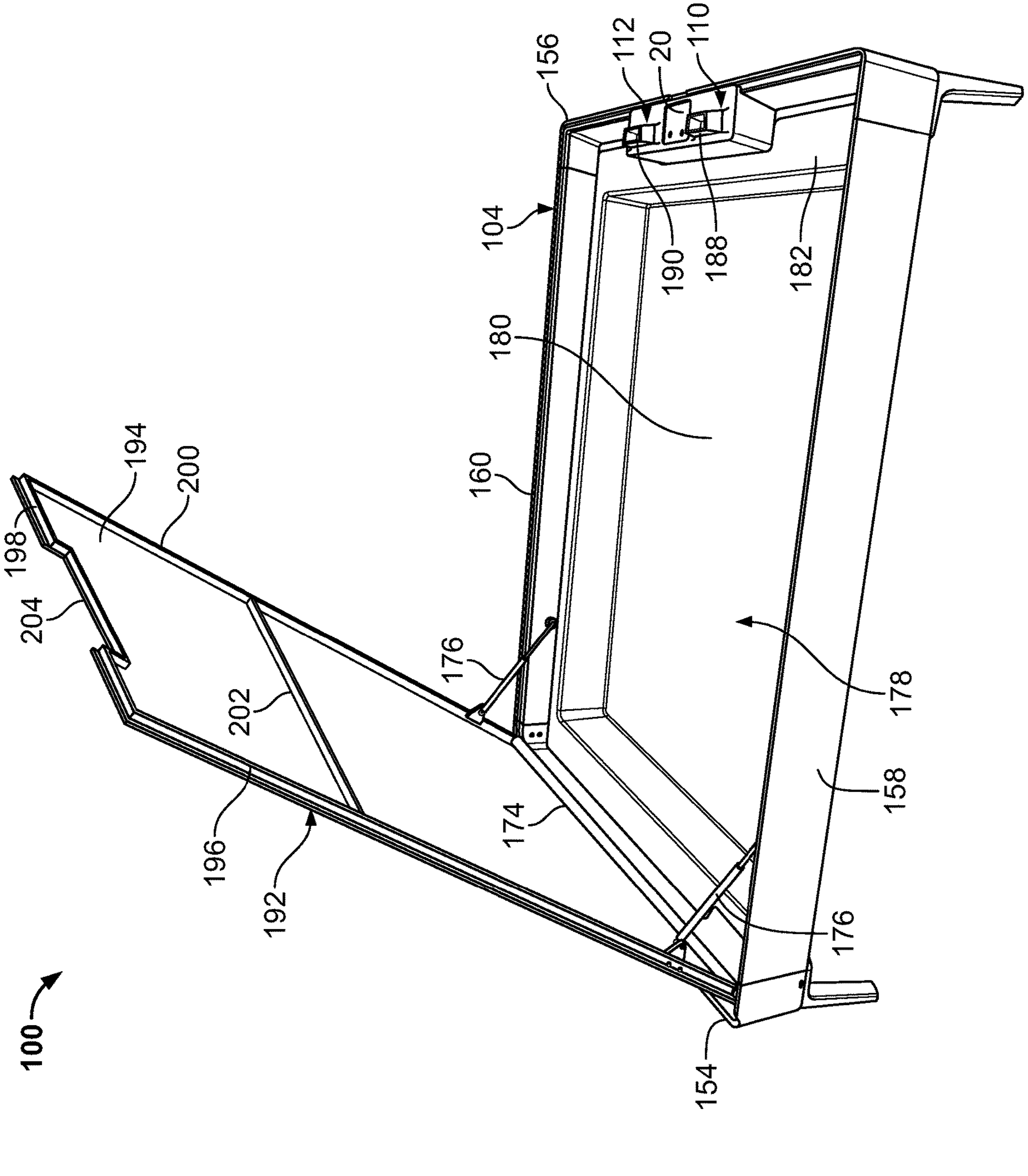
FIG. 7 is a perspective view of the foundation shown in FIG. 5 with an alternative foundation lid.

FIG. 7 is a perspective view of the foundation 104 with a foundation lid 192, which is an alternative embodiment of the foundation lid 172 (shown in FIGS. 5 and 6). The foundation lid 192 includes a platform 194, side beams 196, 198, and 200, and a cross beam 202. The platform 194 is a substantially flat support structure for supporting the mattress 102 (shown in FIGS. 4A. 4B, and 5), which can rest on and be attached to the platform 194. The platform 194 is supported by the side beams 196, 198, and 200 and the cross beam 202, all of which are positioned under the platform 194. The side beam 198 is connected at an edge of the platform 194 near the foot 156 of the foundation 104 and is opposite the hinge mechanism 174, which is connected at an edge of the platform 194 near the head 154 of the foundation 104. The side beam 196 extends from the hinge mechanism 174 to the side beam 198 along an edge of the platform 194. The side beam 200 extends from the hinge mechanism 174 to the side beam 198 along an edge of the platform 194 opposite of the side beam 196. The cross beam 202 extends across a central portion of the platform 194 from the side beam 196 to the side beam 200.

The platform 194 has a cutout 204 at a central portion of an edge of the platform 194 adjacent the side beam 198. The side beam 198 is a series of straight beams interconnected at approximately perpendicular angles so as to follow the curvature of the edge of the platform 194 and the cutout 204. The side beams 196 and 200 and the cross beam 202 are substantially straight support beams. When the foundation lid 192 is in the closed position, the foundation lid 192 is shaped to substantially cover the compartment 178 but to expose and not cover the dual temperature air outlets 188 and 190 of the dual temperature air units 110 and 112 and the pump air outlets 184 and 186 of the pump system 20. The foundation 104, as illustrated in FIG. 7 with the foundation lid 192, is a non-adjustable foundation. In alternative embodiments, the bed system 100 can be modified such that the foundation 104 is an adjustable foundation.

Figure 8:
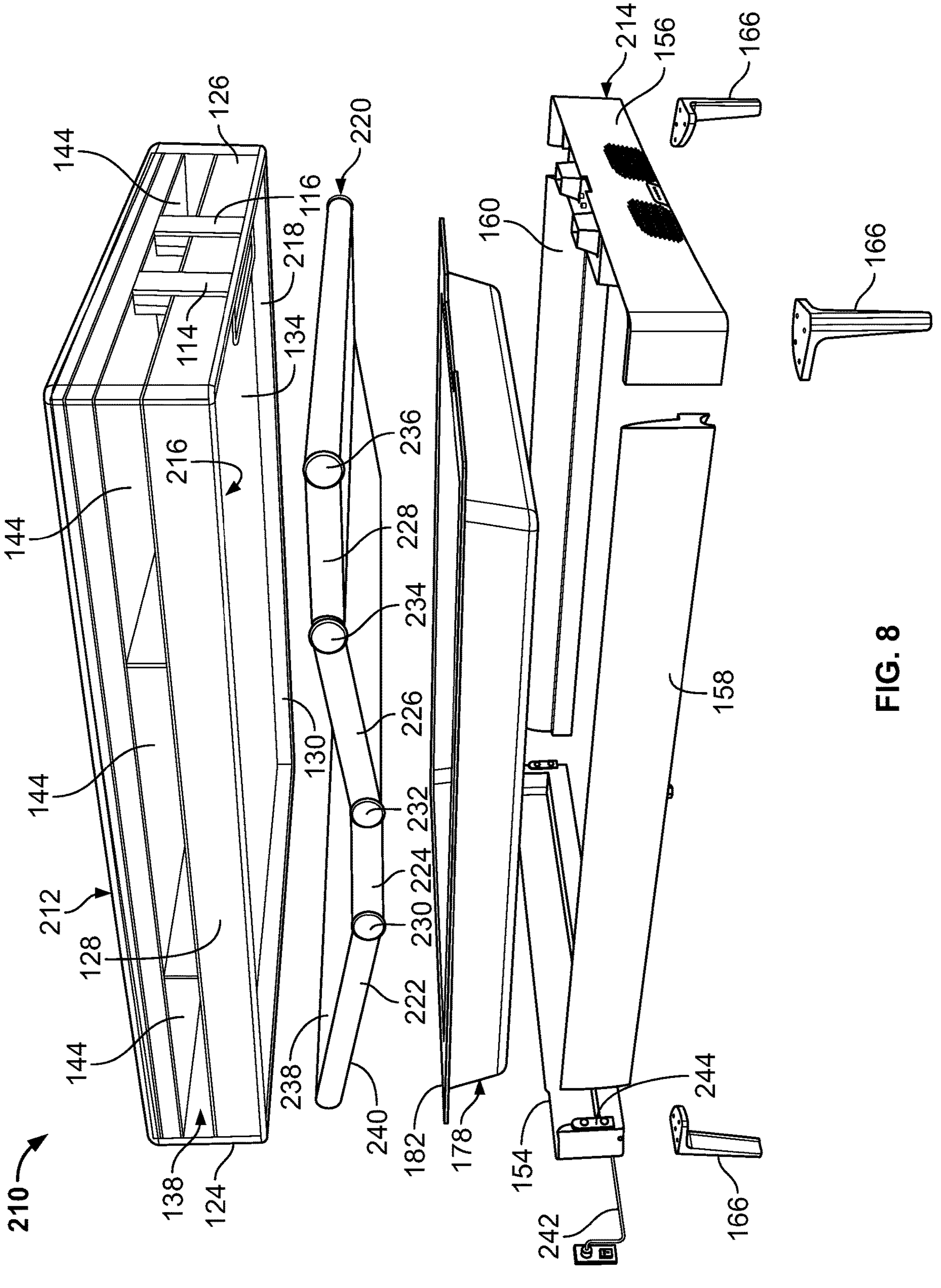
FIG. 8 is an exploded perspective view of another embodiment of a bed system.

FIG. 8 is an exploded perspective view of a bed system 210. The bed system 210 is similar to the bed system 100

(shown in FIGS. 4A-7) except that the bed system 210 includes an adjustable mattress 212 resting on an adjustable foundation 214. The mattress 212 is similar to the mattress 102 (shown in FIGS. 4A-5) except the bottom 134 of the adjustable mattress 212 includes a recessed portion 216 surrounded on all sides by a lip 218 of the adjustable mattress 212.

The bed system 210 includes a recessed adjustable layer 220, which includes a series of platforms 222, 224, 226, and 228, connected by mechanical joints 230, 232, 234, and 236. The platforms 222, 224, 226, and 228 are each substantially flat, rigid structures for supporting a portion of the adjustable mattress 212. The platforms 222, 224, 226, and 228 are hingedly interconnected via the mechanical joints 230, 232, 234, and 236 to allow the recessed adjustable layer 220 to adjust the curvature of the adjustable mattress 212 from a default flat position to a curvature desirable to the user. The air chambers 144 of the air bladder layer 138 can also be hingedly connected to each-other or otherwise pivotable with respect to each-other so as to facilitate bending of the adjustable mattress 212.

The recessed adjustable layer 220 has a top surface 238 which can abut and support the bottom 134 of the adjustable mattress 212 and has a bottom surface 240 which can abut and be supported by the ledge 182 or another portion of the adjustable foundation 214. The recessed adjustable layer 220 can be sized to fit in the recessed portion 216 of the adjustable mattress 212. In the illustrated embodiment, the recessed adjustable layer 220 is built into and integrated with the adjustable mattress 212. In alternative embodiments, the recessed adjustable layer 220 can be built into and integrated with the foundation 214.

The recessed adjustable layer 220 can be actuated via one or more mechanical actuators (not shown). In one embodiment, the mechanical actuators can include one or more electric motors for actuating and adjusting the platforms 222, 224, 226, and 228 of the recessed adjustable layer 220. In another embodiment, the mechanical actuators can be manually actuated for adjusting the platforms 222, 224, 226, and 228 of the recessed adjustable layer 220 without the need for electric motors. In one embodiment, the recessed adjustable layer 220 can included the mechanical actuators integrated internally in the recessed adjustable layer 220. In another embodiment, the mechanical actuators can be positioned in the compartment 178, below the recessed adjustable layer 220. In yet another embodiment, the mechanical actuators can be positioned below the adjustable layer 220 within the adjustable foundation 214, and the compartment 178 can be omitted. In further embodiments, the adjustable mattress 212 and the adjustable foundation 214 can be configured to integrate with conventional mechanical bed actuators.

In the illustrated embodiment, the platform 222 of the recessed adjustable layer 220 supports the head 124 of the adjustable mattress 212 and can be raised and lowered to raise and lower the head 124 of the adjustable mattress 212. The platform 228 supports the foot 126 of the adjustable mattress 212 and can be raised and lowered to raise and lower the foot 126 of the adjustable mattress 212. The platform 224 can be non-articulating, remaining substantially stationary during articulation of the recessed adjustable layer 220. The platform 226 connects the platform 224 to the platform 228 and can provide improved contouring of the adjustable mattress 212 when the foot 126 of the adjustable mattress 212 is raised and lowered. In alternative embodiments, the recessed adjustable layer 220 can include one or more additional platforms as suitable for the support and contouring desired for a particular design.

In some embodiments, the air hoses 114 and 116 can be positioned adjacent or near the platform 224 so as to reduce or eliminate the amount of articulation the air hoses 114 and 116 experience during adjustment of the adjustable mattress 212. For example, the air hoses 114 and 116 can be positioned on sides of the adjustable mattress 212 in positions similar to those of the air hoses 86 and 88 (shown in FIG. 3). In alternative embodiments, the air hoses 114 and 116 can be positioned at or near another non-articulating portion of the adjustable mattress 212.

As shown in FIG. 8, the adjustable foundation 214 can include an electrical power cord 242 for connecting to a conventional electrical wall outlet. The foundation 214 can be the power source for supplying electrical power to the various electrical components integrated in the bed system 210, including mechanical actuators for the recessed adjustable layer 220 as well as the pump system 20, the dual temperature air units 110 and 112, and/or any other electrical components of the bed system 210. This can allow the bed system 210 to integrate several electrical components into the bed system 210, all powered via a single electrical power cord 242 connected to an electrical wall outlet.

The foundation 214 is shown in exploded view with the head 154, the foot 156, and the sides 158 and 160 being separated from each-other. Each of the head 154, the foot 156, and the sides 158 and 160 of the foundation 214 includes mechanical fasteners 244 for interconnecting with each-other.

Figure 9:
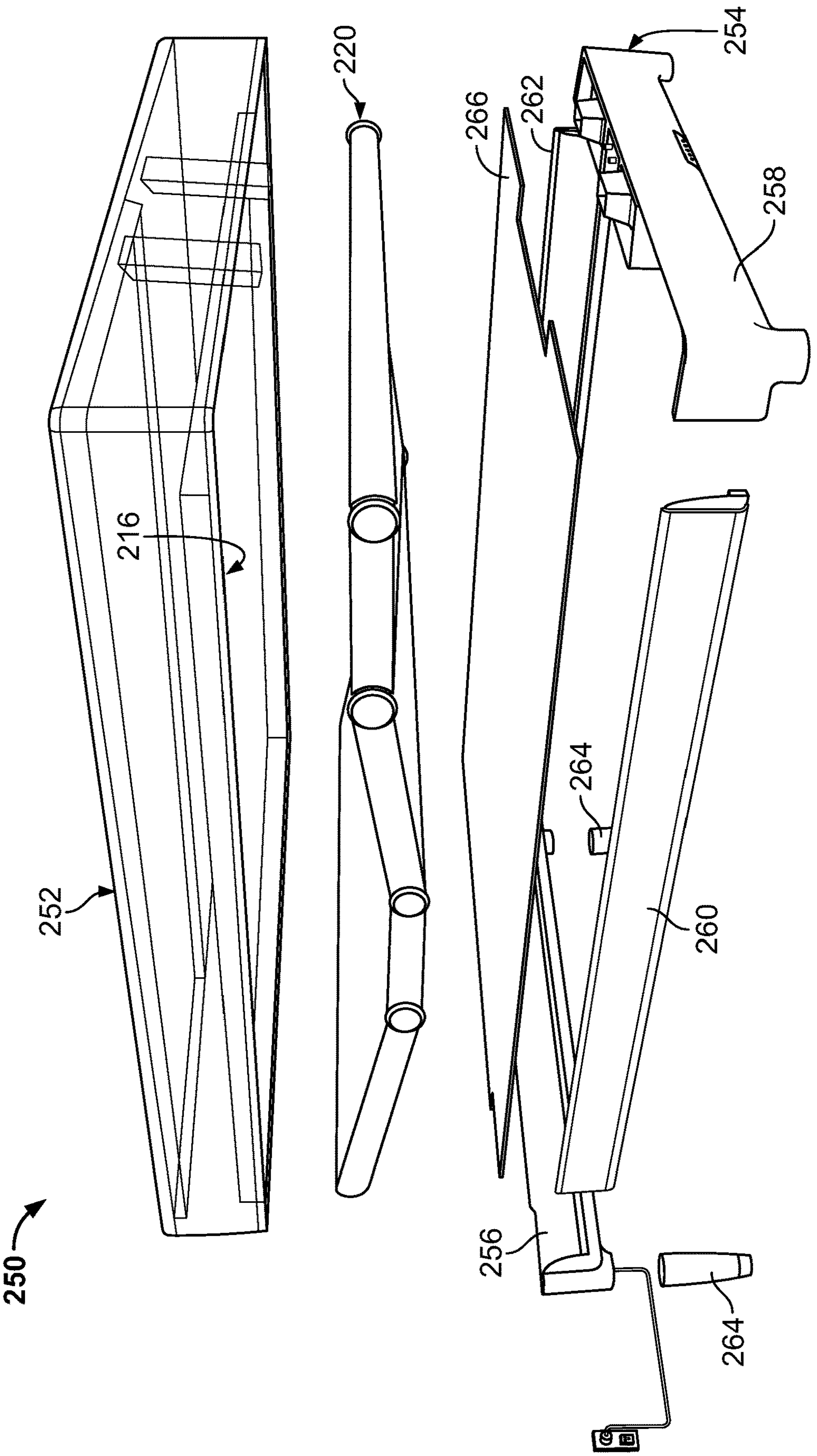
FIG. 9 is an exploded perspective view of another embodiment of a bed system.

FIG. 9 is an exploded perspective view of a bed system 250, which includes an adjustable mattress 252 and an adjustable foundation 254. The adjustable mattress 252 is similar to the adjustable mattress 212 (shown in FIG. 8) except the adjustable mattress 252 has different layers than those of the adjustable mattress 212. The adjustable foundation 254 is similar to the adjustable foundation 214 (shown in FIG. 8) except the adjustable foundation 254 has a head 256, a foot 258, sides 260 and 262, and legs 264 shaped and configured differently than those of the adjustable foundation 214. The adjustable foundation 254 also includes a substantially flat platform 266 which replaces the compartment 178 with the basin 180 (shown in FIGS. 5-8). The bed system 250 includes the adjustable layer 220 described with respect to the bed system 210 (shown in FIG. 8).

Figure 10:
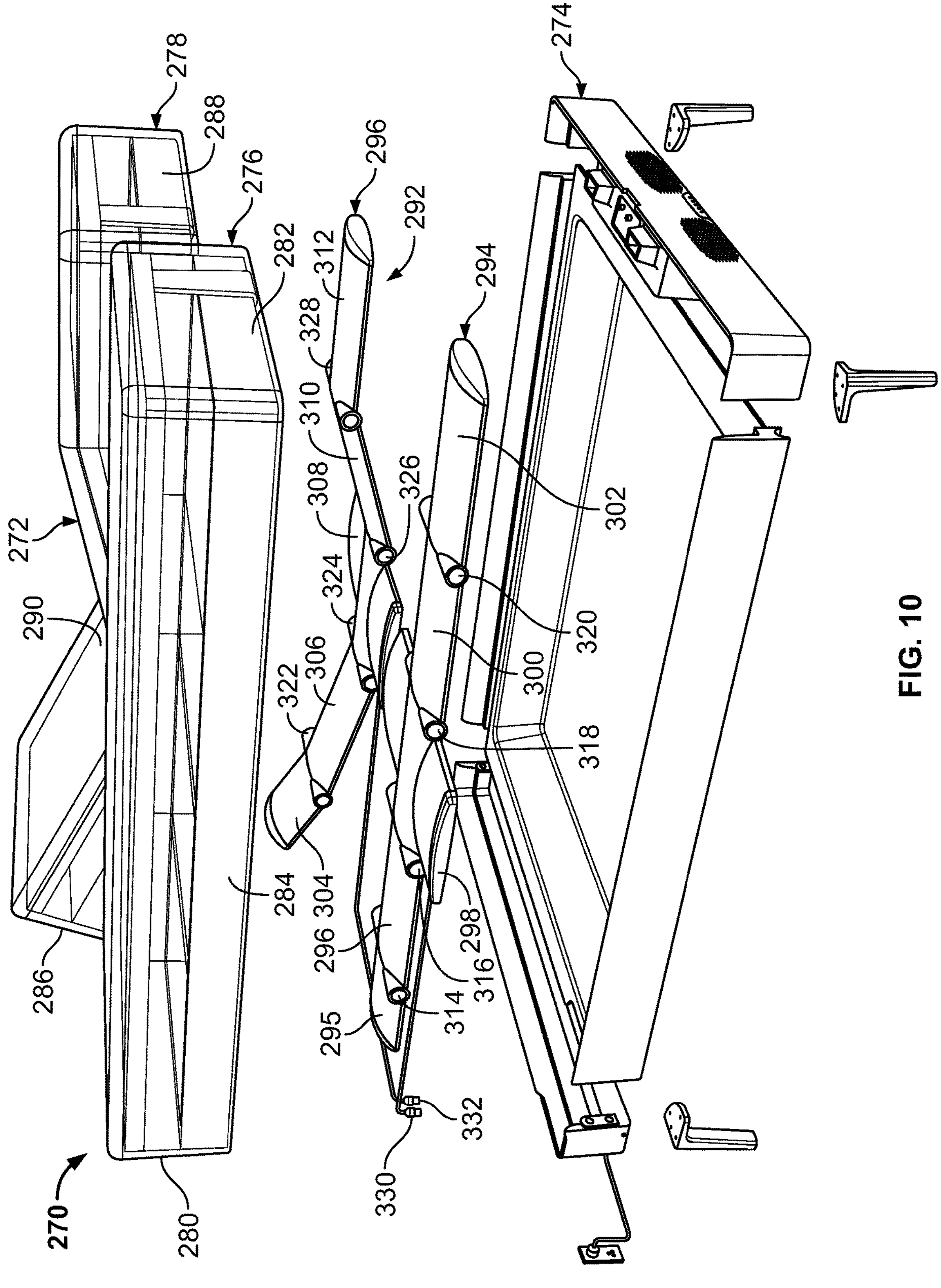
FIG. 10 is an exploded perspective view of another embodiment of a bed system.

FIG. 10 is an exploded perspective view of a bed system 270, which includes an adjustable split mattress 272 and an adjustable foundation 274. The adjustable split mattress 272 is similar to the adjustable mattress 212 (shown in FIG. 8) except the adjustable split mattress 272 has first and second zones 276 and 278 for use by first and second users resting on the bed system 270. The first zone 276 includes a head 280, a foot 282, and a central portion 284 between the head 280 and the foot 282. The second zone 278 includes a head 286, a foot 288, and a central portion 290 between the head 286 and the foot 288. The head 280 of the first zone 276 is separate from and separately articulable with respect to the head 286 of the second zone 278. The foot 282 of the first zone 276 is separate from and separately articulable with respect to the foot 288 of the second zone 278. The central portion 284 is connected to the central portion 290 such that the first zone 276 is connected to the second zone 278 at the central portions 284 and 290. In an alternative embodiment, the adjustable split mattress 272 can be replaced by two, separate but adjacent mattresses (e.g. two separate twin sized mattresses).

The adjustable foundation 274 is similar to the adjustable foundation 214 (shown in FIG. 8) except that the adjustable foundation 274 includes an adjustable layer 292 with first and second foundation zones 294 and 296 for supporting and adjusting the first and second zones 276 and 278 of the adjustable split mattress 272. The adjustable layer 292 includes a series of platforms 295, 296, 298, 300, and 302 in the first foundation zone 294 and includes a series of platforms 304, 306, 308, 310, and 312 in the second foundation zone 296. The adjustable layer 292 includes mechanical joints 314, 316, 318, and 320 interconnecting the platforms 295, 296, 298, 300, and 302 in the first foundation zone 294 and includes mechanical joints 322, 324, 326, and 328 interconnecting the platforms 304, 306, 308, 310, and 312 in the second foundation zone 296. An additional support structure (not shown) can be positioned in the adjustable foundation 274 under the adjustable layer 292 to support the adjustable layer 292.

In the illustrated embodiment, the first foundation zone 294 has a width narrower than that of the first zone 276 of the adjustable split mattress 272, and the second foundation zone 296 has a width narrower than that of the second zone 278 of the adjustable split mattress 272. Such sizing can be suitable in applications where the adjustable split mattress 272 is sufficiently rigid so as to retain suitable mattress shape when raising and lowering the heads 280 and 286 and the feet 282 and 288 of the adjustable split mattress 272. In other embodiments, the width of the first and second foundation zones 294 and 296 can be increased to be substantially equal to the widths of the first and second zones 276 and 278 of the adjustable split mattress 272. Such sizing can be suitable in applications where the adjustable split mattress 272 is less rigid and can benefit from increased widths of the first and second zones 276 and 278.

In the illustrated embodiment, the platforms 295 and 296 of the adjustable layer 292 support the head 280 of the first zone 276 and can be raised and lowered to raise and lower the head 280 of the first zone 276. The platforms 300 and 302 of the adjustable layer 292 support the foot 282 of the first zone 276 and can be raised and lowered to raise and lower the foot 282 of the first zone 276. The platform 298 can be non-articulating, remaining substantially stationary during articulation of the adjustable layer 292. The platforms 304 and 306 of the adjustable layer 292 support the head 286 of the second zone 278 and can be raised and lowered to raise and lower the head 286 of the second zone 278. The platforms 310 and 312 of the adjustable layer 292 support the foot 288 of the second zone 278 and can be raised and lowered to raise and lower the foot 288 of the second zone 278. The platform 308 can be non-articulating, remaining substantially stationary during articulation of the adjustable layer 292.

The adjustable layer 292 includes first and second cables 330 and 332 that connect the first and second foundation zones 294 and 296 to the adjustable foundation 274. This connection via the first and second cables 330 and 332 allows the adjustable layer 292 to be powered by and controlled by a power source and controller of the adjustable foundation 274. The first and second foundation zones 294 and 296 can be independently adjustable by one or more controllers. Position, rate, and direction of adjustment can be independently controlled for each of the first and second foundation zones 294 and 296.

Figure 11:
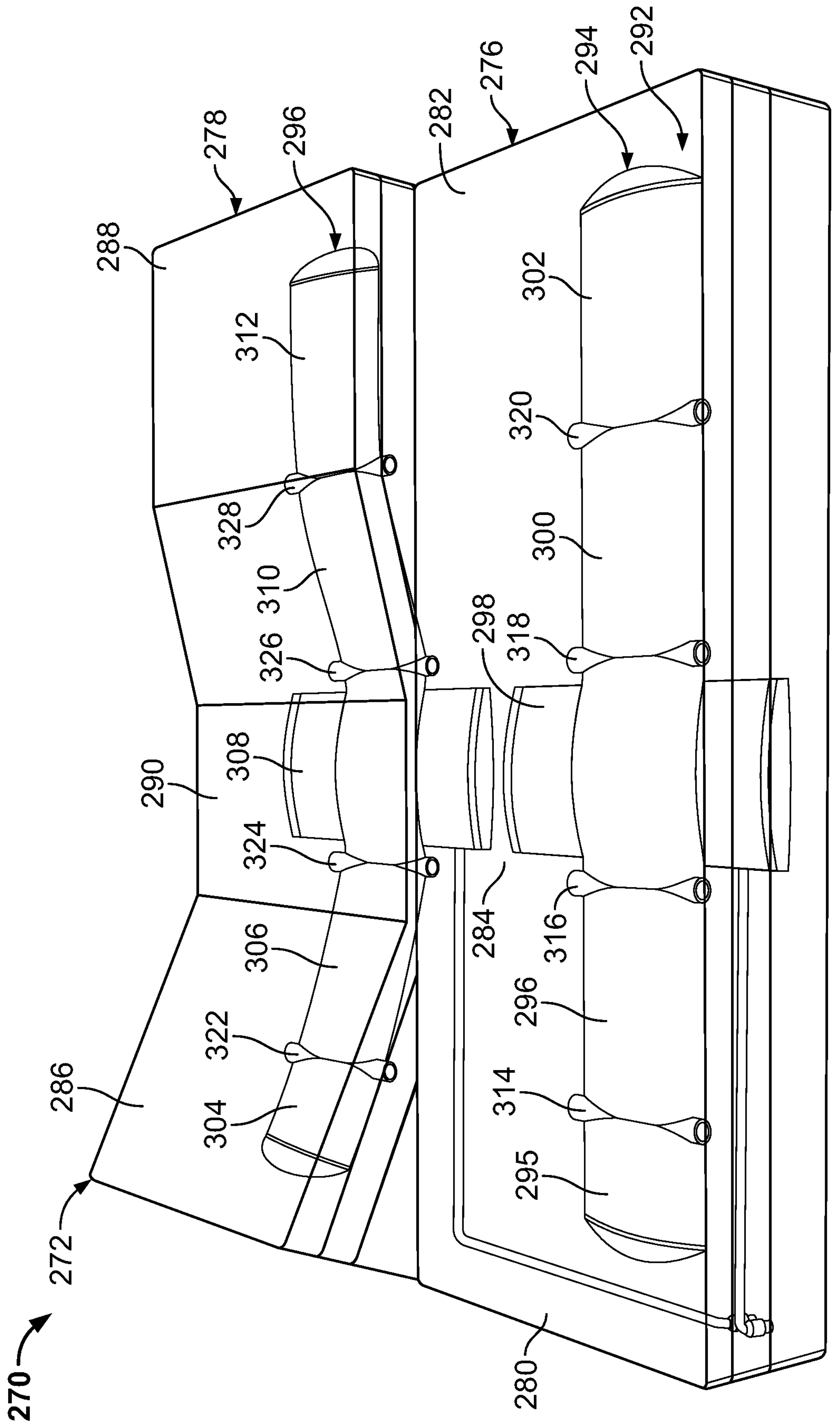
FIG. 11 is a perspective view of a mattress and adjustable layer of the bed system of FIG. 10.

FIG. 11 is a perspective view of the adjustable split mattress 272 and the adjustable layer 292 of the bed system 270. FIG. 11 shows the second foundation zone 296 raising the head 286 and the foot 288 of the second zone 278 of the adjustable split mattress 272, while the first foundation zone 294 supports the first zone 276 of the adjustable split mattress 272 in a substantially flat position.

Figure 12:
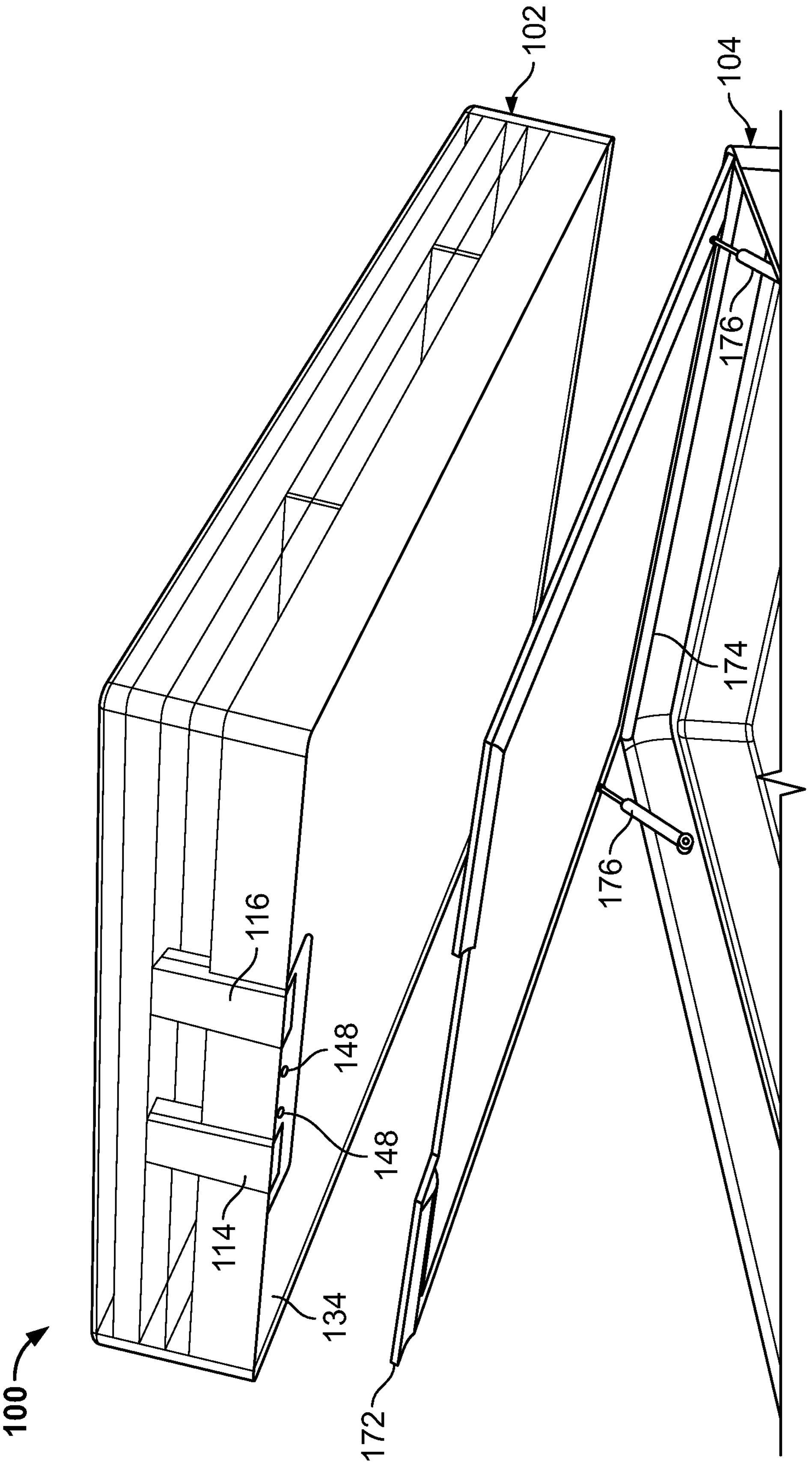
FIG. 12 is a perspective view of the bed system of FIGS. 4A and 4B with the mattress lifted from the foundation.

FIG. 12 is a perspective view of the bed system 100 with the mattress 102 being separated from the foundation lid 172 of the foundation 104. When the mattress 102 is lifted off the foundation lid 172, the bottom 134 of the mattress 102 is shown. The bottom 134 of the mattress 102 can be substantially flat except for inlets to the air hoses 114 and 116 and the air chamber ducts 148.

Figure 13:
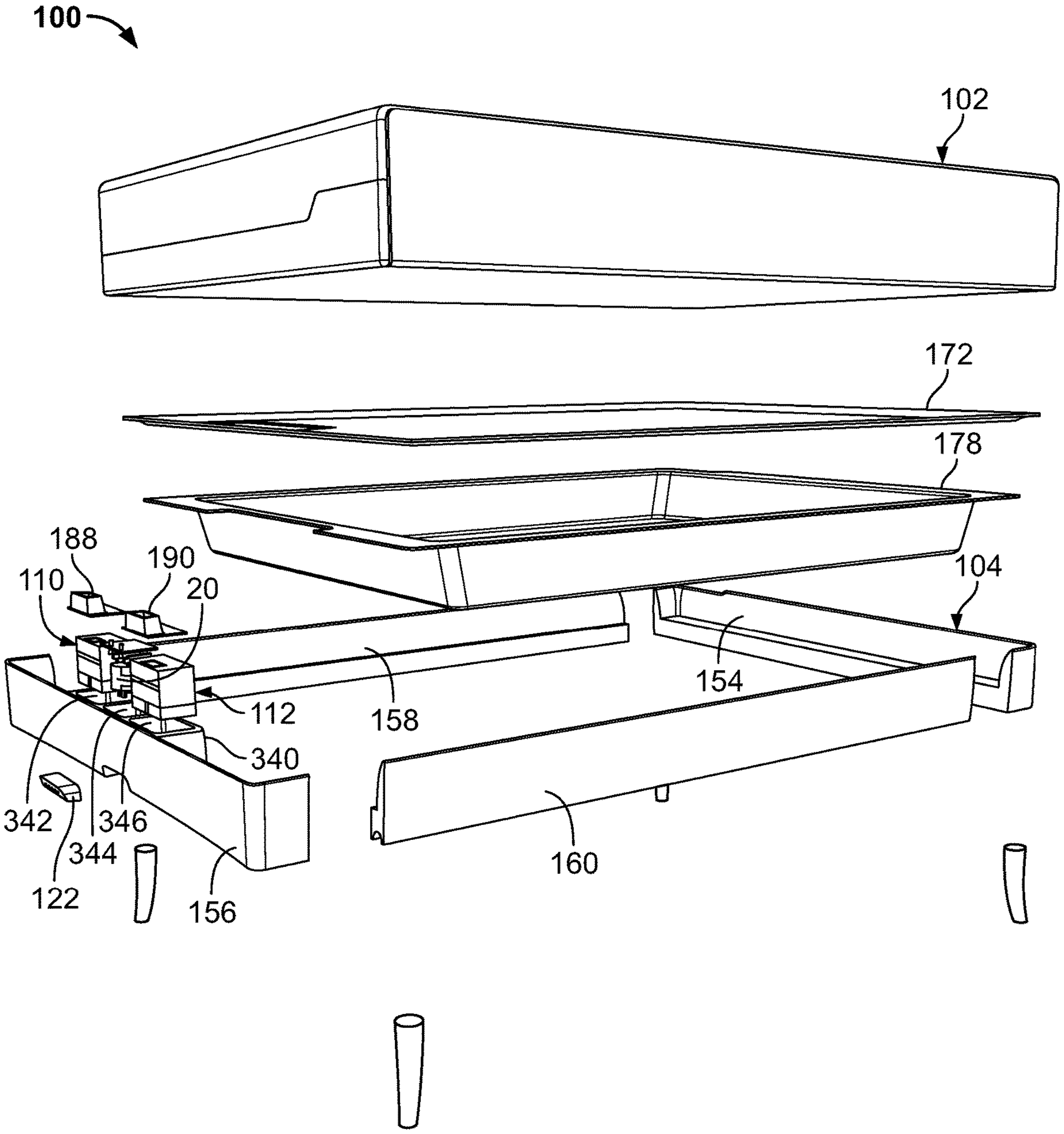
FIG. 13 is an exploded perspective view of the bed system of FIGS. 4A and 4B.

FIG. 13 is an exploded perspective view of the bed system 100. As shown in FIG. 13, the foundation 104 of the bed system 100 includes a component housing 340 with chambers 342, 344, and 346. In the illustrated embodiment, the component housing 340 is integrally formed with the foot 156 of the foundation 104. The dual temperature air unit 110 is housed in the chamber 342, the pump 20 is housed in the chamber 344, and the dual temperature air unit 112 is housed in the chamber 346. The dual temperature air outlets 188 and 190 cover the chambers 342 and 346, respectively, and substantially enclose the dual temperature air units 110 and 112.

Figure 14:
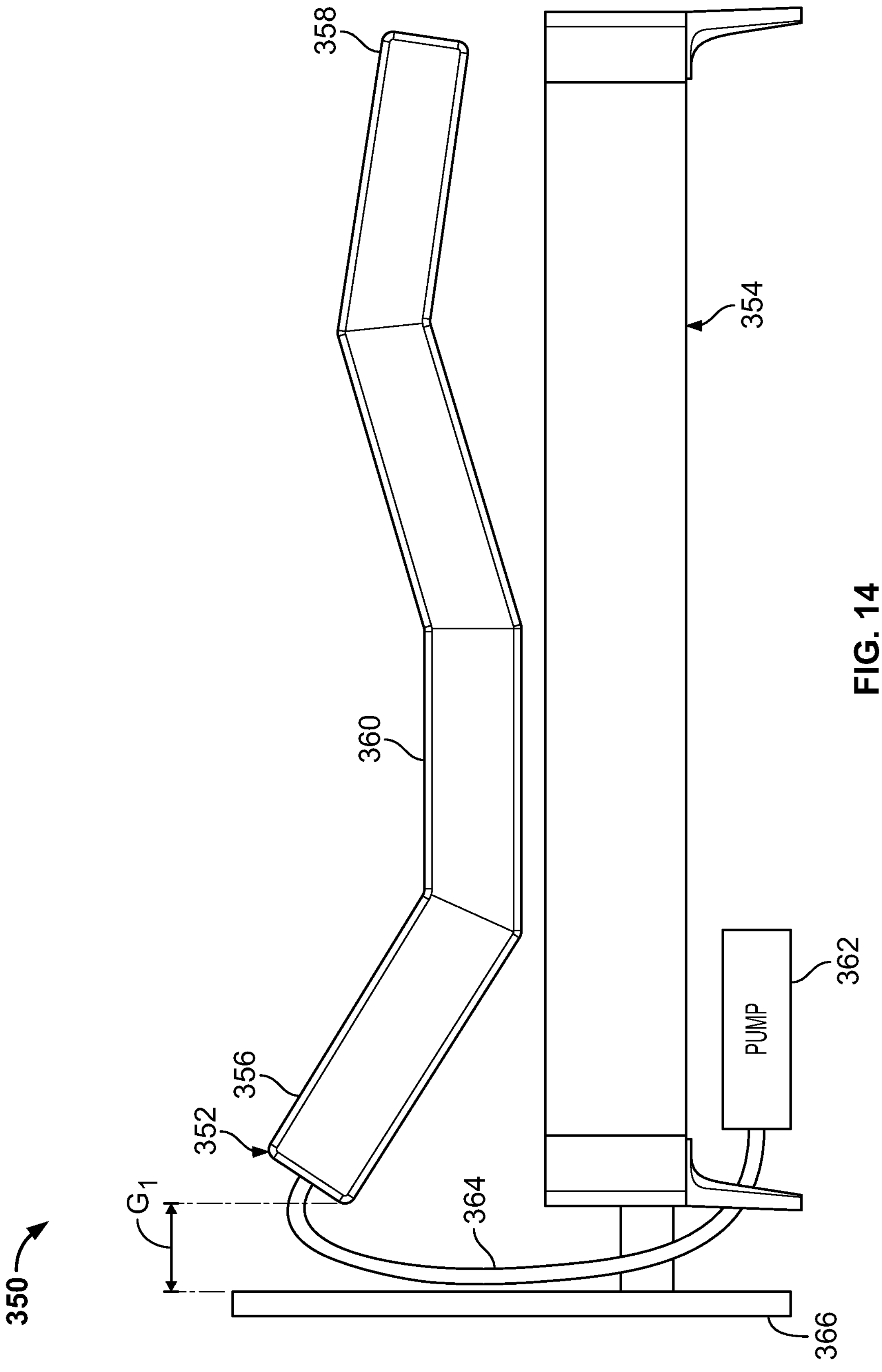
FIG. 14 is a schematic side view of an alternative embodiment of a bed system having a fluid hose positioned at a head of the bed system.

FIG. 14 is a schematic side view of a bed system 350 having a mattress 352 and a foundation 354. The mattress 352 is an adjustable mattress with a head 356, a foot 358, and a central portion 360 between the head 356 and the foot 358. The mattress 352 can include layers and other features described herein with respect to other mattress embodiments, such as including the dual temperature layer 108 and/or the bladder layer 138 with the air chambers 144 described above with respect to FIG. 4A. The foundation 354 is an adjustable foundation with one or more mechanical bed actuators for raising and lowering the head 356 and the foot 358 of the mattress 352.

The bed system 350 includes a pump 362 and a fluid hose 364 connecting the pump 362 to the mattress 352. In the illustrated embodiment, the pump 362 is positioned on a floor below the foundation 354. In one embodiment, the pump 362 can be an air pump connecting to air chambers of an air bladder layer in the mattress 352 for inflating those air chambers. In an alternative embodiment, the pump 362 can be a dual temperature air unit for supplying conditioned air to a dual temperature layer of the mattress 352. In other embodiments, the fluid hose 364 can be one of several fluid hoses of various systems of the bed system 350.

The fluid hose 364 is positioned at a head of the bed system 350 with the fluid hose 364 connecting to an edge of the mattress 352 at the head 356 of the mattress 352. The bed system 350 includes a headboard 366 connected to the foundation 354 near the head 356 of the mattress 352. The foundation 354 and the mattress 352 are spaced from the headboard 366 by a relatively large gap $G_1$. The gap $G_1$ can be large enough to allow space for the fluid hose 364 to be positioned between the head 356 of the mattress 352 and the headboard 366. The gap $G_1$ can also be large enough to allow space for the fluid hose 364 to raise and lower when the head 356 of the mattress 352 is raised and lowered. The fluid hose 364 can be long enough to allow the head 356 of the mattress 352 to pull the fluid hose 364 when the head 356 of the mattress 352 is raised without detaching the fluid hose 364.

Figure 15:
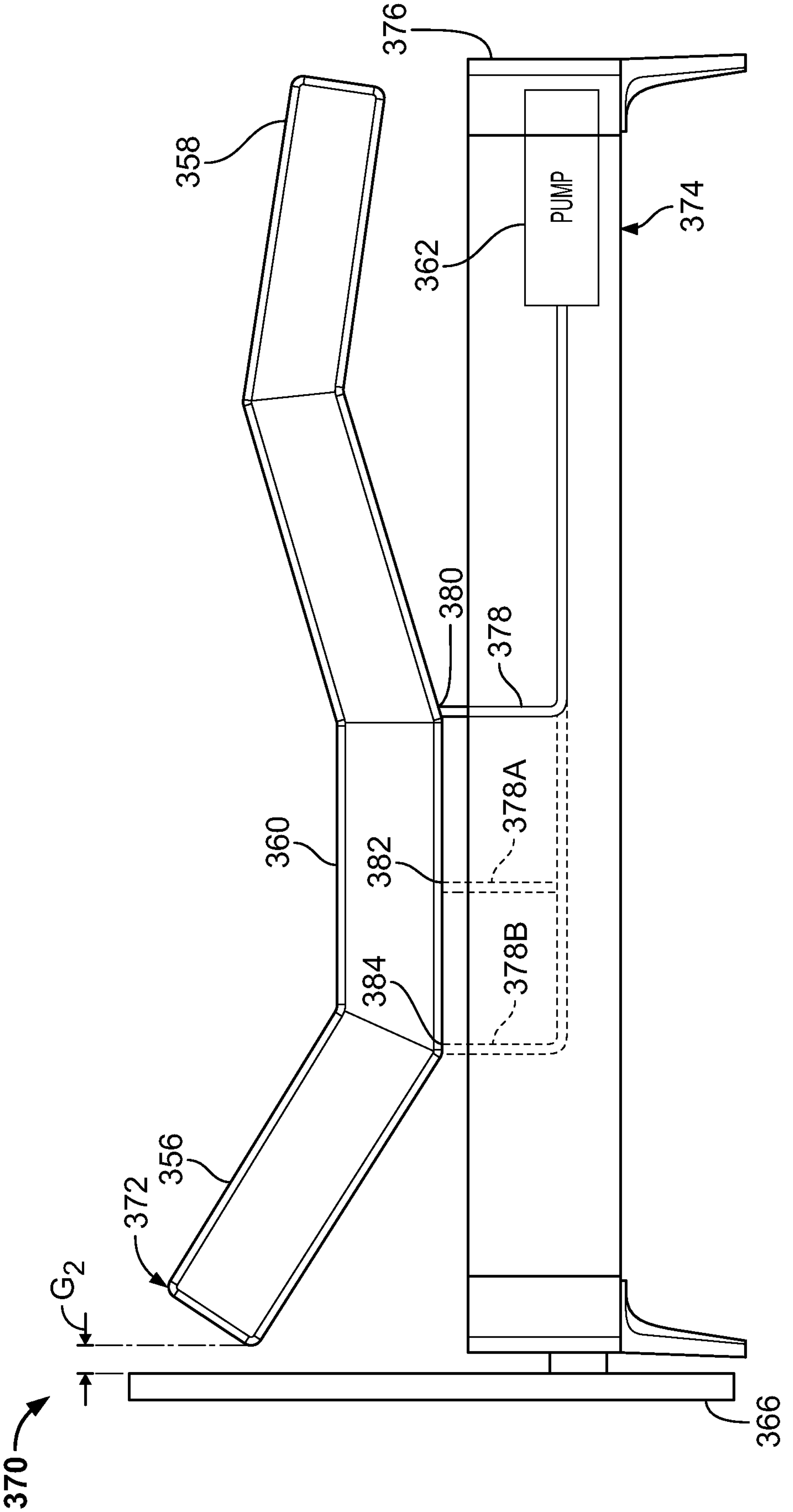
FIG. 15 is a schematic side view of an alternative embodiment of a bed system having a fluid hose positioned near a middle portion of the bed system.

FIG. 15 is a schematic side view of a bed system 370 having a mattress 372 and a foundation 374. The mattress 372 and the foundation 374 can be similar to the mattress 352 and the foundation 354 (shown in FIG. 14), respectively, except as described herein.

The bed system 370 includes the pump 362 integrated with and positioned inside the foundation 374, near a foot 376 of the foundation 374. A fluid hose 378 fluidically connects the pump 362 to the mattress 372 (such as to air chambers within the mattress 372). The fluid hose 378 can connect to the mattress 372 at the central portion 360 of the mattress 372. The central portion 360 is a non-articulating portion of the mattress 372, such that the central portion 360 can remain relatively stationary when the head 356 and feet 358 are raised and lowered.

In the illustrated embodiment, the fluid hose 378 connects to the mattress 372 at a non-articulating intersection 380 between the central portion 360 and the articulating foot 358 of the mattress 372. In another embodiment, the fluid hose 378 can connect to the mattress 372 toward a middle point 382 of the central portion 360, which is illustrated in FIG. 15 as a fluid hose 378A. In yet another embodiment, the fluid hose 378 can connect to the mattress 372 at a non-articulating intersection 384 between the central portion 360 and the articulating head 356 of the mattress 372, which is illustrated in FIG. 15 as a fluid hose 378B. In each of these embodiments, the fluid hose 378 can be connected to a portion of the mattress 372 that is either non-articulating or that articulates relatively little during raising and lowering of the head 356 and the foot 358.

By connecting the fluid hose 378 to the central portion 360 of the mattress 372 (for example, as opposed to connecting to the head 356 as shown in FIG. 14), the fluid hose 378 can be shorter and would not necessarily need to be extendable or stretchable. This can reduce the pressure drop of air flowing through the fluid hose 378 and reduce wear on the fluid hose 378 during operation of the bed system 370. Connecting the fluid hose 378 to the central portion 360 of the mattress 372, as opposed to the head 356, can also allow the headboard 366 to be connected to the foundation 374 with a smaller gap $G_2$ between the headboard 366 and the mattress 372. This can reduce the total size occupied by the bed system 370 and can reduce the chances of pillows (not shown in FIG. 15) being lost in the gap $G_2$ between the mattress 372 and the headboard 366.

Figure 16:
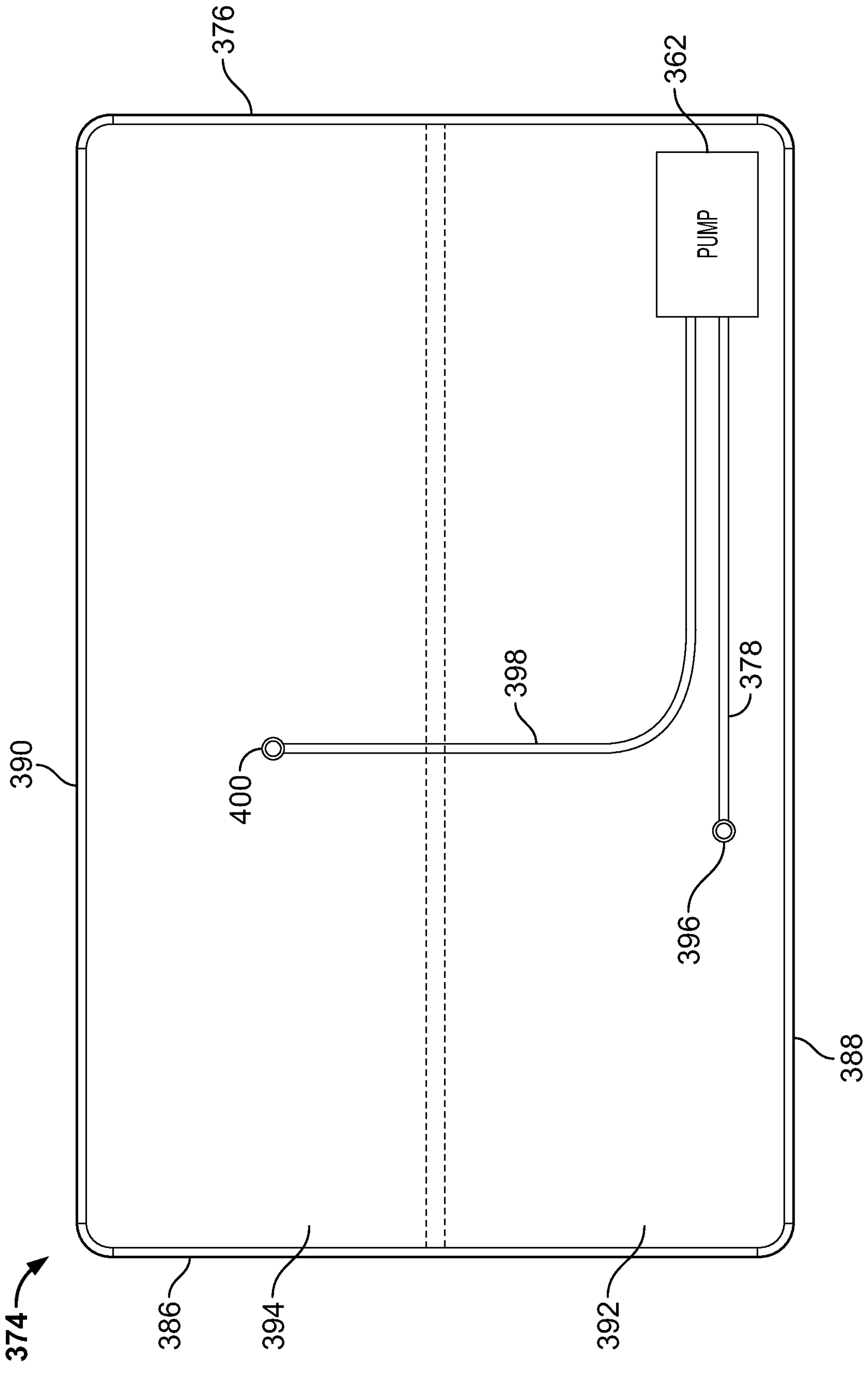
FIG. 16 is a top view of a foundation of the bed system of FIG. 15.

FIG. 16 is a top view of the foundation 374 of the bed system 370, with the mattress 372 and the headboard 366 removed. The foundation 374 is shown with the foot 366, a head 386, and opposing sides 388 and 390. The foundation 374 includes first and second zones 392 and 394 for supporting first and second zones (not shown) of the mattress 372 (shown in FIG. 15) for use by first and second users. The fluid hose 378 includes an air outlet 396 exiting the foundation 374 at the first zone 392, extending upward toward the mattress 372. The pump 362 is also attached to another fluid hose 398 that includes an air outlet 400 exiting the foundation 374 at the second zone 394, extending upward toward the mattress 372. The air outlets 396 and 400 are both positioned in a central portion of the foundation 374, between the head 386 and the foot 366 of the foundation 374. This can allow the air outlets 396 and 400 to connect to the mattress 372 at a portion of the mattress 372 that is non-articulating.

Figure 17:
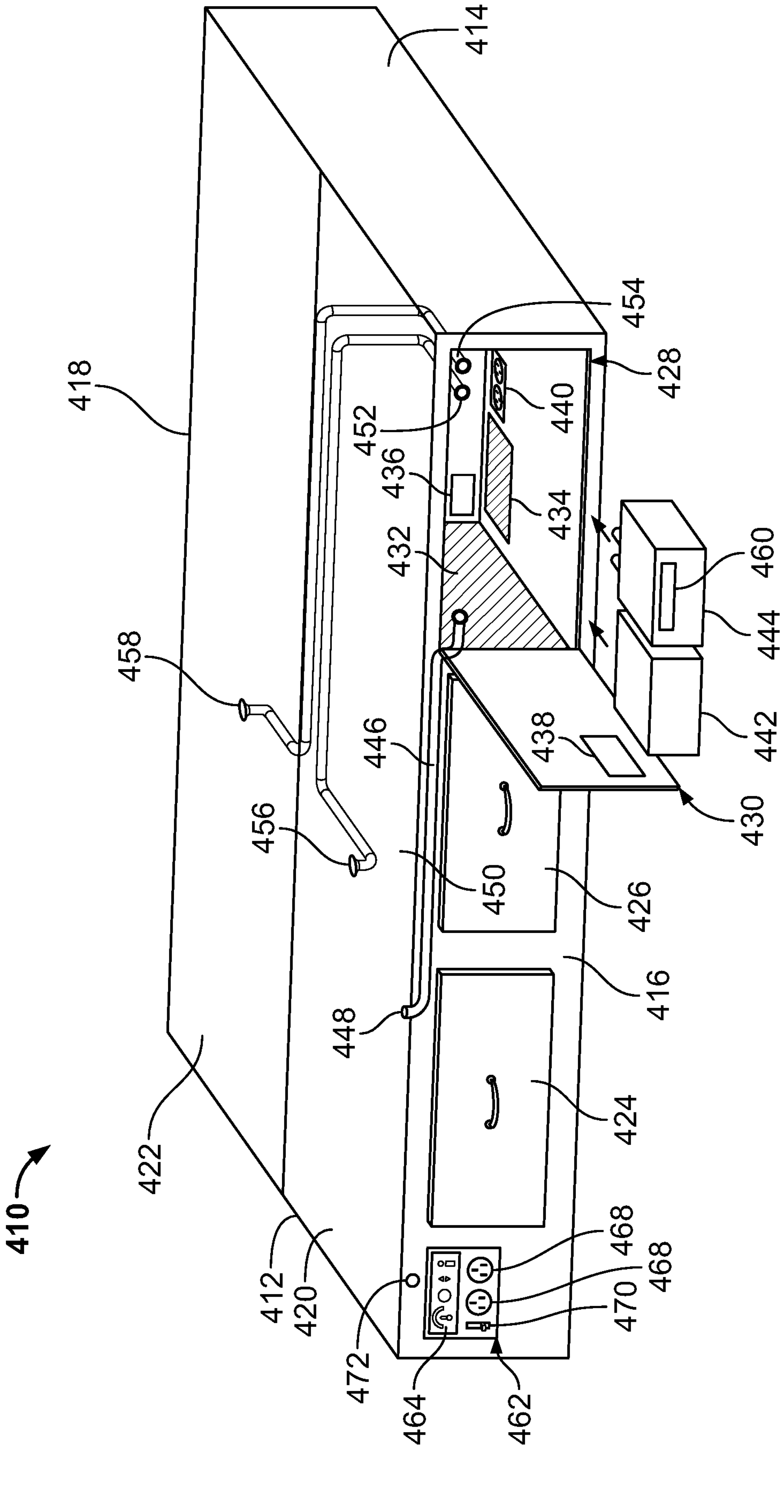
FIG. 17 is a perspective view of an alternative embodiment of a foundation of a bed system.

FIG. 17 is a perspective view of a foundation 410, which can be incorporated with one or more of the bed systems described herein. The foundation 410 can incorporate and integrate a number of features and components of a bed system. The foundation 410 includes a head 412, a foot 414, and sides 416 and 418. The foundation 410 has a first zone 420 near the side 416 and a second zone 422 near the side 418. The foundation 410 includes drawers 424 and 426 positioned on the side 416, which can be used to store a user's belongings (such as clothing) or can be used to house components of the foundation 410 (such as pumps or mechanical actuators). The foundation 410 also includes a compartment 428 with a compartment door 430 for opening and closing the compartment 428. The compartment 428 includes a housing having sound dampening insulation 432 for reducing noise created by equipment housed therein. The compartment 428 includes an air inlet vent 434 at a bottom of the compartment 428 and an air exhaust vent 436 on a side of the compartment 428. The compartment door 430 also includes a vent 438 which can be used as an air inlet or exhaust. Electrical power outlets 440 are included in the compartment 428 for powering electrical devices housed therein.

A dual temperature air unit 442 and a pump 444 can be housed in the compartment 428 and connected to the electrical power outlets 440. The dual temperature air unit 442 can be positioned in the compartment 428 so as to draw air through the air inlet vent 434 (and/or the vent 438) and exhaust waste air through the air exhaust vent 436 (and/or the vent 438). The foundation 410 includes an air hose 446 extending from the compartment 428 to an air outlet 448 positioned at a central portion 450 of the foundation 410 adjacent the side 416 of the foundation 410. The location of the air outlet 448 can be positioned for connection at a non-articulating portion of a mattress (such as the central portion 360 of the mattress 372 shown in FIG. 15). The dual temperature air unit 442 can connect to the air hose 446 for delivering conditioned air to the air outlet 448, which can connect to an air hose and a dual temperature layer, such as the air hose 88 that connects to the dual temperature layer 80 (shown in FIG. 3), such that the air outlet 448 and the air hose 88 are substantially concealed by the fitted sheet 574 (not shown). The dual temperature air unit 442 can have snap-fit connections to the air hose 446, air inlet vent 434, and air exhaust vent 436 to facilitation quick assembly.

The pump 444 can be positioned in the compartment 428 so as to connect to air hoses 452 and 454. The air hose 452 has an air outlet 456 positioned at the central portion 450 in the first zone 420. The air hose 454 has an air outlet 458 position at the central portion 450 in the second zone 422. The location of the air outlets 456 and 458 can be positioned for connection to a non-articulating portion of a mattress (such as the central portion 360 of the mattress 372 shown in FIG. 15). The pump 444 can connect to the air hoses 452 and 454 for delivering air to air chambers of an air mattress, such as the air chambers 144 of the air bladder layer 138 shown in FIGS. 4A and 4B. The pump 444 can include a status display 460 for displaying pump status and/or other information relating to the pump 444. The vent 438 can be aligned with the status display 460 so as to allow a user to view the status display 460 without opening the compartment door 430.

The foundation 410 includes a control panel 462 positioned on the side 416 of the foundation 410. The control panel 462 includes a user interface 464, which can include input devices and a display for displaying one or more icons or other information relating to operation of the foundation 410, the mattress 372 (shown in FIG. 15), and any of the components stored within the foundation 410, such as the pump 444, the dual temperature air unit 442, and the adjustable control box 488 (shown in FIG. 18). The control panel 462 also includes electrical power outlets 468. External electrical devices such as table lamps or night-lights (not shown) can be plugged into and powered via the electrical power outlets 468. The electrical power outlets 468 can be controlled by the control panel 462 such that the control panel can control operation of any external electrical devices plugged into the electrical power outlets 468. The control panel 462 can also include a USB (universal serial bus) outlet 470 for connecting to a mobile device (such as a mobile phone or tablet) or other USB-equipped device. The control panel 462 can also include a wireless antenna for connecting wirelessly and communicating with any suitable device. The control panel 462 can also include a microphone 472 for receiving voice commands from a user, which the control panel 462 can use to control operations. The control panel 462 can be a controller for controlling operation of all aspects of the foundation 410 and the related bed system, including controlling the pump 444, the dual temperature air unit 442, the electrical power outlets 468, as well as any mechanical bed actuators or other systems of the bed system.

Figure 18:
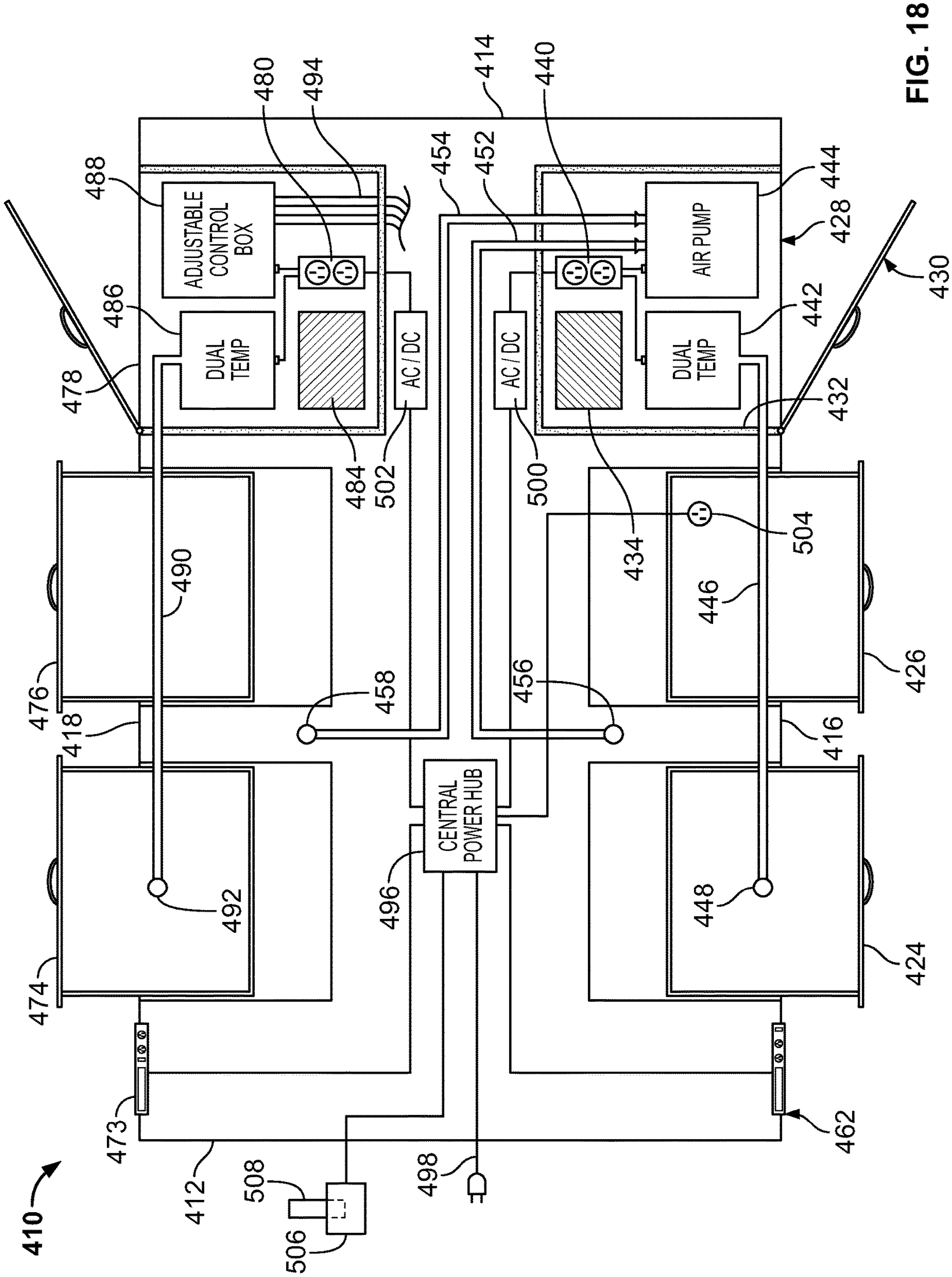
FIG. 18 is a schematic top view of the foundation of FIG. 17.

FIG. 18 is a schematic top view of the foundation 410, which shows the foundation 410 including an additional control panel 473, additional drawers 474 and 476 as well as an additional compartment 478 on the side 418 of the foundation 410. The compartment 478 includes electrical power outlets 480 and one or more air vents 482. The compartment 478 can contain a dual temperature unit 486 and an adjustable control box 488. The dual temperature unit 486 can connect to an air hose 490 that supplies conditioned air to an air outlet 492 extending to the second side 422 of the foundation 410. A set of cables 494 connect the adjustable control box 488 to one or more adjustable base motors (not shown) of a mechanical bed actuator system.

The foundation 410 includes a central power hub 496 which can supply power to the entire foundation 410 and all systems contained therein. The central power hub 496 can connect to a conventional wall outlet (not shown) via a single power cord 498. One or more AC/DC converters 500 and 502 can be electrically connected between the central power hub 496 and the electrical power outlets 440 and 480. The central power hub 496 can also power one or more additional electrical power outlets, such as an electrical power outlet 504 positioned in the drawer 426. Including the electrical power outlet 504 in the drawer 426 can allow for the foundation 410 to be upgraded and expanded with additional components powered via the electrical power outlet 504. The foundation 410 can be upgraded in a modular fashion, by adding one or more modules (not shown in FIG. 18) into the foundation, such as being inserted into one or more of the drawers 424, 426, 474, and 476, or by replacing one or more of the drawers 424, 426, 474, and 476. For example, in some embodiments the foundation 410 need not include the dual temperature units 442 and 486. In some of such embodiments, the foundation 410 can be designed with space sized and configured for adding one or more components, such as the dual temperature units 442 and 486. The power outlet 504 can be pre-installed in the foundation 410 for supplying power to later-added components even if not required for components that are originally included in the foundation 410.

In some embodiments, the central power hub 496 can include a system of power components contained within a discrete housing that is positioned within the foundation 410. In other embodiments, the central power hub 496 can include a collection of power components that are supported by the foundation 410 but not discretely housed within a separate housing. For example, the central power hub 496 can include a system of interconnected and/or interrelated power components that are distributed throughout the foundation 410, but that function as a central power source for other components of the foundation 410.

The foundation 410 can also include a remote controller hub 506 for receiving and docking a remote controller 506 that controls operation of the systems of the foundation 410. The remote controller hub 506 can be electrically connected to one or more of the central power hub 496, the pump 444, and the control panels 462 and 473. The main controller of the foundation 410 can be integrated with one of the control panels 462 and 473 or the pump 444. In embodiments where the pump 444 includes the main controller for the foundation 410, the pump 444 can include a wireless antenna for wirelessly communicating with and controlling the dual temperature units 442 and 486, the adjustable control box 488, the control panels 462 and 473, and any other components benefiting from central control by the foundation 410.

Figure 19:
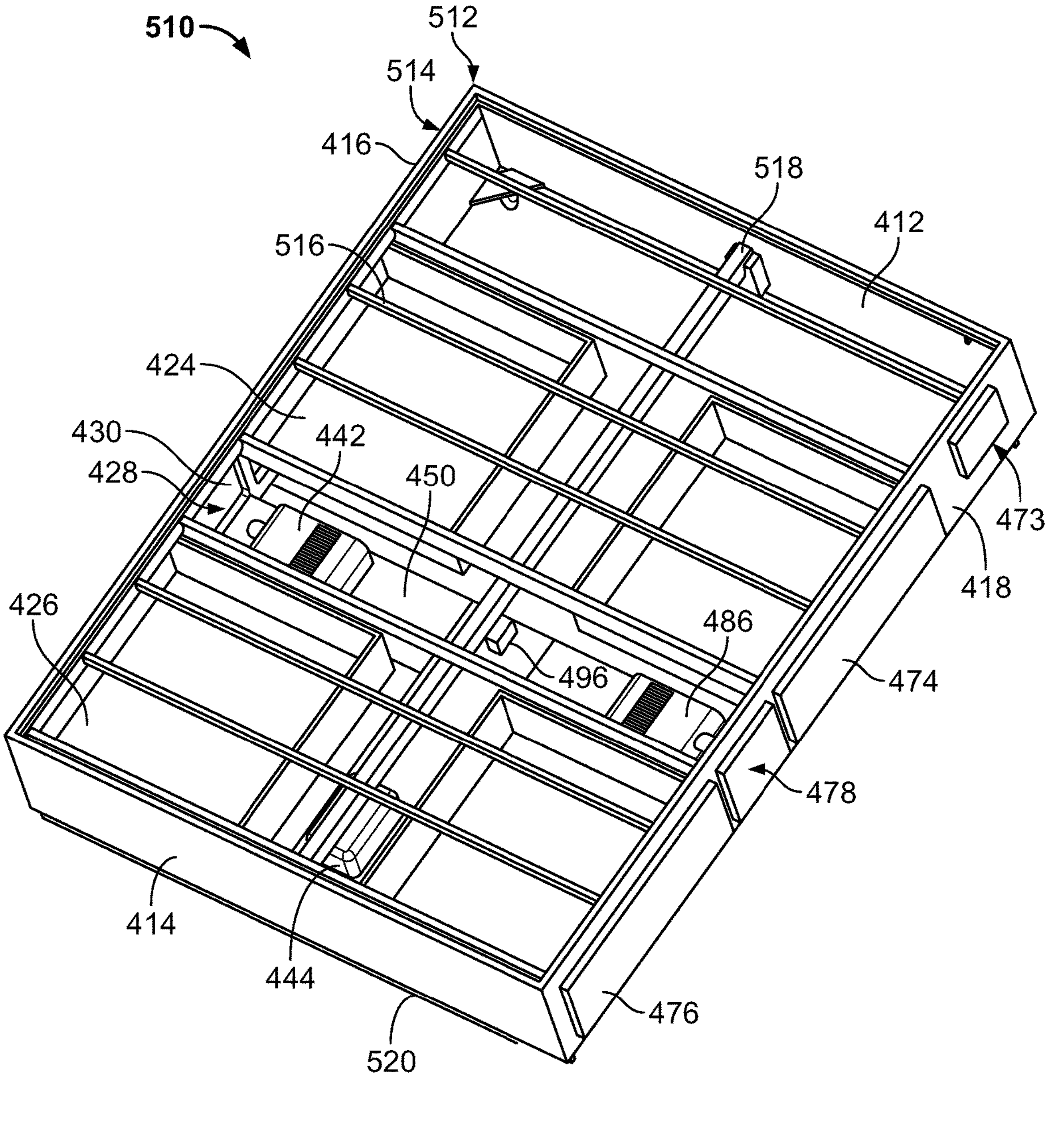
FIG. 19 is a perspective view of another alternative embodiment of a foundation of a bed system.

FIG. 19 is a perspective view of a bed system 510 having a foundation 512. The foundation 512 can be similar to the foundation 410 (shown in FIGS. 17 and 18) except the foundation 512 integrates certain components and features in a different manner. The foundation 512 includes a foundation structure 514 that includes the head 412, the foot 414, the sides 416 and 418, slat supports 516 extending from the side 416 to the side 418, and a main support 518 extending from the foot 414 to the head 412 under the slat supports 516. The slat supports 516 are positioned near a top of the foundation 512, above the drawers 424, 426, 474, 476, the compartments 428 and 478, the dual temperature air units 442 and 486, the pump 444, and the central power hub 496.

The foundation 510 includes the compartment 428 positioned between the drawers 424 and 426 on the side 416 and includes the compartment 478 between the drawers 474 and 476 on the side 418. The dual power air units 442 and 486 are housed in the compartments 428 and 478, respectively, so as to be positioned closer to the central portion 450 of the foundation 512. This can allow the dual power air units 442 and 486 to be positioned relatively close to the air hoses 86 and 88 (shown in FIG. 3), creating a shorter flow path from the dual power air units 442 and 486 to the dual temperature layer 80 (shown in FIG. 3). Positioning the dual power air units 442 and 486 and the air hoses 86 and 88 near the central portion 450 of the foundation 512, can allow for a connection to the dual temperature layer 80 at a central, non-articulating portion of an adjustable mattress. This can allow the air hoses 86 and 88 to be shorter, to be less bulky, and to experience less wear during articulation of other portions of the adjustable mattress.

The pump 444 is housed in the foundation 512, between the drawers 426 and 476, proximate the foot 414, and away from the head 412. The central power hub 496 is housed in the foundation 512, between the compartments 428 and 478, near the central portion 450. In alternative embodiments, the pump 444, the central power hub 496, and the dual power air units 442 and 486 can be positioned elsewhere in the foundation 512 as suitable for the application.

Light strips 520 can be integrated with the foundation 510. In one embodiment, the light strips 520 can be positioned on three sides of the foundation 510: the foot 414, the side 416, and the side 418. The light strips 520 can be connected to a bottom of the foundation 510, and can be positioned to direct light in a direction that is downward and outward from the foundation 510. Alternatively, the light strips 520 can be positioned to direct light in a direction that is downward and inward under the foundation 510. The light strips 520 can be powered via the central power hub 496 and can be controlled by a controller of the bed system 510 (e.g. the pump controller of the pump 444 or the control panel 473). The light strips 520 can be activated manually by a user entering a user input via the control panel 473. The light strips 520 can also be activated automatically by the bed system 510, such as when the bed system 510 senses that a user that was previously resting on the bed system 510 has now left the bed system 510.

Figure 20:
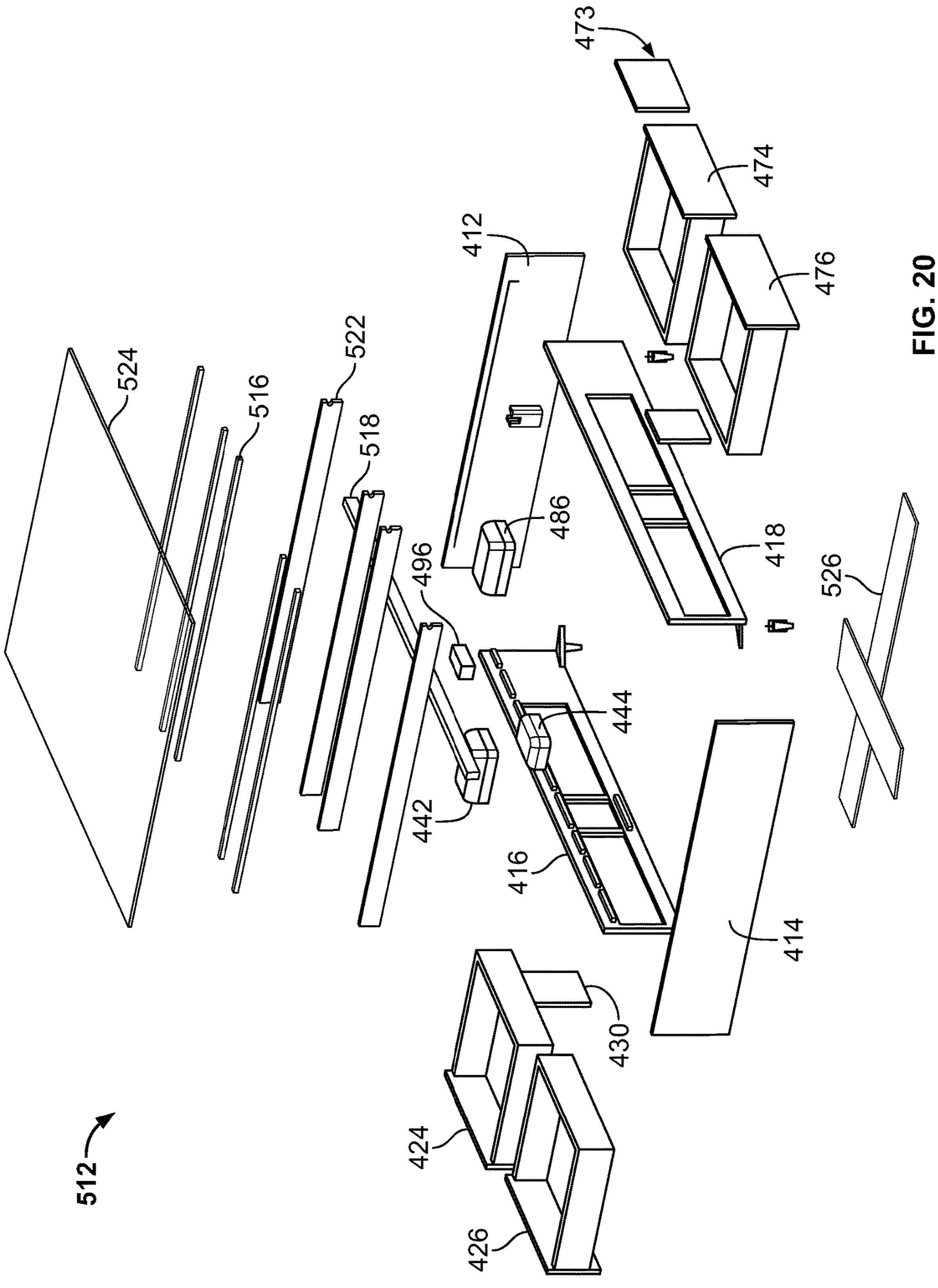
FIG. 20 is an exploded perspective view of the foundation of FIG. 19.

FIG. 20 is an exploded perspective view of the foundation 512. The exploded view of FIG. 20 can help better illustrate certain components of the foundation 512. FIG. 20 also shows the foundation 512 including a set of beams 522 upon which the slat supports 516 rest and a flat top structure 524 which rests on and is supported by the slat supports 516. The flat top structure 524 can provide a relatively flat surface for supporting a mattress (not shown) of the bed system 510. The foundation 512 also includes base supports 526 upon which the dual temperature air units 442 and 486, the pump 444, and the central power hub 496 can be mounted.

Figure 21:
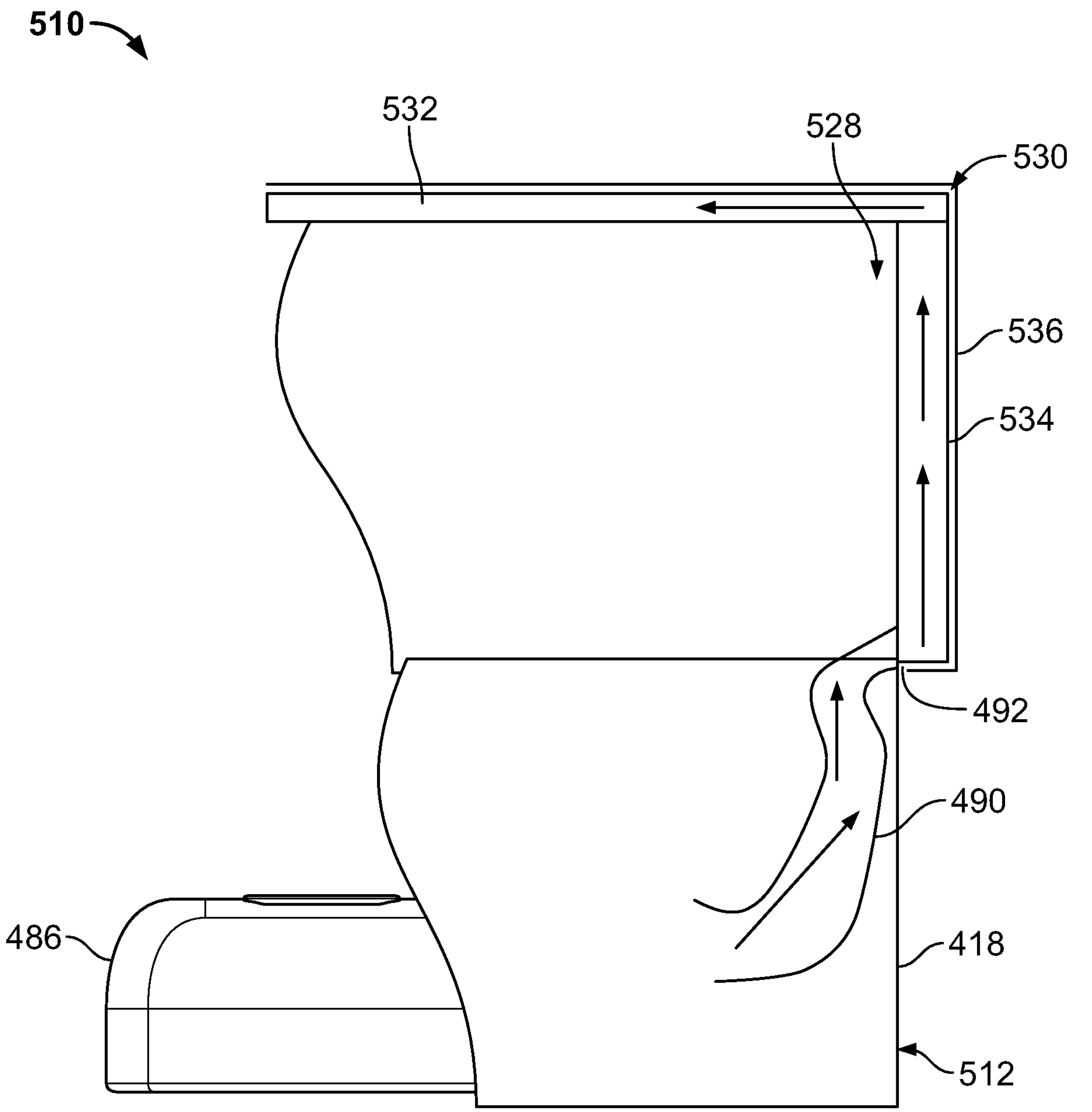
FIG. 21 is a sectional view of a portion of a bed system having the foundation of FIG. 19.

FIG. 21 is a schematic sectional view of a portion of the bed system 510 having the foundation 512. The bed system 510 includes a mattress 528 resting on the foundation 512. A dual temperature system 530 includes a dual temperature layer 532 and an air hose 534 fluidically connected to the dual temperature air unit 486. The foundation 512 includes the air hose 490 extending through the foundation 512 from the dual temperature air unit 486 to the side 418 of the foundation 512 where the air hose 490 connects to the air hose 534 at the air outlet 492. The air hose 534 extends from the side 418 of the foundation 512, along a side of the mattress 528, to the dual temperature layer 532 on a top of the mattress 528. A fitted sheet 536 covers the mattress 528, the dual temperature layer 532, and the air hose 534. Thus, the bed system 510 can allow the dual temperature system 530 to be substantially covered and concealed using a conventional fitted sheet 536.

Figure 22:
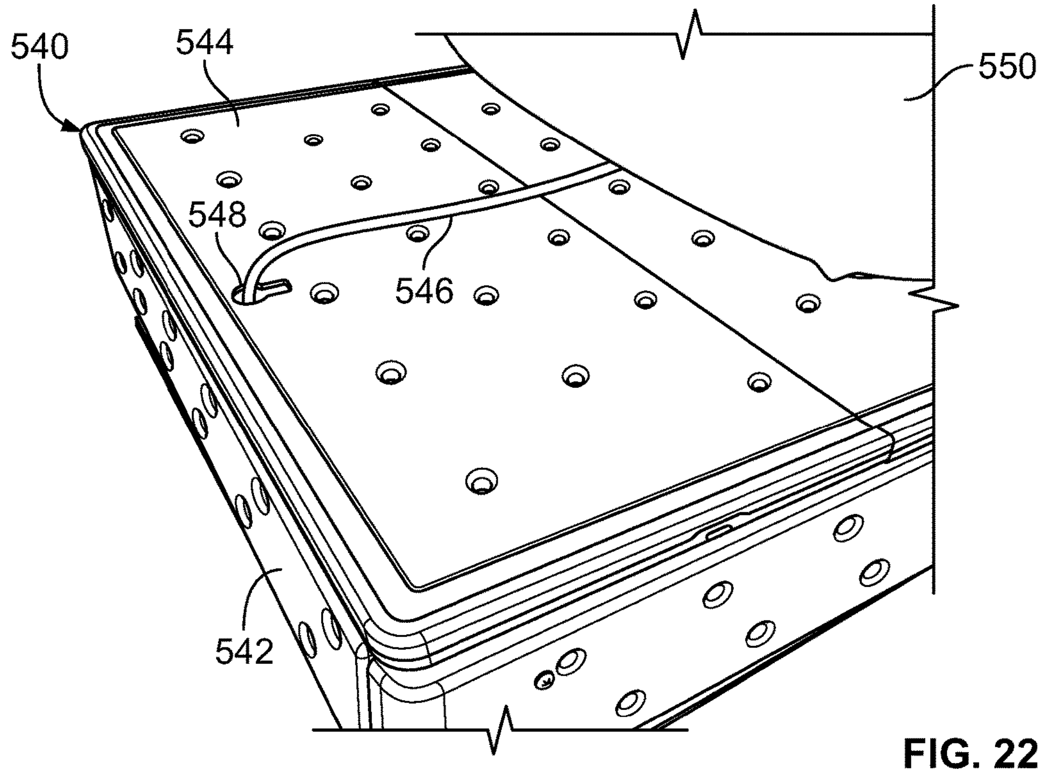
FIG. 22 is a perspective view of a module for use in a foundation of a bed system, with the module in a closed position.

FIG. 22 is a perspective view of a module 540 for use in a foundation of a bed system, such as the foundations 410 and 512 (shown in FIGS. 17-21). As illustrated in FIG. 22, the module 540 is in a closed position. The module 540 includes a housing 542 and an openable lid 544. An air hose 546 is extending out of a hole 548 in the lid 544.

In some embodiments, the module 540 can be added to an existing foundation to add components to upgrade the foundation. For example, the module 540 can be added to the foundation 410 (shown in FIGS. 17-18) by being inserted into one or more of the drawers 424, 426, 474, and 476 or by replacing one or more of the drawers 424, 426, 474, and 476.

In other embodiments, the module 540 can form a part of a foundation that is formed essentially of a combination of modules 540. For example, the module 540 can be one of a set of 4, 6, or 8 separate modules that combine to form a foundation to support a mattress 550. As shown in FIG. 22, the mattress 550 is resting on and supported by the module 540.

Figure 23:
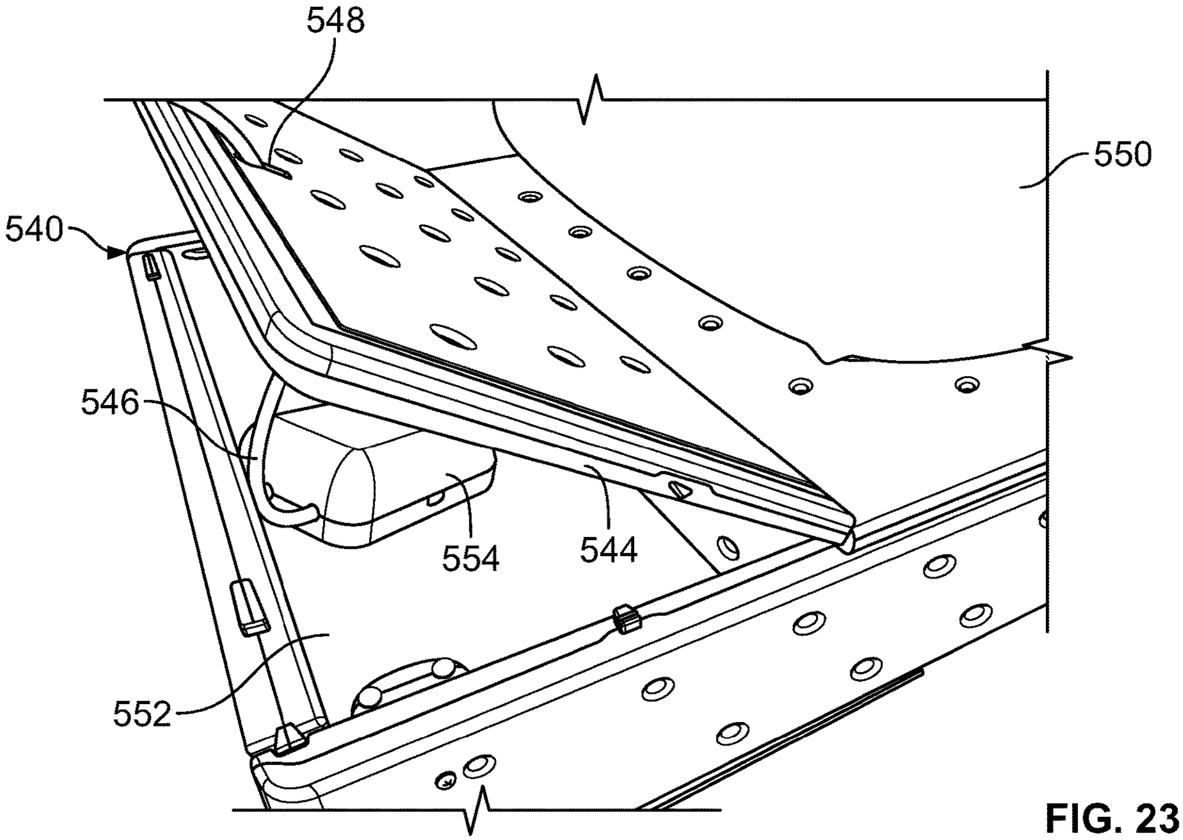
FIG. 23 is a perspective view of the module of FIG. 22, with the module in an open position.

FIG. 23 is a perspective view of the module 540 in an open position. The lid 544 is open so as to expose a compartment 552 inside the housing 542. In the illustrated embodiment, a pump 554 is positioned in the compartment 552 of the module 540. In other embodiments, the module 540 can house other components of a bed system or can house nothing at all.

Figure 24:
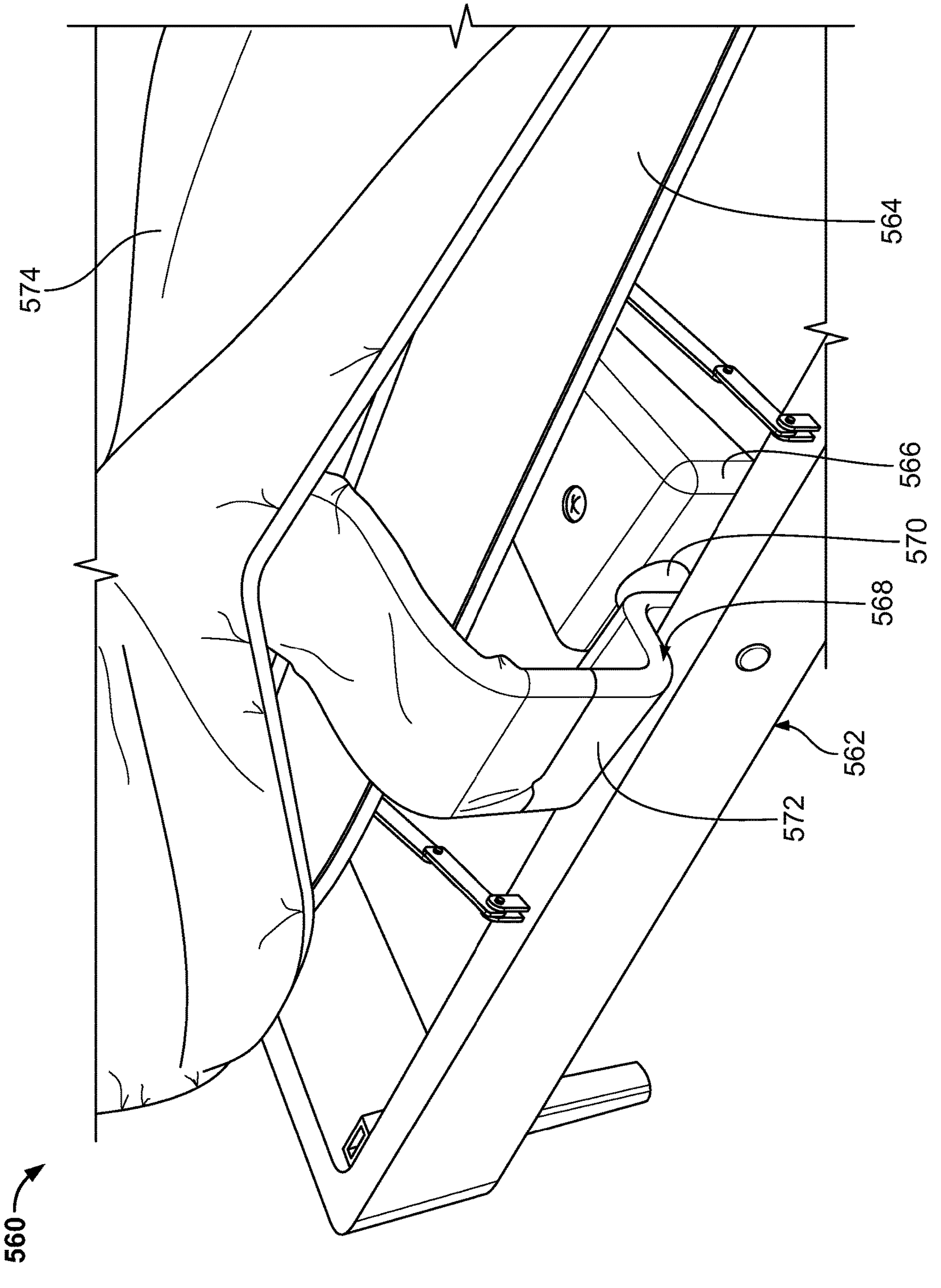
FIG. 24 is a perspective view of an embodiment of a bed system, showing a foundation, a mattress, and an air hose.

FIG. 24 is a perspective view of a bed system 560, including a foundation 562 and a mattress 564. A dual temperature air unit 566 is positioned in the foundation 562 and is attached to an air hose 568 extending from the dual temperature air unit 566 to a dual temperature layer (not shown). The air hose 568 has a substantially cylindrical connector 570 for connecting to the dual temperature air unit 566. The air hose 568 changes its shape from substantially cylindrical to substantially oblong as it extends away from the dual temperature air unit 566 and extends out of the foundation 562. The air hose 568 has an oblong and relatively flat section 572 as it extends along a side of the mattress 564. A fitted sheet 574 is positioned on the mattress 564 but is lifted to expose the oblong and relatively flat section 572 of the air hose 568.

Figure 25:
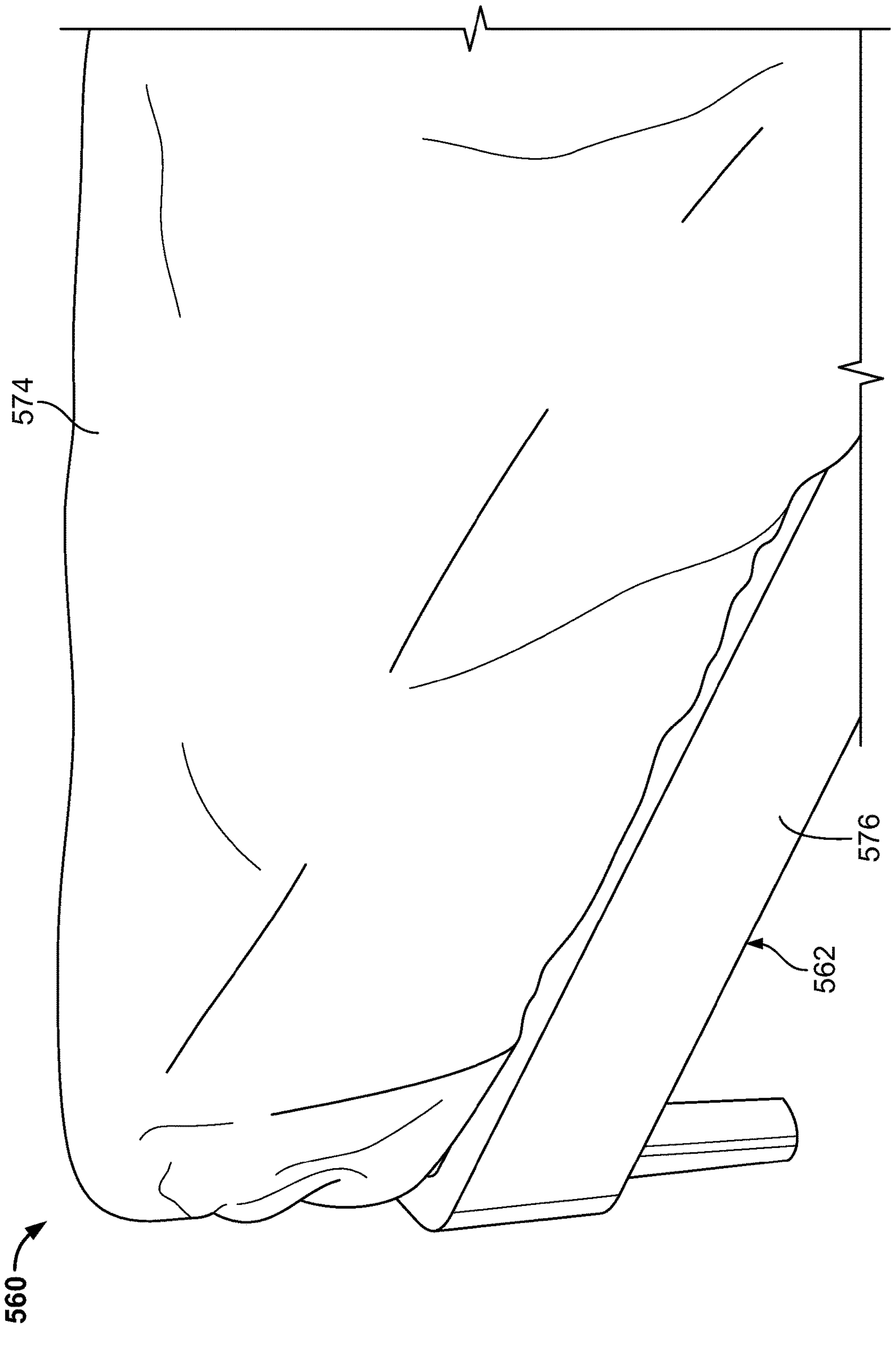
FIG. 25 is a perspective view of the bed system of FIG. 24 with a fitted sheet covering the mattress and the air hose.

FIG. 25 is a perspective view of the bed system 560 with the fitted sheet 574 positioned to cover the mattress 564 (shown in FIG. 24) and the air hose 568 (shown in FIG. 24). As shown in FIG. 25, the air hose 568 and the dual temperature air unit 566 are substantially concealed by the fitted sheet 574 and a side 576 of the foundation 562.

Figure 26:
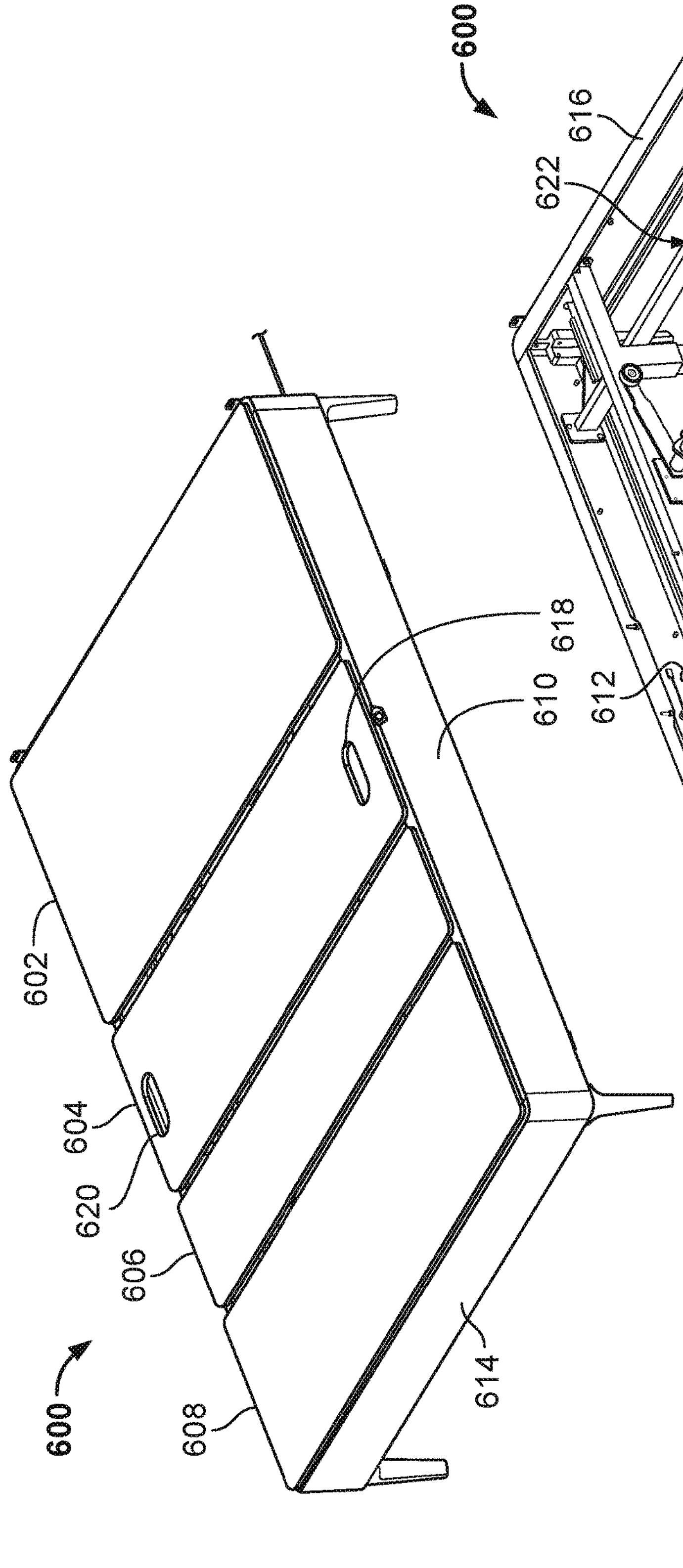
FIG. 26 is a perspective view of an embodiment of a foundation.

FIG. 26 is a perspective view of a foundation 600. In some embodiments, the foundation 600 can have similar function and features as foundations described above, such as the foundation 410 (shown in FIGS. 17 and 18). As illustrated in FIG. 26, the foundation 600 can include one or more deck panels 602, 604, 606, 608, side rails 610 and 612 (the side rail 612 is not shown in FIG. 26), a foot rail 614, and a head rail 616 (not shown in FIG. 26). In some embodiments the foundation 600 can be an articulating foundation, such that one or more of the deck panels 602, 604, 606, 608 are raised and lowered in response to actuating motors. For example the deck panel 602 can be a head deck panel for raising and lowering a head of a mattress. The deck panel 604 can be a back or hip deck panel that remains substantially stationary during actuation. The deck panel 606 can be a thigh deck panel for raising a thigh section of the mattress at an angle. The deck panel 608 can be a foot deck panel for raising and lowering a foot portion of the mattress. In some embodiments, the foundation 600 can be a non-articulating foundation, such that the deck panels 602, 604, 606, 608 are not raised and lowered in response to actuating motors.

The deck panels 602, 604, 606, 608 can be removably connected to the foundation 600 for selectively covering and exposing interior components of the foundation 600. In embodiments where the foundation 600 is an articulating foundation, the deck panels 602, 604, 606, 608 can be connected to an articulation mechanism (not shown in FIG. 26) for articulating one or more of the deck panels 602, 604, 606, 608.

In the illustrated embodiment, the deck panel 604 defines a pair of passages 618 and 620 which can accommodate connections between components below and above the deck panels 602, 604, 606, 608. For example, one or more hoses (not shown in FIG. 26) can extend from a component, such as a pump, positioned below the deck panels 602, 604, 606, 608 to a portion of a mattress positioned above the deck panels 602, 604, 606, 608, such as one or more inflatable mattress air chambers as described above. The passages 618 and 620 can extend through the a non-articulating deck panel 604 so as to help conceal hoses extending therethrough, even when one or more of the deck panels 602, 606, 608 are articulated up.

Figure 27:
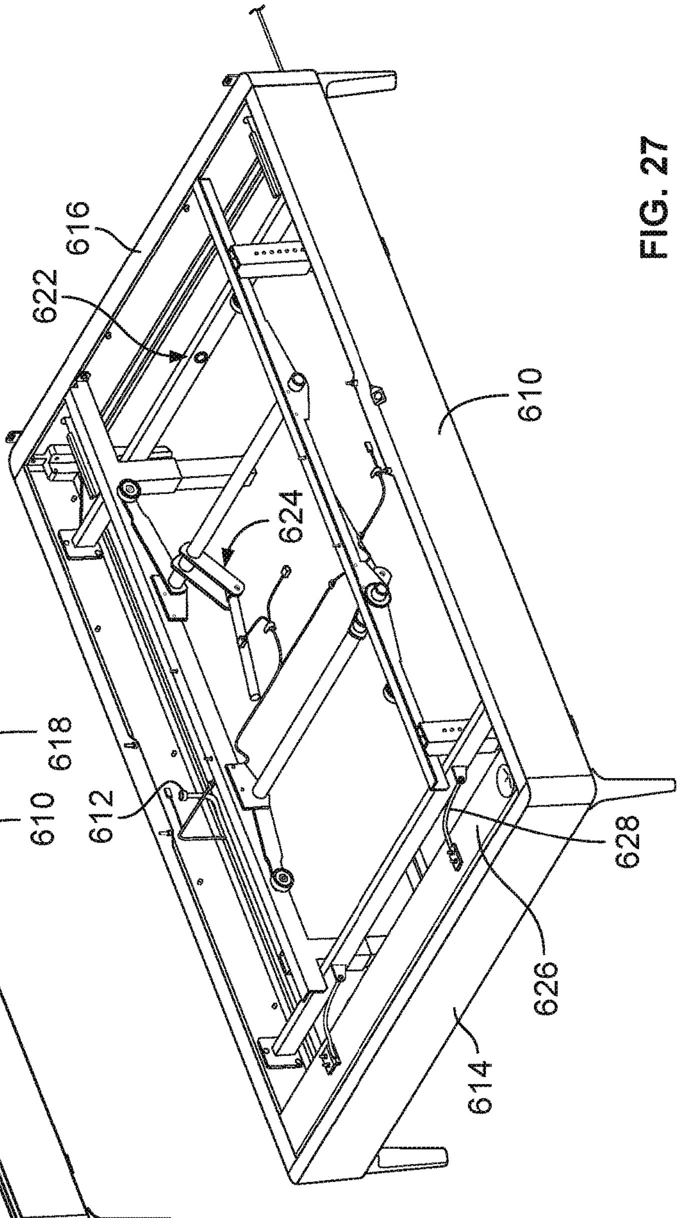
FIG. 27 is perspective view of the foundation of FIG. 26, with deck panels removed.

FIG. 27 is a perspective view of the foundation 600, with the deck panels 602, 604, 606, 608 (shown in FIG. 26) removed, exposing interior components of the foundation 600. With the deck panels 602, 604, 606, 608 removed, inner portions of the head rail 616 and the side rail 612 can be viewed. FIG. 27 also shows the foundation 600 having a sub frame 622 and an articulation mechanism 624 positioned in the foundation and at least partially concealed by the deck panels 602, 604, 606, 608 and the rails 610, 612, 614, 616. The sub frame 622 can provide structural support for other components of the foundation 600, including the deck panels 602, 604, 606, 608, the rails 610, 612, 614, 616, and the articulation mechanism 624. The deck panels 602, 604, 606, 608 can be connected to the sub frame 622 via the articulation mechanism 624.

The foundation 600 can include a cover 626 near a foot of the foundation 600 for covering components contained within the foundation 600. The cover 626 can be hingedly connected to the sub frame 622 via an opening mechanism 628. At least some components in the foundation 600 can be substantially concealed by the cover 626 and the foot rail 614 when the cover 626 is in a closed position even when the deck panel 608 is raised to expose the cover 626.

Figure 28:
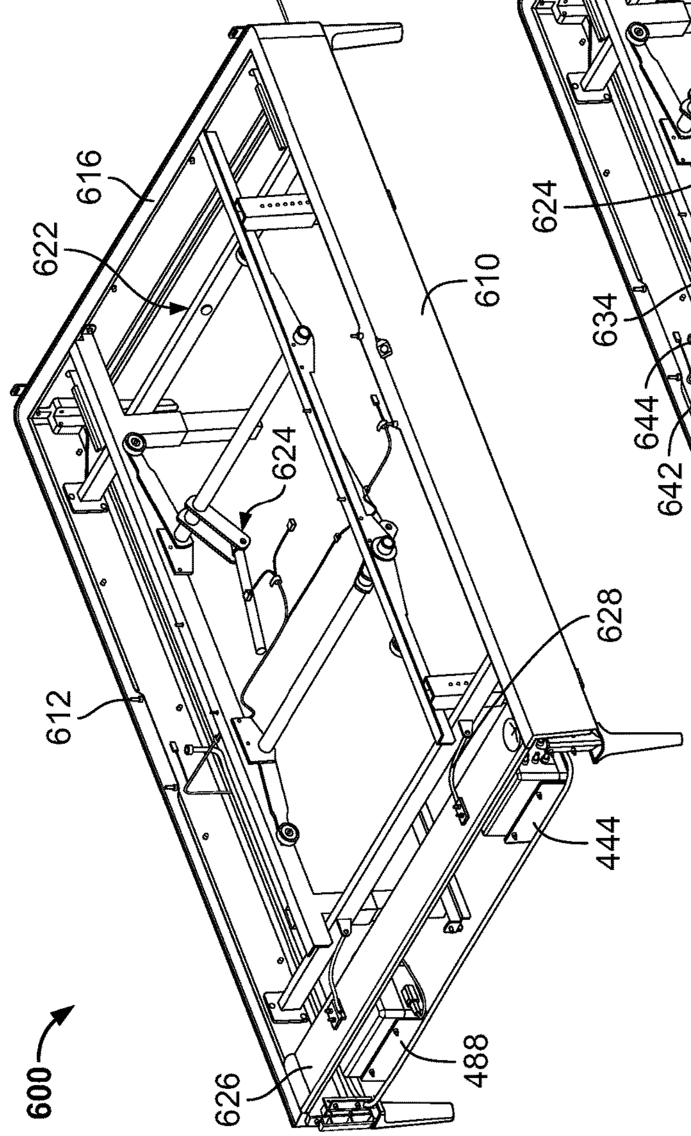
FIG. 28 is perspective view of the foundation of FIG. 26, also with a foot rail removed.

FIG. 28 is a perspective view of the foundation 600, with the foot rail 614 also removed. As shown in FIG. 27, the pump 444 and the adjustable control box 488 can be positioned below the cover 626. The cover 626 can be pivoted open to expose and allow access to the pump 444 and the adjustable control box 488 to allow service of components contained within.

Figure 29:
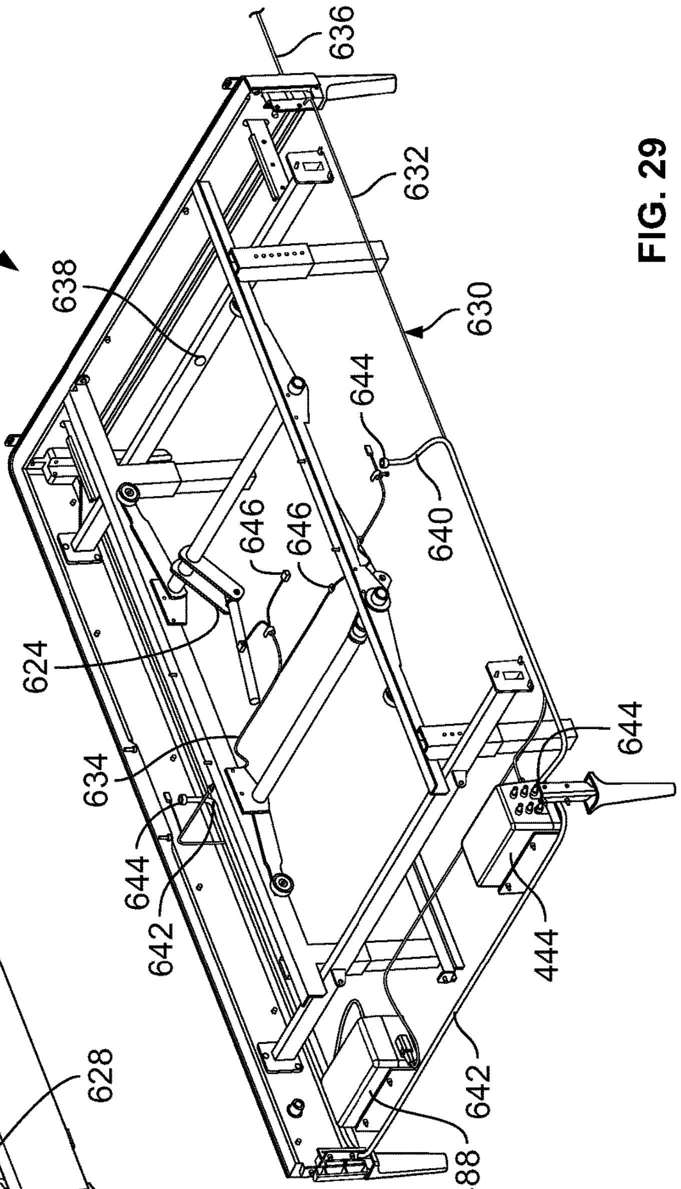
FIG. 29 is perspective view of the foundation of FIG. 26, also with a cover and side rail removed.

FIG. 29 is a perspective view of the foundation 600, with the cover 626 and the side rail 610 also removed. FIG. 29 shows a central power hub 630, which can include a high voltage power system 632 and a low voltage power system 634. The high voltage power system 632 can include an AC (alternating current) power cord 636 which can extend from the foundation 600 to a power source, such as an electrical wall outlet. The high voltage power system 632 can supply power to the pump 444 and to the adjustable control box 488. The low voltage power system 634 can extend from the adjustable control box 488 to one or more additional components of the foundation, such as one or more actuation motors (not shown in FIG. 29) of the articulation mechanism 624, an under-bed lighting system 638, and/or other components suitable for being powered by the foundation 600. In some embodiments, the high voltage power system 632 can be an AC power system that operates, for example, at 120V, and the low voltage power system 634 can be a DC (direct current) power system that operates, for example, at one or more lower voltages than the high voltage power system.

FIG. 29 also shows air hoses 640 and 642 extending from the pump 444. The air hoses 640 and 642 can extend along a perimeter of the foundation 600 to a central portion of the foundation 600, and extend up through the passages 618 and 620 (shown in FIG. 26) to supply air for controlling pressure in air chambers of a mattress. The air hoses 640 and 642 can include connectors 644 configured for quickly connecting and disconnecting at one or more end.

Cords of the high voltage power system 632 and the low voltage power system 634 can also extend along a perimeter of the foundation 600 and can also include connectors 646 configured for quickly connecting and disconnecting at one or more end.

Components, such as the pump 444, the adjustable control box 488, the hoses 640, 642, and the central power hub 630 can be positioned within the foundation 600 in a manner that is substantially concealed from view but is also configured to be repeatably disassembled and reassembled. Components can be disconnected at one or more of the connectors 644 and 646 to be removed from the foundation 600 without necessarily requiring removal of extended length of hose or cable.

In some embodiments, lengths of the hoses 640, 642 and/or one or more cords of the central power hub 630 can extend along and be connected to a structural or aesthetic component of the foundation 600. For example, the hose 640 can extend along and be connected to the side rail 610 (not shown in FIG. 29) so as to be concealed and out of the way when the foundation 600 is fully assembled. During disassembly, the hose 640 can be disconnected from the pump 444 via the connector 644 and can be disconnected from an air chamber of the mattress via the connector 644 at an opposite end of the hose 640. In some of such embodiments, the hose 640 can remain attached to the side rail 610, ready to be reconnected to the pump 444 and the air chamber of the mattress when reassembled. In other embodiments, the hose 640 can be disconnected from the side rail 610 and then reconnected when reassembled. In a similar manner, the hose 642 can be connected, either releasably or substantially permanently, to one or both of the foot rail 614 and the side rail 612.

Moreover, cords of the central power hub 630 can also extend along and be connected to one or more rails so as to be concealed and out of the way when the foundation 600 is fully assembled. For example, a cord of the high voltage power system 632 can extend along and be connected to the side rail 610 and extend to the pump 444, while another cord of the high voltage power system 632 can extend along and be connected to the side rail 610 and extend to the adjustable control box 488. Both cords of the high voltage power system 632 can be detachably connected to their respective components via the connectors 646. The adjustable control box 488 can convert power from the high voltage power system 632 to lower voltage DC power for use by components on the low voltage power system 634. One or more cords of the low voltage power system 634 can extend along one or more rails and/or structural components to the electrical component being powered, such as a lamp of the under-bed lighting system 638. In some embodiments, the high and low voltage power systems 632 and 634 can include more or fewer cords and other components than as illustrated.

Figure 30:
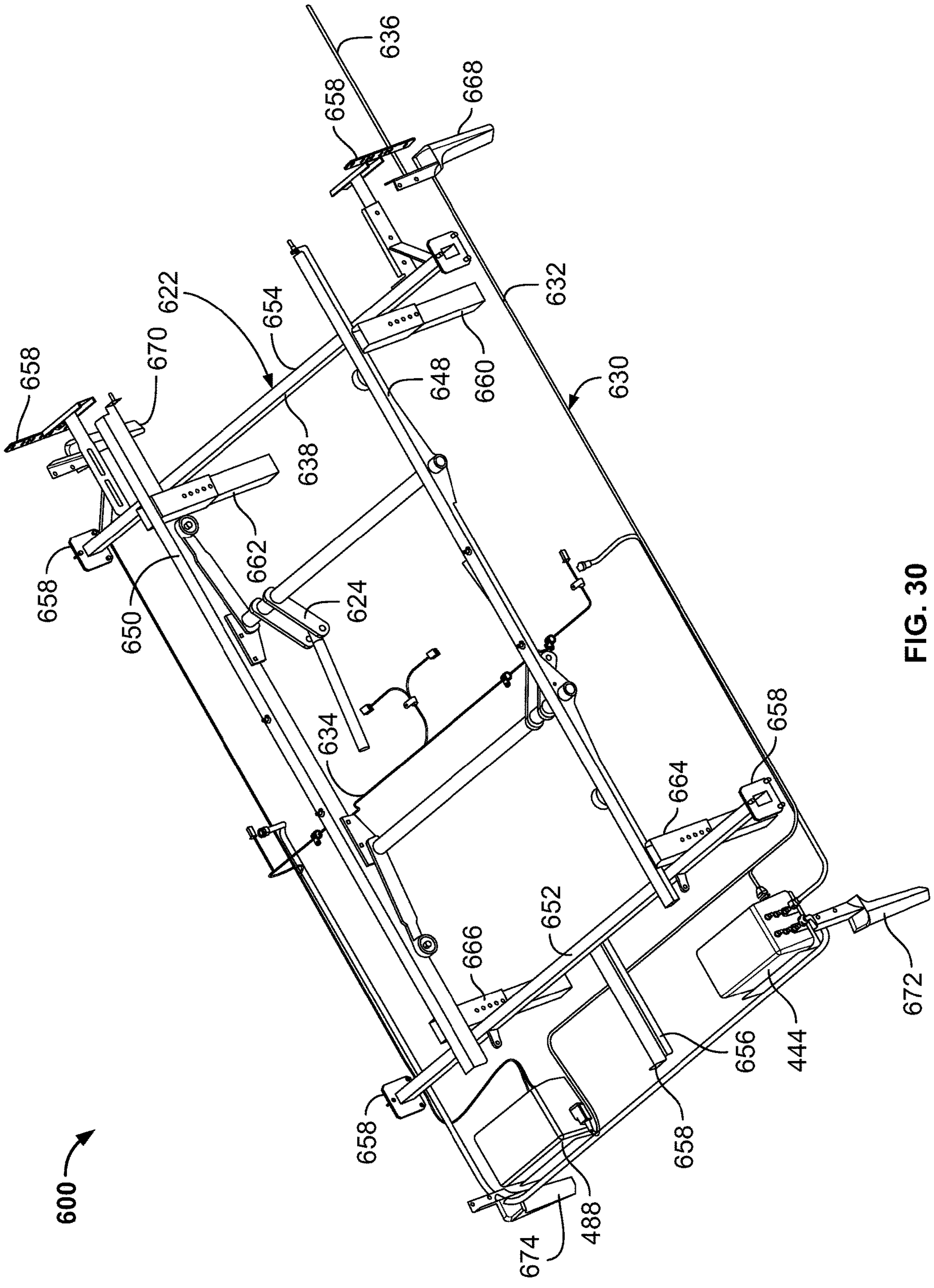
FIG. 30 is perspective view of the foundation of FIG. 26, also with a head rail and side rail removed.

FIG. 30 is a perspective view of the foundation 600, with the head rail 616 and the side rail 612 also removed. FIG. 30 shows the sub frame 622 having a plurality of interconnected supports 648, 650, 652, 654, 656. The supports 648, 650, 652, 654, 656 can extend substantially in a horizontal plane. The supports 648 and 650 can extend along at least part of a length of the foundation 600, substantially parallel to the side rails 610 and 612 and spaced inward of the side rails 610 and 612. The supports 652 and 654 can extend along at least part of a width of the foundation 600, substantially parallel to the head rail 616 and the foot rail 614 and spaced inward of the head rail 616 and the foot rail 614. The supports 652 and 654 can be positioned below and extending across the supports 648 and 650 to provide strength and rigidity for the sub frame 622. The supports 648 and 650 can have a substantially flat upper surface configured for supporting the deck panels 602, 604, 606, 608 (shown in FIG. 26) when the deck panels 602, 604, 606, 608 rest on the supports 648 and 650. The support 656 can extend from the support 652 in a cantilevered manner toward the foot of the bed. One or more connection brackets 658 can be connected to one or more of the supports 648, 650, 652, 654, 656 and be configured for allowing removable connection of the rails 610, 612, 614, 616 to the supports 648, 650, 652, 654, 656.

In some embodiments, the foundation 600 can include adjustable legs 660, 662, 664, 666 connected to the sub frame 622. The legs 660, 662, 664, 666 can be connected to the sub frame 622 at positions spaced inward from a perimeter of the foundation 600. In some embodiments, the legs 660, 662, 664, 666 can be connected at locations configured to substantially conceal much of the legs 660, 662, 664, 666 from view and also keep the legs 660, 662, 664, 666 away from positions likely to be kicked by a user. In some embodiments, the legs can be positioned at locations of intersection of structural supports of the sub frame 622 to improve strength and support. For example, in some embodiments the leg 660 can be positioned at an intersection between the support 648 and the support 654, the leg 662 can be positioned at an intersection between the support 650 and the support 654, the leg 664 can be positioned at an intersection between the support 648 and the support 652, and the leg 666 can be positioned at an intersection between the support 650 and the support 652. The legs 660, 662, 664, 666 can be telescoping legs that can adjust to different heights as further described with respect to FIG. 31.

In some embodiments, the foundation 600 can include additional aesthetic legs 668, 670, 672, and 674. The legs 668, 670, 672, and 674 can be configured such that they are required to support little to no load, with the bulk of the load supported by the legs 660, 662, 664, and 666. The legs 668, 670, 672, and 674 can be positioned at or near a perimeter of the foundation 600, and can perform a substantially aesthetic function—allowing for designs that are not necessarily configured to be load bearing. In some embodiments, the legs 668, 670, 672, and 674 can be configured to support some load of the foundation 600, but still be part of an overall design that places the bulk of the load of the foundation 600 on the legs 660, 662, 664, and 666. Combining the design and placement of the legs 660, 662, 664, and 666 with that of the legs 668, 670, 672, and 674 can allow the foundation 600 to have one set of legs (e.g. the legs 660, 662, 664, and 666) that both are strong and include an adjustable feature but may be less aesthetically pleasing than other legs. The foundation can position those legs (660, 662, 664, and 666) in a location that is substantially concealed from above and include a second, more aesthetically pleasing set of legs (e.g. the legs 668, 670, 672, and 674) that may not be both strong and adjustable.

Figure 31:
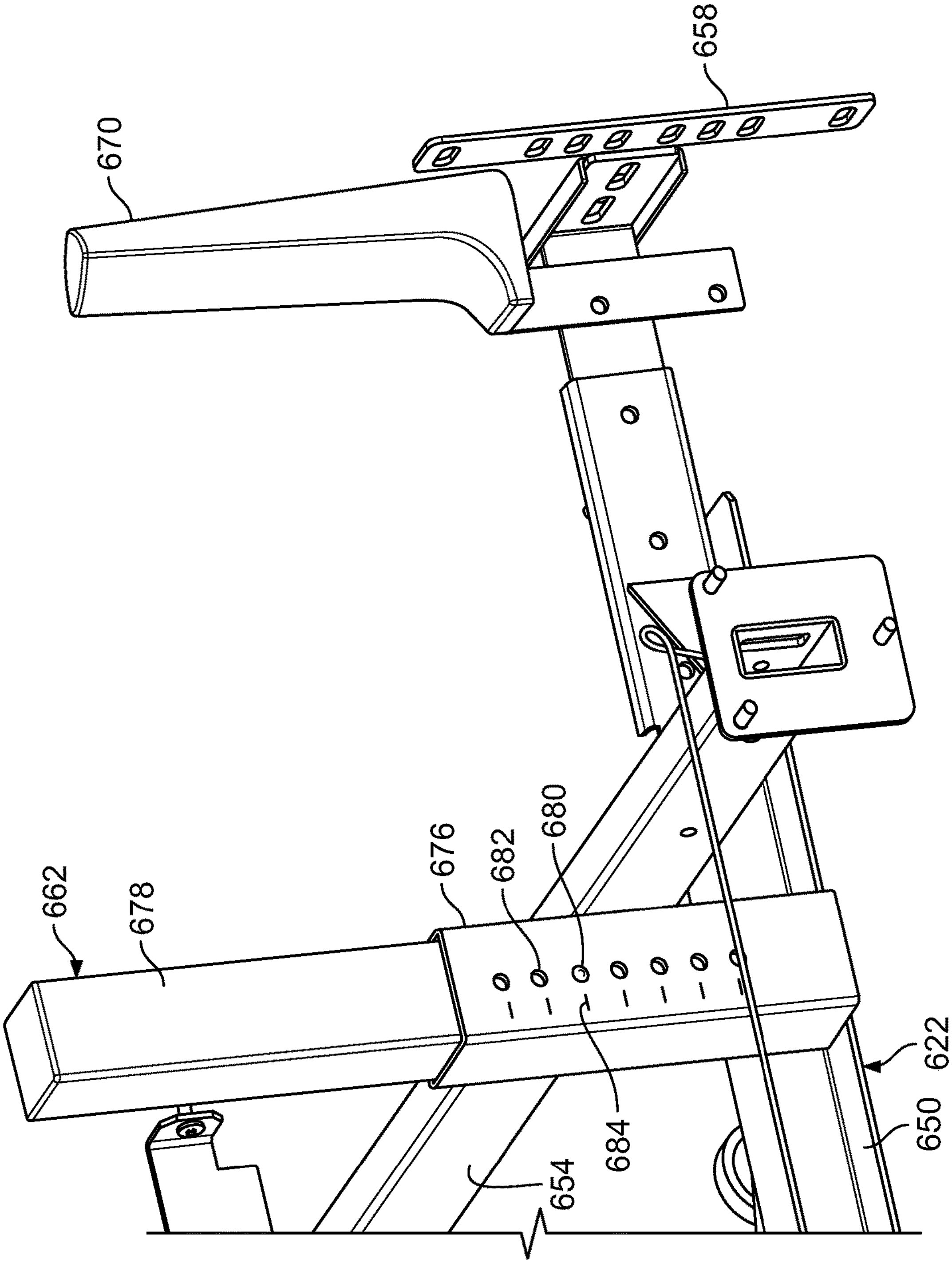
FIG. 31 is an enlarged perspective view of legs and a sub frame of the foundation of FIG. 26.

FIG. 31 is an enlarged perspective view of the legs 662 and 670 and a portion of the sub frame 622. The sub frame 622 is shown upside-down in FIG. 31, with the legs 622 and 670 extending upward as-shown (which would be downward as in operation). The leg 670 is shown connected at the bracket 658 and the leg 662 is shown connected to the supports 650 and 654. In one embodiment, the leg 662 can be welded to both of the supports 650 and 654 to improve structural strength. In other embodiments, the leg 662 can be welded to one of the supports 650 and 654 and can be removably connected to the other of the supports 650 and 654.

The leg 662 can be a telescoping leg with a sleeve 676 and a pole 678 extending from the sleeve 676. The sleeve 676 can be fixedly connected to the sub frame 622 at a first end of the sleeve 676 and can define an opening at a second end of the sleeve 676 for receiving the pole 678. In some embodiments, the pole 678 can be positioned at least partially inside the sleeve 676 to slide between adjustable height positions.

In some embodiments, the leg 662 can be adjustable via a spring detent mechanism 680. In some embodiments, the pole 678 can be a tubular sleeve with the spring detent mechanism 680 positioned inside and connected thereto. The sleeve 676 can define a series of holes 682 along a length of the sleeve 676 for receiving the spring detent mechanism 680 at selected ones of the holes 682 to adjust height of the leg 662, and consequently, adjust height of the foundation 600. The leg 662 can also include a series of height indicia 684 configured for indicating adjusted height of the leg 662. In some embodiments, the height indicia 684 can be aligned with each of the holes 682 to indicate height based upon which of the holes 682 the spring detent mechanism 680 is positioned in. In other embodiments, the height indicia 684 can be positioned elsewhere on the leg 662, such as on the pole 678.

In some embodiments, the leg 662 can be adjusted by up to about 4.5 inches in about 0.75 inch increments. In other embodiments, the leg 662 can be adjusted by up to between about 3 inches and about 6 inches in suitable increments. In other embodiments, the leg 662 can be adjusted by up to about 6 inches in suitable incriments.

In some embodiments, the legs 660, 664, and 666 can be configured substantially similar to the leg 662, such that all such adjustable legs can be operated in a similar manner. Once the legs 660, 662, 664, and 666 are adjusted to a desired height, aesthetic legs of suitable height can then be selected and attached as the legs 668, 670, 672, and 674. In some embodiments, the legs 668, 670, 672, and 674 are of a fixed height, and different legs having a different height can be attached when the foundation 600 is adjusted to that height.

In other embodiments, the legs 668, 670, 672, and 674 can also be adjustable. In such embodiments, strength of the adjustment mechanism need not necessarily be as strong as that of the legs 660, 662, 664, and 666, which can be configured to support the bulk of the weight of the foundation 600. In some embodiments, the legs 668, 670, 672, and 674 can be omitted. In some such embodiments, the foundation can be supported by the legs 660, 662, 664, and 666 positioned inward of the perimeter of the foundation 600, with no legs positioned at the perimeter of the foundation 600.

As described above and shown in the figures, bed systems can include a number of components integrated and combined together in a compact, user-friendly, and functional manner. Such bed systems can include one or more of an air bed pump system, dual temperature air units, storage compartments, and/or mattress actuators with a foundation, an air mattress, and a dual temperature layer in a manner that can reduce cost of manufacturing and assembly while creating a product that is more user-friendly and includes features that improve user comfort and sleep quality.

A number of embodiments of the inventions have been described. Nevertheless, it will be understood that various modifications can be made without departing from the spirit and scope of the invention. For example, in some embodiments the bed need not include adjustable air chambers. Moreover, in some embodiments various components of the foundation 600 can be shaped differently than as illustrated. Additionally, different aspects of the different embodiments of foundations, mattresses, and other bed system components described above can be combined with other aspects as suitable for the application. Accordingly, other embodiments are within the scope of the following claims.

What is claimed is:

1. A bed system, comprising:

a mattress having a mattress top, a mattress bottom, mattress sides, a mattress head, and a mattress foot, the mattress comprising:

a temperature control layer positioned in the mattress proximate the mattress top;

an air bladder layer positioned in the mattress under the temperature control layer, wherein the air bladder layer includes one or more air chambers;

at least one air duct extending from the mattress bottom along an exterior side of the air bladder layer to the temperature control alyer so as to be fluidically connected to the themperature control layer; and a foundation having a foundation top, a foundation bottom, foundation sides, a foundation head, and a foundation foot, the foundation comprising:

a foundation platform positioned at the foundation top, wherein the foundation platform is sized and shaped to be positioned under the mattress bottom to support the mattress, wherein the foundation platform defines at least one cutout extending through the foundation platform proximate an outer edge of the foundation platform;

a hinge mechanism at the foundation head connecting the foundation platform to the foundation sides, the hinge mechanism configured to allow the foundation platform to pivot about the hinge mechanism between an open position and a closed position, wherein when pivoting from the closed position to the open position, the entire mattress is tilted;

an air unit positioned in the foundation, wherein the air unit is fluidically connected to the temperature control layer along a first flow path at least partially defined by the at least one air duct, the first flow path extending through the at least one cutout when the foundation platform is positioned in the closed position; and a pump positioned in the foundation, wherein the pump is fluidically connected to at least one of the one or more air chambers by a second flow path that extends through the at least one cutout when the foundation platform is positioned in the closed position.

2. The bed system of claim, 1, wherein the foundation further comprises foundation legs extending down from the foundation bottom to support the foundation.

3. The bed system of claim 1, wherein the foundation further comprises sound dampening material configured to reduce noise of the air unit.

4. The bed system of claim 1, wherein the air unit further comprises:

an air connection structure that extends upward past the foundation platform and into a bottom portion of the at least one air duct so as to connect to the at least one air duct when the foundation platform is positioned in the closed position, wherein the air connection structure defines a portion of the first flow path.

5. The bed system of claim 1, wherein the temperature control alyer comprises a left temperature control portion positioned for controlling temperature at the mattress top for a first user and a right temperature control portion positioned for controlling temperature at the mattress top for a second user, wherein the at least one air duct comprises left and right air ducts fluidically connected to the left and right temperature control portions, respectively, wherein the foundation comprises left and right air connection structures configured to extend upward from the foundation into the mattress such that the left air connection structure extends into the left air duct and the right air connection structure extends into the right air duct.

6. The bed system of claim 1, wherein the temperature control layer is configured to allow air flow through one or more portions of the temperature control layer, wherein the mattress further comprises a foam layer, and wherein the temperature control layer and the foam layer are both positioned above the air bladder layer.

7. The bed system of claim 1, wherein the at least one air duct extends along an exterior of the mattress.

8. The bed system of claim 1, wherein the at least one cutout extends inward from a perimeter of the foundation platform.

9. The bed system of claim 1, wherein the at least one cutout is positioned at a central portion of an edge of the foundation platform.

10. The bed system of claim 1, wherein the at least one air duct comprises an air hose.

11. A bed system, comprising:

a mattress having a mattress top, a mattress bottom, mattress sides, a mattress head, and a mattress foot, the mattress comprising:

a temperature control layer with first and second portions positioned in the mattress proximate the mattress top;

first and second air ducts extending from the mattress bottom to the temperature control layer so as to be fluidically connected to the first and second portions of the temperature control layer, respectively, wherein the first and second air ducts each have a first elongate cross section with a first width and a first depth, wherein the first width is greater than the first depth; and a foundation having a foundation top, a foundation bottom, foundation sides, a foundation head, a foundation foot, a foundation platform, and a hinge mechanism connecting the foundation platform to the foundation sides and foundation bottom, the hinge mechanism located at the foundation head, the foundation platform configured to be raised and lowered so as to tilt the foundation platform and the entire mattress with respect to the foundation bottom about the hinge mechanism, the foundation platform positioned at the foundation top, wherein the foundation platform is sized and shaped to be positioned under the mattress bottom to support the mattress, wherein one or more duct passages are coupled to the foundation, and at least the one or more duct passages defining a flow path extending through the foundation platform into the mattress when sides of the foundation platform directly contact the foundation sides;

an air unit positioned in the foundation below the foundation platform;

a first air connection structure that extends upward from the foundation past the foundation platform and into a bottom opening of the first air duct of the mattress when the sides of the foundation platform directly contact the foundation sides so as to connect to the first air duct, wherein the first air connection structure has a second elongate cross section with a second width and a second depth, wherein the second width is greater than the second depth, wherein an outer surface of the first air connection structure is positioned inward of an inner surface of the first air duct; and a second air connection structure that extends upward from the foundation past the foundation platform and into a bottom opening of the second air duct of the mattress when the sides of the foundation platform directly contact the foundation sides so as to connect to the second air duct, wherein the second air connection structure has a third elongate cross section with a third width and a third depth, wherein the third width is greater than the third depth, wherein an outer surface of the second air connection structure is positioned inward of an inner surface of the second air duct.

12. The bed system of claim 11, wherein the foundation bottom and the air unit are configured to remain stationary when the foundation platform is raised.

13. The bed systeom of claim 11, wherein the first air connection structure and the second air connection structure are configured to remain stationary when the foundation platform is raised.

14. The bed system of claim 13, wherein the first and second air connection structures each comprise air outlets, at least one side of each of the air outlets are angled inward toward a central axis of the respective first and second air connection structure from the foundation platform when the sides of the foundation platform directly contact the foundation sides.

15. The bed system, comprising:

a mattress having a mattress top, a mattress bottom, mattress sides, a mattress head, and a mattress foot, the mattress comprising:

a temperature control layer positioned in the mattress proximate the mattress top;

an air bladder layer positioned in the mattress under the temperature control layer, wherein the air bladder layer includes one or more air chambers;

at least one air duct extending from the mattress bottom along an exterior side of the air bladder layer to the temperature control layer so as to be fluidically connected to the temperature control layer; and a foundation comprising:

a foundation top, a foundation bottom, foundation sides, a foundation head, a foundation foot, a plurality of side beams and a cross beam, a foundation platform positioned at the foundation top, and a hinge mechanism, the foundation platform sized and shaped to be positioned under the mattress bottom to support the mattress, the foundation platform defining at least one cutout extending through the foundation platform proximate an outer edge of the foundation platform, the hinge mechanism connecting the foundation platform to the foundation sides, the hinge mechanism adjacent the foundation head so as to allow the mattress to be raised and to pivot about the hinge mechanism between an open position and a close position, the foundation platform supported by the plurality of side beams and the cross beam, the plurality of side beams and the cross beam positioned under the foundation platform, wherein at least one of the plurality of side beams are connected at an edge of the foundation platform adjacent the foundation foot opposite the hing mechanism, wherein at least one of the side beams extend from the hinge mechanism along an edge of the foundation platform and the cross beam extends across a central portion of the foundation platform from at least one of the plurality of side beams, and wherein the plurality of side beams comprise a series of straight beams interconnected at approximately perpendicular angles so as to follow a curvature of the edge of the foundation platform and the at least one cutout;

an air unit positioned in the foundation, wherein the air unit is fluidically connected to the temperature control layer along a first flow path at least partially defined by the at least one air duct, the first flow path extending through the at least one cutout when the foundation platform is positioned in the closed position; and a pump positioned in the foundation, wherein the pump is fluidically connected to at least one of the one or more air chambers by a second flow path that extends through the at least one cutout when the foundation platform is positioned in the closed position.

16. The bed system of claim 15, wherein the at least one cutout is positioned adjacent at least one side beam of the plurality of side beams.

17. The bed system of claim 15, wherein when the foundation platform is in the closed position, the foundation platform is shaped to substantially cover the foundation but to expose and not cover the at least one cutout.

* * * * *